(12) United States Patent
Lou et al.

(10) Patent No.: US 12,478,690 B2
(45) Date of Patent: Nov. 25, 2025

(54) METHODS AND SYSTEMS FOR CONTROLLED RELEASE OF DRUG CARGO VIA ATP-RESPONSIVE LIPOSOMES

(71) Applicant: UNIVERSITY OF TENNESSEE RESEARCH FOUNDATION, Knoxville, TN (US)

(72) Inventors: Jinchao Lou, Knoxville, TN (US); Jennifer Schuster, Knoxville, TN (US); Francisco Nicolas Barrera Olivares, Knoxville, TN (US); Michael Douglas Best, Knoxville, TN (US)

(*) Notice: Subject to any disclaimer, the term of this patent is extended or adjusted under 35 U.S.C. 154(b) by 444 days.

(21) Appl. No.: 17/878,467

(22) Filed: Aug. 1, 2022

(65) Prior Publication Data

US 2023/0068750 A1  Mar. 2, 2023

Related U.S. Application Data

(60) Provisional application No. 63/203,860, filed on Aug. 2, 2021.

(51) Int. Cl.
| | |
|---|---|
| A61K 47/69 | (2017.01) |
| A61K 9/1273 | (2025.01) |
| A61K 9/1277 | (2025.01) |
| A61K 31/704 | (2006.01) |
| A61K 47/58 | (2017.01) |
| A61K 49/00 | (2006.01) |
| C12N 15/88 | (2006.01) |

(52) U.S. Cl.
CPC ........ *A61K 47/6925* (2017.08); *A61K 9/1273* (2013.01); *A61K 9/1277* (2013.01); *A61K 31/704* (2013.01); *A61K 47/58* (2017.08); *A61K 47/6935* (2017.08); *C12N 15/88* (2013.01); *A61K 49/0084* (2013.01)

(58) Field of Classification Search
CPC ... C07D 413/12; C07D 413/14; C07D 413/15
USPC ..................................................... 514/210.2
See application file for complete search history.

(56) References Cited

PUBLICATIONS

Reddy et al., "Synthesis and Antibacterial Activity of Urea and Thiourea Derivatives of Anacardic Acid Mixture Isolated from a Natural Product Cashew Nut Shell Liquid (CNSL)", Intern.' l Journal of Organic Chemistry, vol. 2, No. 3, Sep. 28, 2012, DOI:10.4236/ijoc.2012.23036 ("Reddy") (Year: 2012).*

(Continued)

*Primary Examiner* — Jeffrey H Murray
*Assistant Examiner* — Grace Ching Hsu

(74) *Attorney, Agent, or Firm* — FisherBroyles, LLP; Susan M. Oiler

(57) ABSTRACT

Dimer and monomer molecules according to general formulas (I) or (II) are useful as lipid switch molecules when incorporated into a membrane of a liposome.

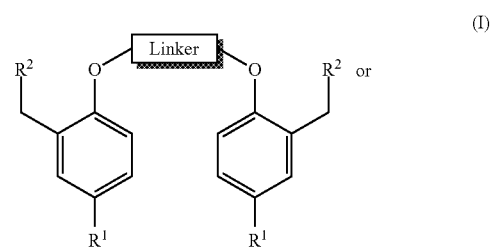

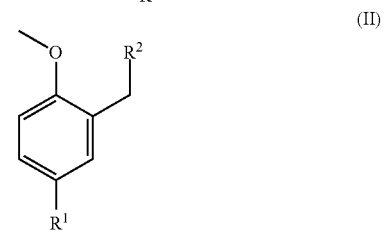

wherein $R^1$ is a hydrophobic tail having at least 6 carbons and wherein $R^2$ is selected from the group consisting of —$NH_2$,

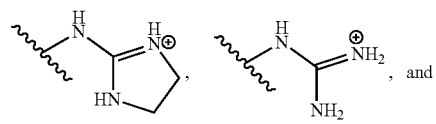

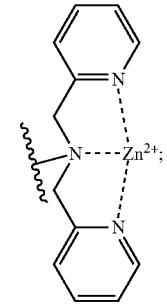

wherein, for the dimer, the linker is a saturated carbon chain having 2 to 6 carbons or is a para-xylene linker; and when $R^2$ is charged anions are present to render the charge neutral. These molecules can bind ATP or similar small phosphorylated molecules between $R^2$ groups, which changes the shape of the molecule or the molecules orientation within the membrane thereby acting as a "switch" to release a therapeutic agent from the liposome.

22 Claims, 46 Drawing Sheets

(56) References Cited

PUBLICATIONS

Jeewandara, "The Basic Science Underlying Drug Design and Discovery: How is a Drug Designed in the Lab to Efficiently Interact with a Protein Target of Interest", Bioengineering & Biotechnology, Chemistry, and General & Internal Medicine, Pub. Jan. 31, 2024 (cumulative art teaching ref.) (Year: 2024).*

Ho et al., Candidalysin is a Potent Trigger of Alarmin and Antimicrobial Peptide Release in Epithelial Cells, MDPI Cells, Mar. 12, 2020, p. 699, vol. 9—Issue 3.

Kobayashi et al., Extracellular ATP Limits Homeostatic T Cell Migration Within Lymph Nodes, Frontiers in Immunology, Dec. 22, 2021.

Lou et al., Calcium-Responsive Liposomes via a Synthetic Lipid Switch, Chemistry A European Journal, Mar. 7, 2018, p. 3599-3607, vol. 24—Issue 14.

Lou et al., ATP-Responsive Liposomes via Screening of Lipid Switches Designed to Undergo Conformational Changes upon Binding Phosphorylated Metabolites, Journal of the American Chemical Society, Feb. 16, 2022, p. 3746-3756, vol. 144.

\* cited by examiner

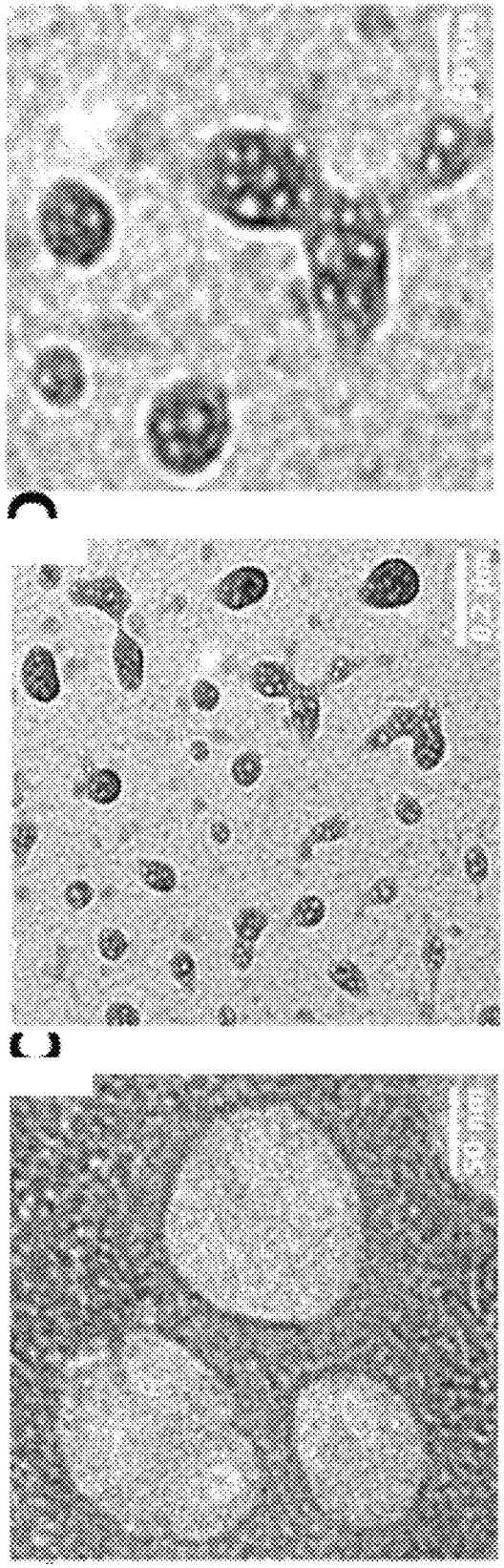

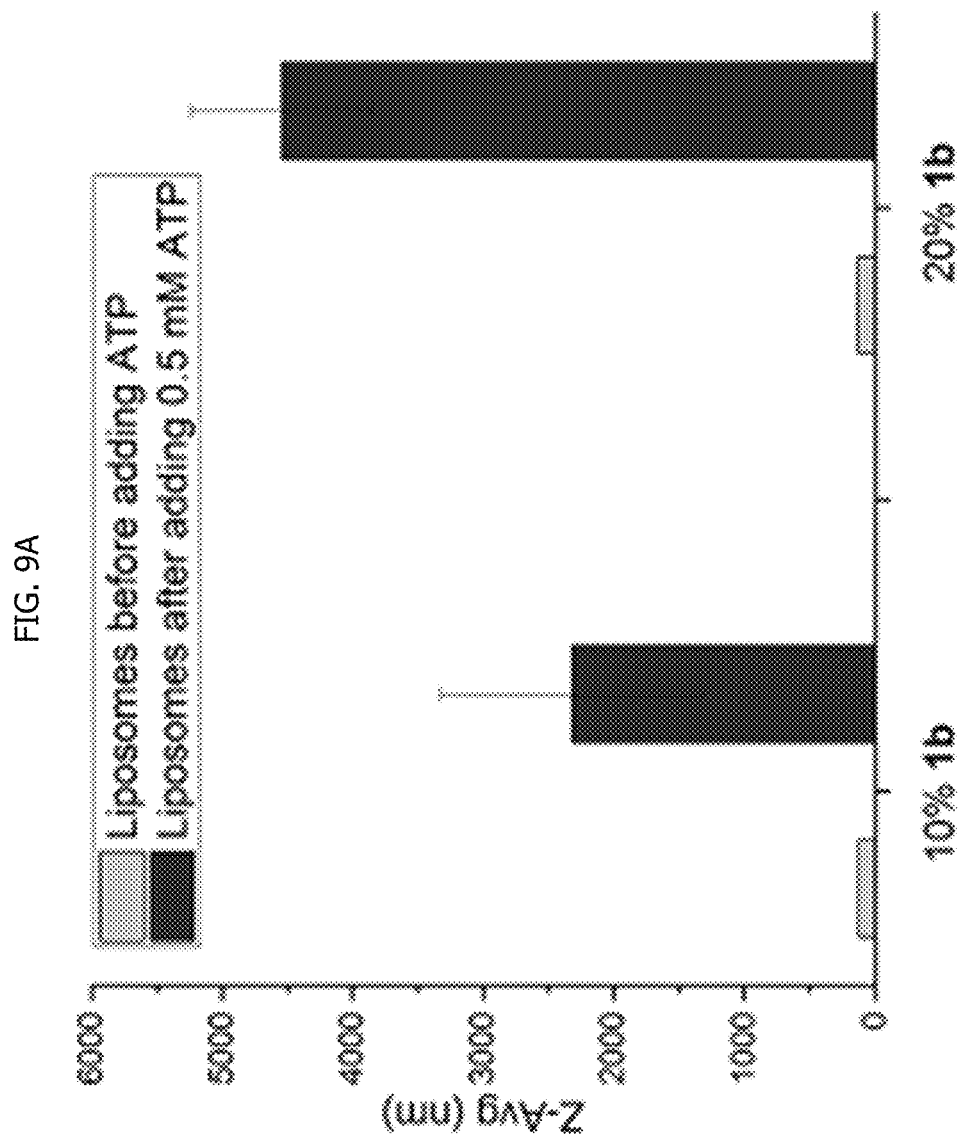

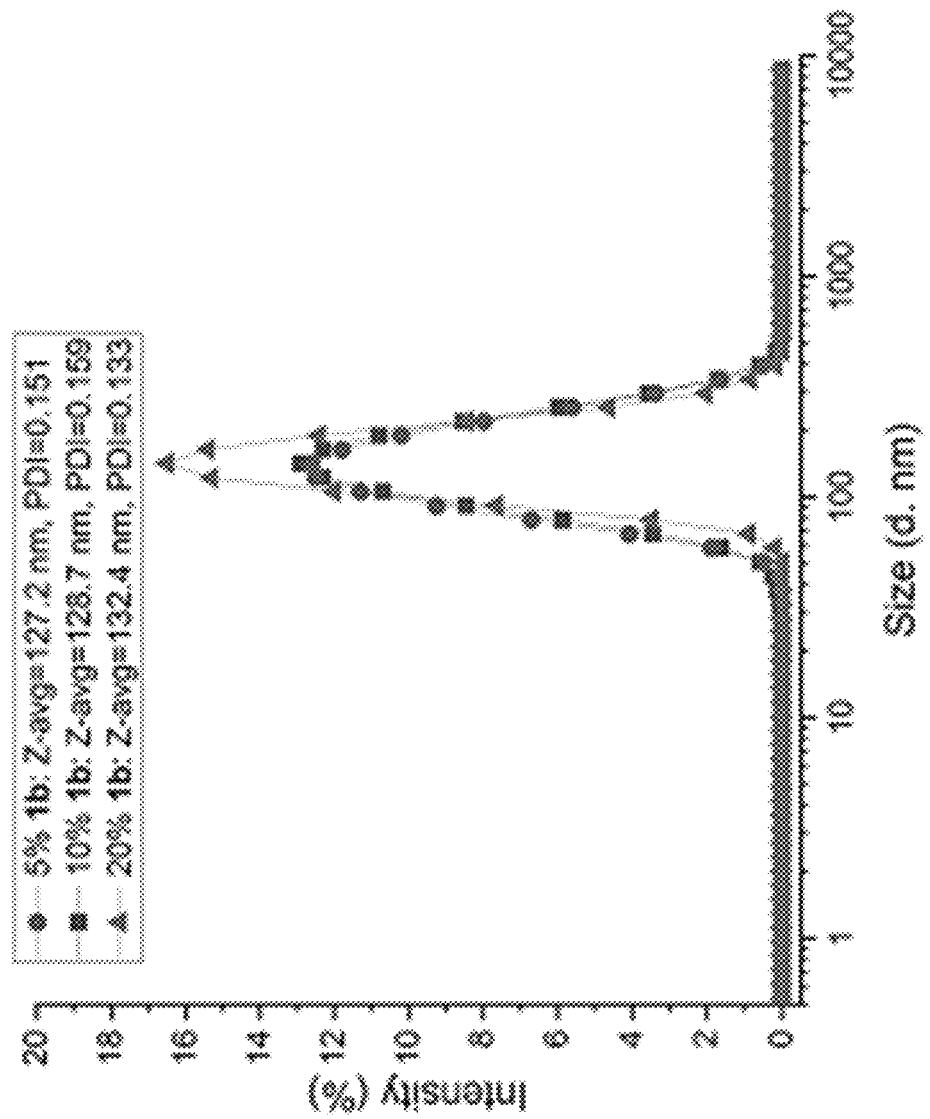

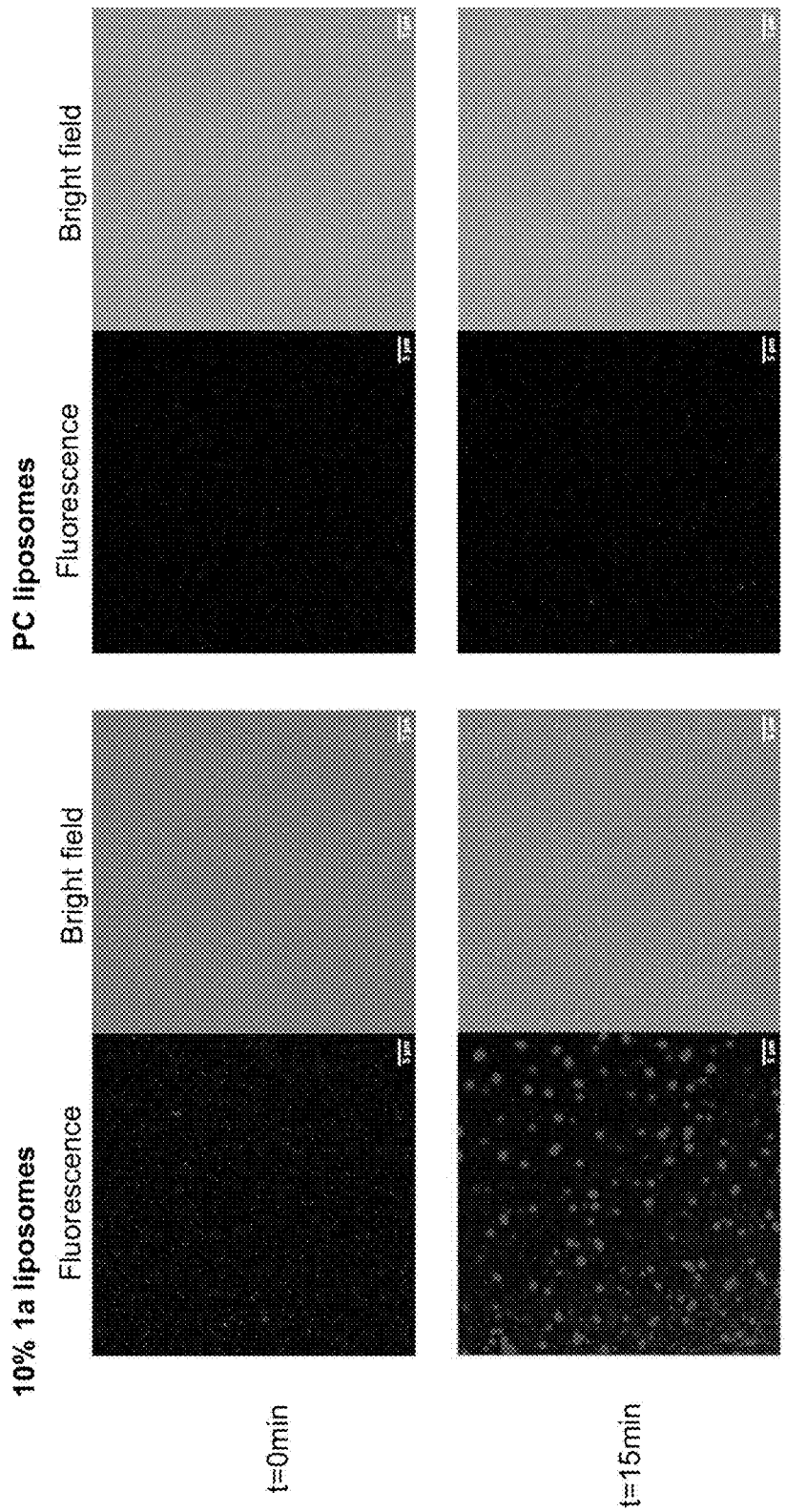

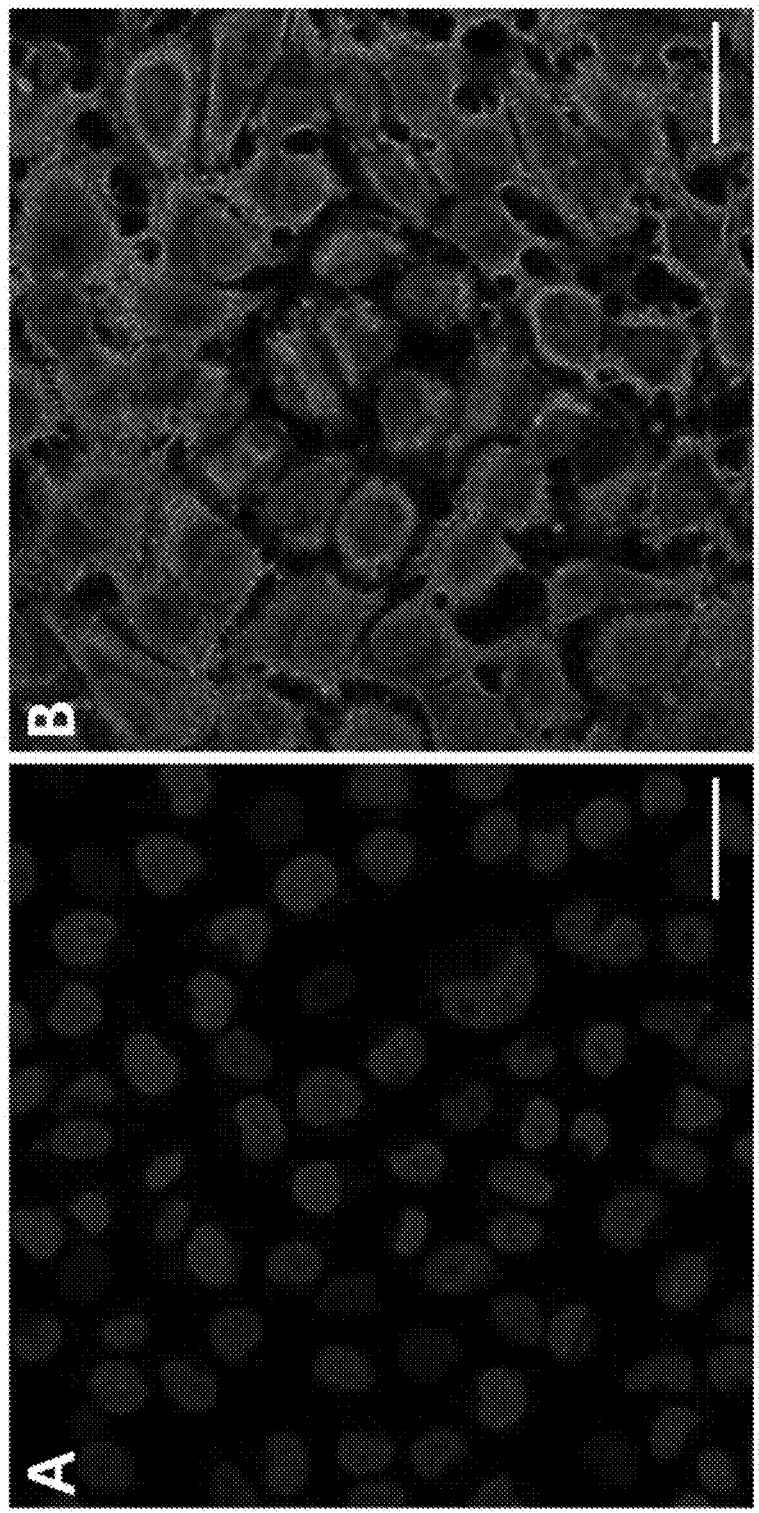

METHODS AND SYSTEMS FOR CONTROLLED RELEASE OF DRUG CARGO VIA ATP-RESPONSIVE LIPOSOMES

CROSS-REFERENCE

This application claims the benefit of U.S. Provisional Application No. 63/203,860, filed on Aug. 2, 2021, which is incorporated herein by reference in its entirety.

STATEMENT OF GOVERNMENT SUPPORT

This invention was made with government support under grant number DMR-1807689, awarded by the National Science Foundation, and grant number R35GM140846, awarded by the National Institutes of Health. The government has certain rights in the invention.

FIELD OF INVENTION

Disclosed herein are molecules that function as a lipid switch, liposomes comprising lipid switch molecules and selectively responsive liposomes comprising lipid switch molecules. The liposomes may be used for delivery of a therapeutic agent and/or a cargo compound. Methods and processes for preparing lipid switch molecules, liposomes comprising lipid switch molecules, selectively responsive liposomes comprising lipid switch molecules, liposomes comprising lipid switch molecules and a therapeutic agent and selectively responsive liposomes comprising lipid switch molecules and a therapeutic agent are provided.

BACKGROUND

Liposomal nanoparticles are effective molecular cargo containers for the encapsulation and delivery of a wide range of therapeutic and diagnostic agents (Pattnj et al 2015 *Chem Rev* 114:10938-10966). Several liposome formulations have been approved for clinical applications by the US Food and Drug Administration and additional constructs are undergoing clinical trials (Allen et al 2013 *Adv. Drug Del. Rev.* 65:36-48; Jhaveri et al 2014 *J. Controlled Release* 190:352-370). Polyethylene glycol (PEG) decoration of liposomes enhances circulation time, cationic lipids or lipopeptides have been used to advance infiltration of cells and liposomes have been combined with targeting moieties such as antibodies or peptides to enhance selective delivery to cells. However, the timing and location of cargo release from liposomes is difficult to control.

A number of stimuli have been investigated to modulate or control liposome release of cargo, including both passive and active release methods. Passive release methods rely on internal stimuli intrinsic to diseased cells such as pH, redox and enzyme expression. Active release methods rely on external stimuli such as light, heat and ultrasound. These efforts have not provided a solution for modulating or controlling liposome release of a cargo such as a therapeutic agent, an active agent or an imaging molecule. The relatively minimal differences between diseased and healthy cells have interfered with internal stimuli methods. For example, pH-responsive liposomes have been heavily studied because the extracellular environment of cancer cells is slightly acidic. Targeted or triggered release of a cargo from pH-responsive liposomes has been limited by the slight pH difference between cancer cells (pH 6.5-6.7) and healthy cells (pH 7.2-7.4). Ion-responsive liposomes triggered by calcium have been developed but they are limited by the ubiquitous presence of calcium. See Lou et al 2018 *Chem Euri* 10.1002/chem201705810. Active release methods are limited by the challenge of preferentially delivering extrinsic stimuli to diseased cells without harming non-target cells or non-target regions. For example, photoresponsive liposomes that react to UV light have been developed, but UV light is toxic to healthy tissue. Further, UV light does not effectively penetrate to interior targets limiting the effectiveness of photoresponsive liposomes to superficial regions. An extrinsic co-delivery system requiring a cell-penetrating peptide fusogenic shell and a core DNA-protein conjugate activated by supplemented liposome-encapsulated ATP have also been developed. See Gu et al2014 *Angew Chem Int Ed* 53:5815-5820. The co-delivery system responds to externally supplied ATP and thus is independent of the local biological ATP concentration. The co-delivery system also requires delivery of multiple components.

SUMMARY

In an embodiment the application provides a liposome comprising a liposome membrane comprising a dimer or monomer molecule according to general formulas (I) or (II) wherein $R^1$ is a hydrophobic tail having at least 6 carbons and wherein $R^2$ is selected from the group consisting of $-NH_2$,

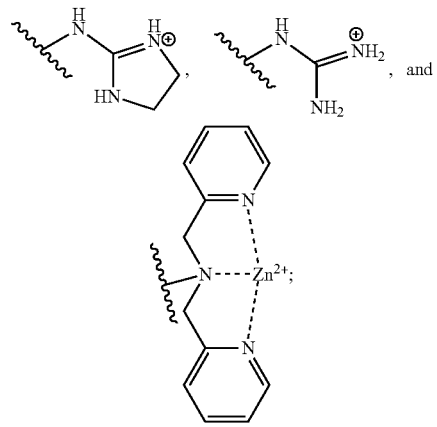

wherein, for the dimer, the linker is a saturated carbon chain having 2 to 6 carbons or is a para-xylene linker; and when $R^2$ is charged anions are present to render the charge neutral, as between about 0.01% and about 45% thereof; a therapeutic agent stored within the liposome, wherein the molecule functions as a lipid switch configured to change shape when a phosphorylated molecule becomes bound to the $R^2$ groups, thereby disrupting the liposome membrane and releasing the therapeutic agent. In some aspects, the liposome membrane is a lipid bilayer membrane. In some aspects, the liposome membrane comprises a phospholipid. In various aspects, the phospholipid is phosphatidylcholine (PC) or phosphatidylserine (PS). In some aspects, the lipid switch molecule and the percentage of lipid switch molecules in the liposome membrane determine the target phosphorylated molecule. In various aspects, the therapeutic agent is encapsulated by the liposome membrane as a core thereof or as part of the liposome membrane. In some aspects the therapeutic agent is hydrophobic or hydrophilic. In aspects of the application, the percentage of lipid switch molecules in the liposome membrane is between about 1% and less than about 20%. In certain aspects, the percentage of lipid switch molecules in the liposome membrane is between about 3% and less than 15%. In some aspects, the percentage of lipid switch molecules is between about 5% and about 10%. In some aspects, the liposome membrane is selected from the group of liposome membranes comprising a dimer molecule according to claim 1 as between about 1% and about 20% and liposome membranes comprising a monomer molecule according to claim 1 as between about 10% and about 40%.

In some embodiments, the liposome is a selectively responsive liposome, wherein the selectively responsive liposome releases the active agent in response to a target phosphorylated molecule. In some aspects of the selectively responsive liposome, the target phosphorylated molecule is ATP and the percentage of lipid switch molecules in the liposome is about 10%.

Methods of delivering a therapeutic agent to a diseased cell in a subject are provided. The methods comprise administering to a subject a selectively response liposome comprising a therapeutic agent, wherein the liposome membrane comprises a dimer or monomer molecule according to the general formulas (I) or (II). The diseased cell may be selected from the group comprising cancer cells, tumor cells and inflamed cells. The diseased cell may exhibit an increased level of a target phosphorylated molecule. In some aspects, the target phosphorylated molecule is ATP.

Methods of regulating release of a therapeutic agent from a liposome are provided. The methods comprise providing a liposome comprising a therapeutic agent and a liposome membrane comprising a lipid switch molecule wherein the percentage of the lipid switch molecule in the liposome membrane determines the target phosphorylated molecule to which the liposome selectively responds. In some aspects, the specificity of the selectively responsive liposome increases when the percentage of lipid switch molecule in the liposome membrane of the liposome is between about 3% and about 13%.

Methods of administering an anti-cancer therapeutic agent to a subject at risk for cancer are provided. The methods comprising providing a selectively responsive liposome comprising an anti-cancer therapeutic agent encapsulated by the liposome membrane and administering the selectively responsive liposome to the subject at risk for cancer.

INCORPORATION BY REFERENCE

All publications, patents, and patent applications mentioned in this specification are herein incorporated by reference in their entireties to the same extent as if each individual publication, patent, or patent application was specifically and individually indicated to be incorporated by reference.

Figure 5A:
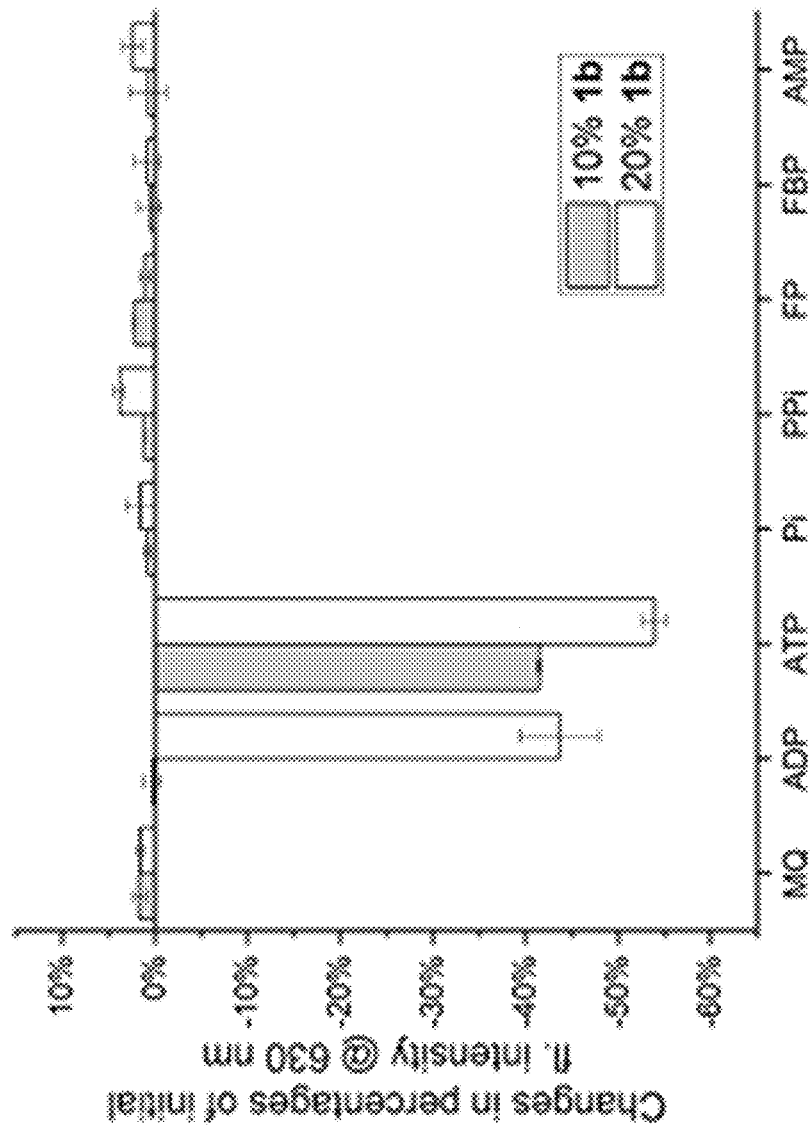
FIG. 5A summarizes the change in percentage of initial fluorescence intensity at 630 nm (y-axis) of PC/1b liposomes with the indicated percent of 1b lipid switch molecules toward different phosphorylated small molecules or Milli-Q water (MQ, negative control) (x-axis). Liposomes containing 20% 1b lipid switch molecules exhibit a significant decrease in fluorescence upon addition of ATP or ADP. The fluorescence decrease indicates release of NR from the liposome. Liposomes containing 10% 1b lipid switch molecules exhibit a significant decrease in fluorescence upon addition of ATP only. Liposomes without lipid switch molecules (PC) exhibit no significant decrease in fluorescence in response to any of the indicated phosphorylated small molecules.
Figure 5B:
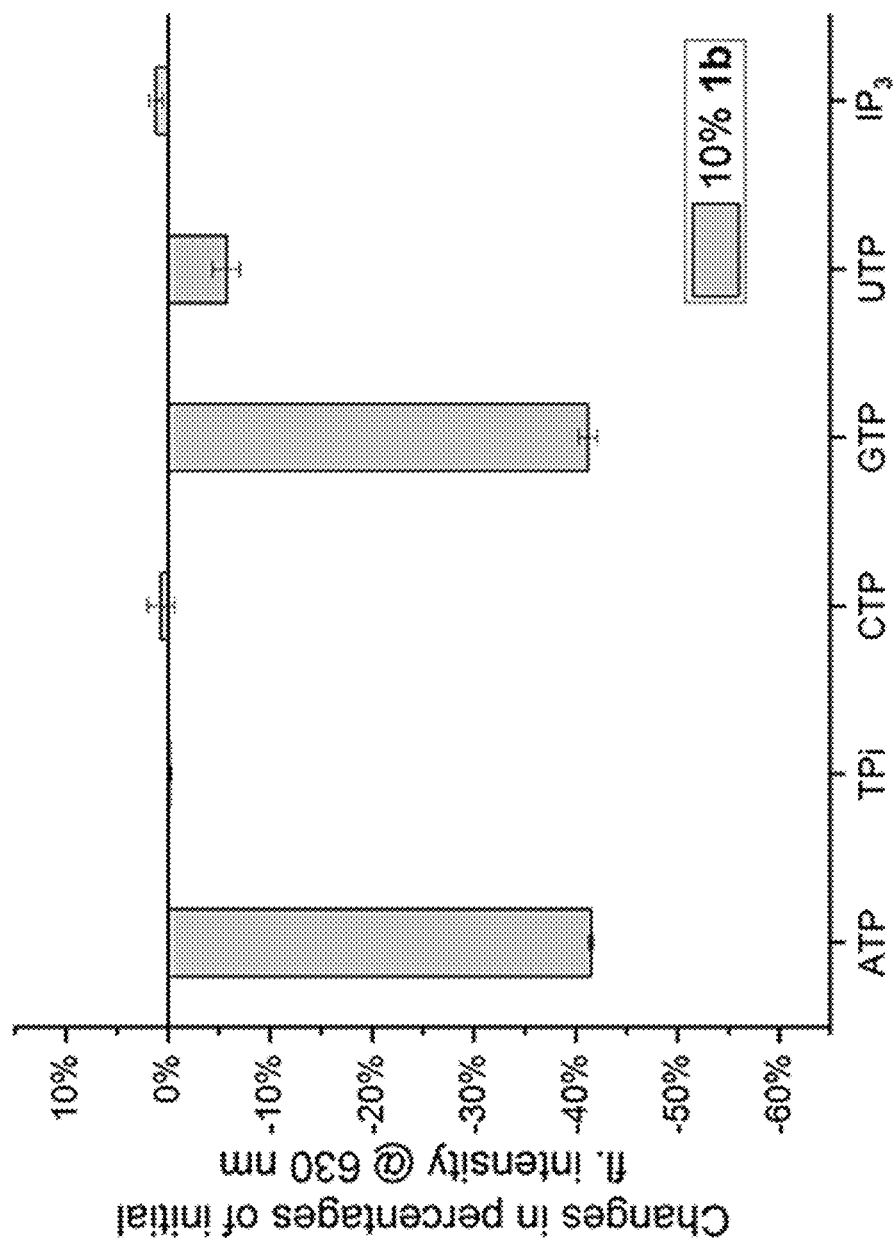
FIG. 5B summarizes the change in percentage of initial fluorescence intensity at 630 nm (y-axis) of PC or PC/1b liposomes with the indicated percent of 1b lipid switch molecules toward different triphosphates (x-axis). The fluorescence intensity of 10% 1b lipid switch molecule liposomes decreases substantially in response to ATP and GTP and somewhat in response to UTP. The decrease in fluorescence intensity indicates an increase in permeability. Liposomes comprising 10% 1b lipid switch molecules respond to ATP, GTP and UTP.
Figure 5C:
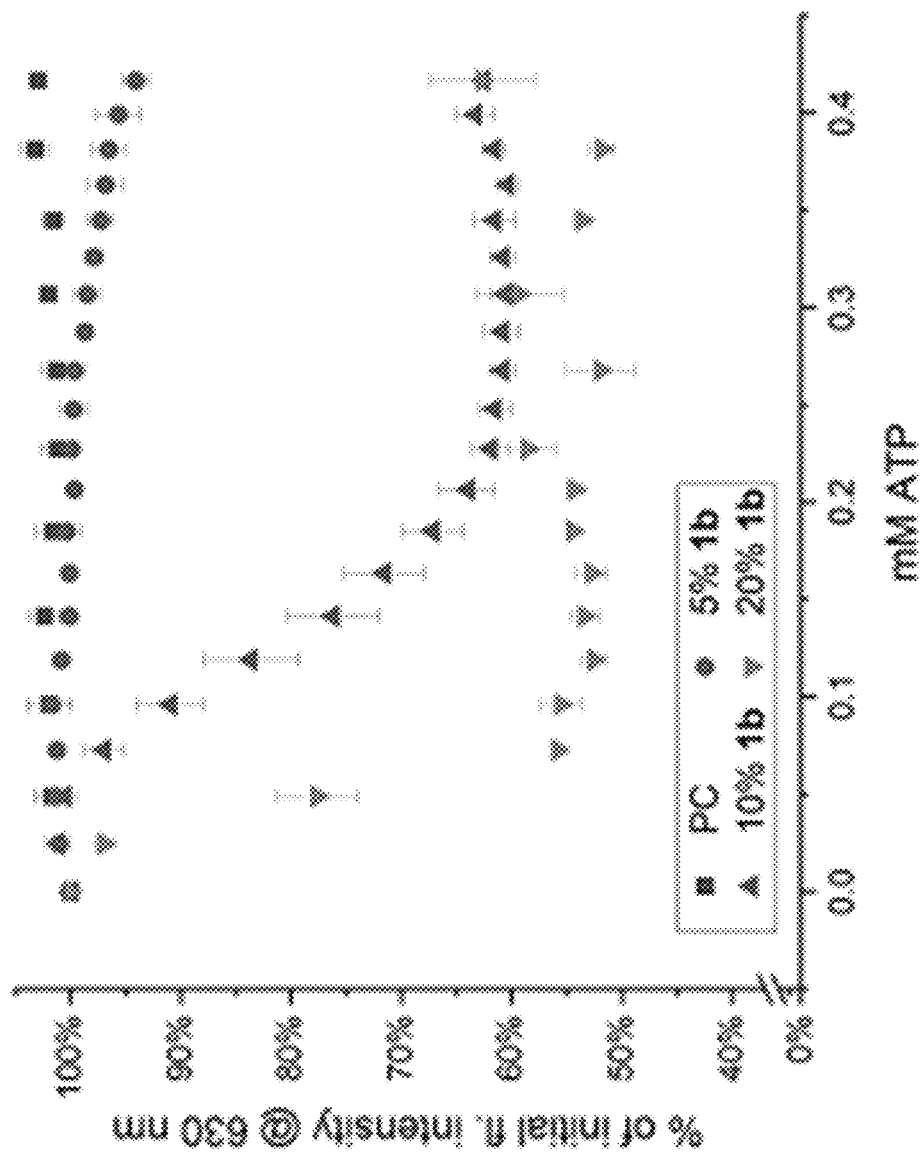
FIG. 5C summarizes the change in percentage of initial fluorescence intensity at 630 nm (y-axis) of PC or PC/1b liposomes with the indicated percent of 1b lipid switch molecules in response to ATP titration. The ATP concentration is indicated on the x-axis. The fluorescence intensity decreases as the ATP concentration increases for all liposomes comprising lipid switch molecules. Liposomes comprising 10% and 20% 1b lipid switch molecules showed dose dependent decreases in fluorescence intensity as a function of the percent of lipid switch molecules in the liposome. Liposome release for 20% and 10% 1b lipid switch molecules are approximately 50% and 40% release, respectively. Liposomes comprising 5% 1b lipid switch molecules show almost no release of NL. PC controls without lipid switch molecules show limited nonspecific decrease in fluorescence intensity upon ATP treatment, indicating limited or no non-specific release of NL.

The error bars on FIGS. 5A-5C denote standard errors from at least three independent studies.

Figure 6:
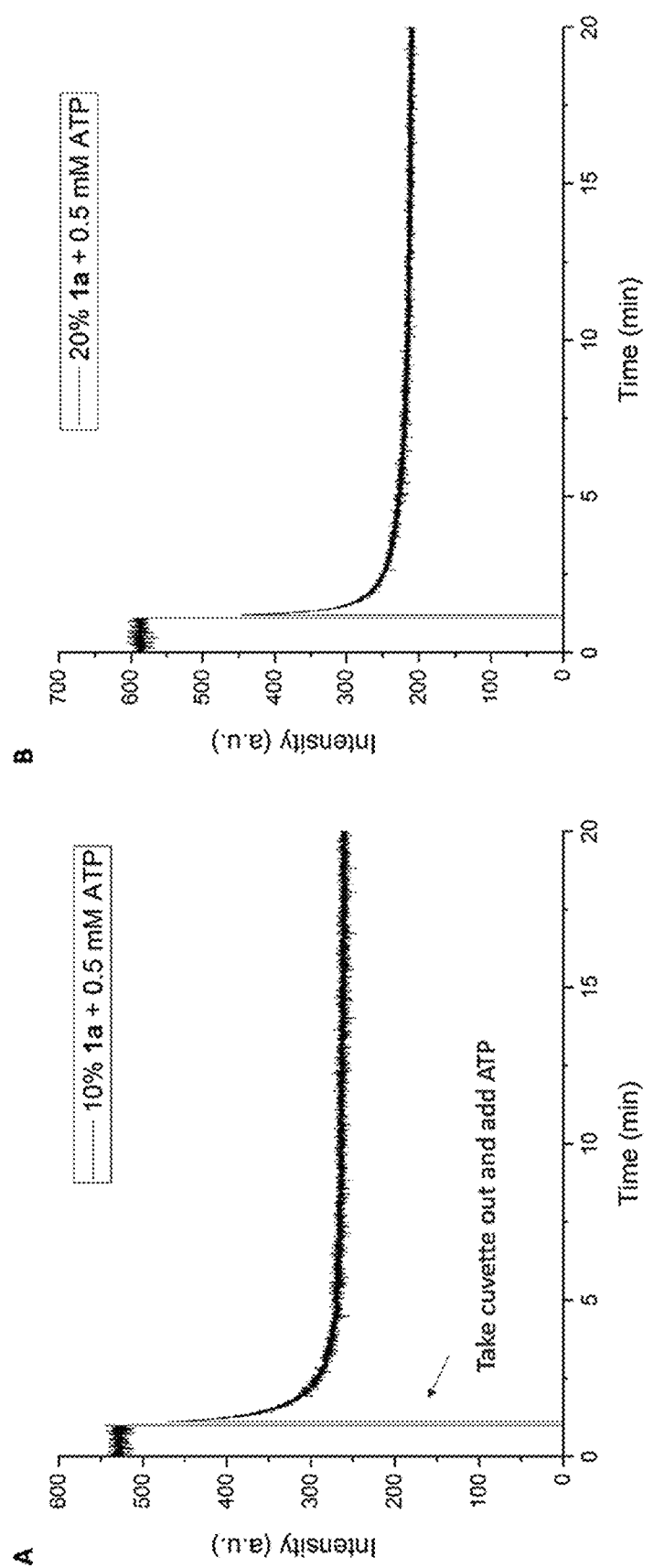

FIG. 6 presents kinetic curves of fluorescence decrease and NR release from 2 mM 10% (left curve) and 20% (right curve) 1a/PC liposomes. The time point at which cuvettes were removed and ATP was added are indicated on the curves. Time (min) is shown on the x-axis. Fluorescence intensity (a.u.) is on the y-axis. Plateaus indicating complete release are reached within 3 minutes.

Figure 7:
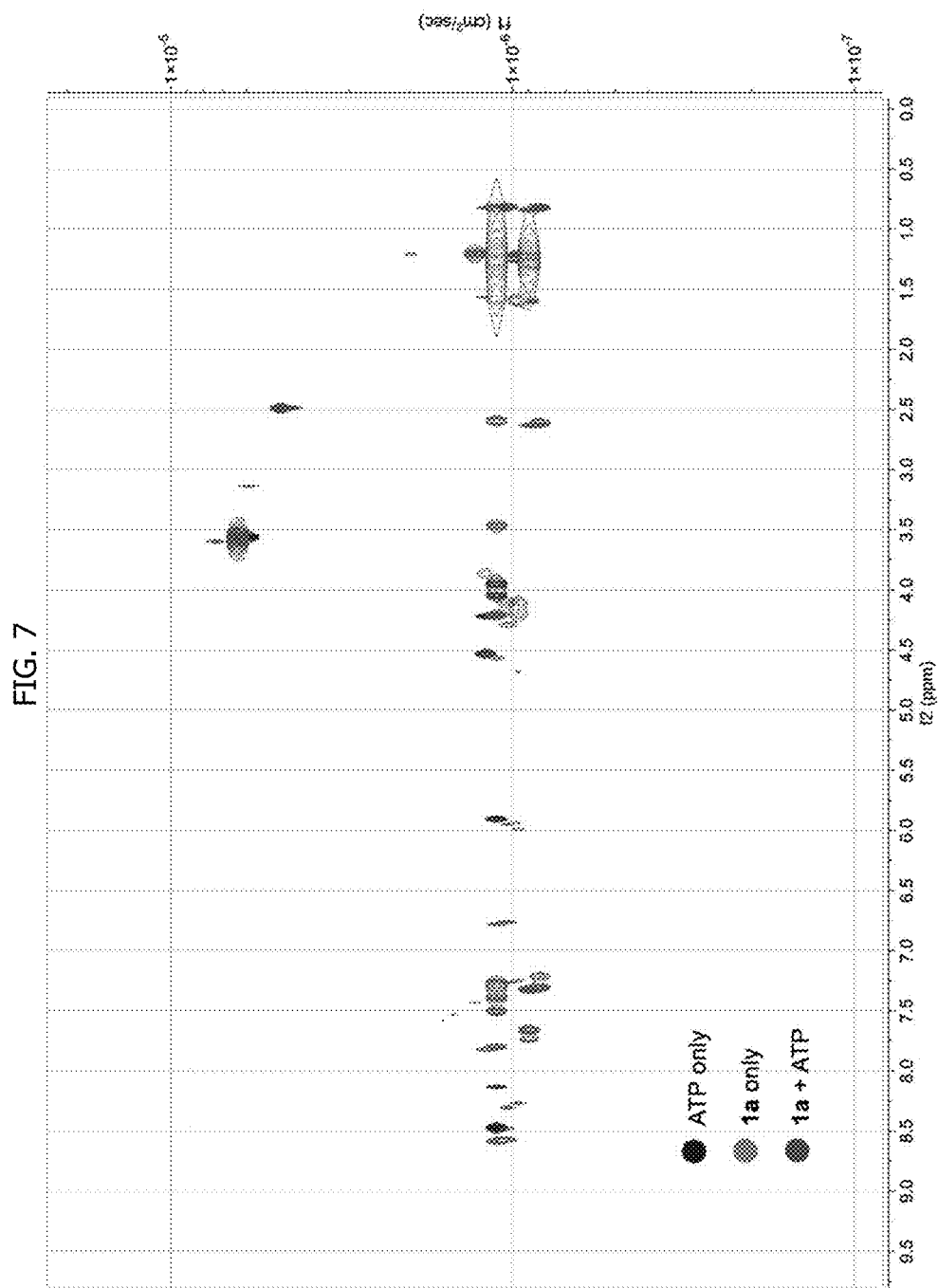

FIG. 7 summarizes results obtained from diffusion ordered spectroscopy (DOSY) conducted on 1a lipid switch molecules in solution before and after the addition of ATP. Results from ATP, 1a lipid switch molecules, and 1a lipid switch molecules+ATP are shown. The 1a+ATP complex shows a slightly lower diffusion coefficient. A lower diffusion coefficient indicates an increased hydrodynamic radius of lipid 1a bound to ATP.

Figure 8A:
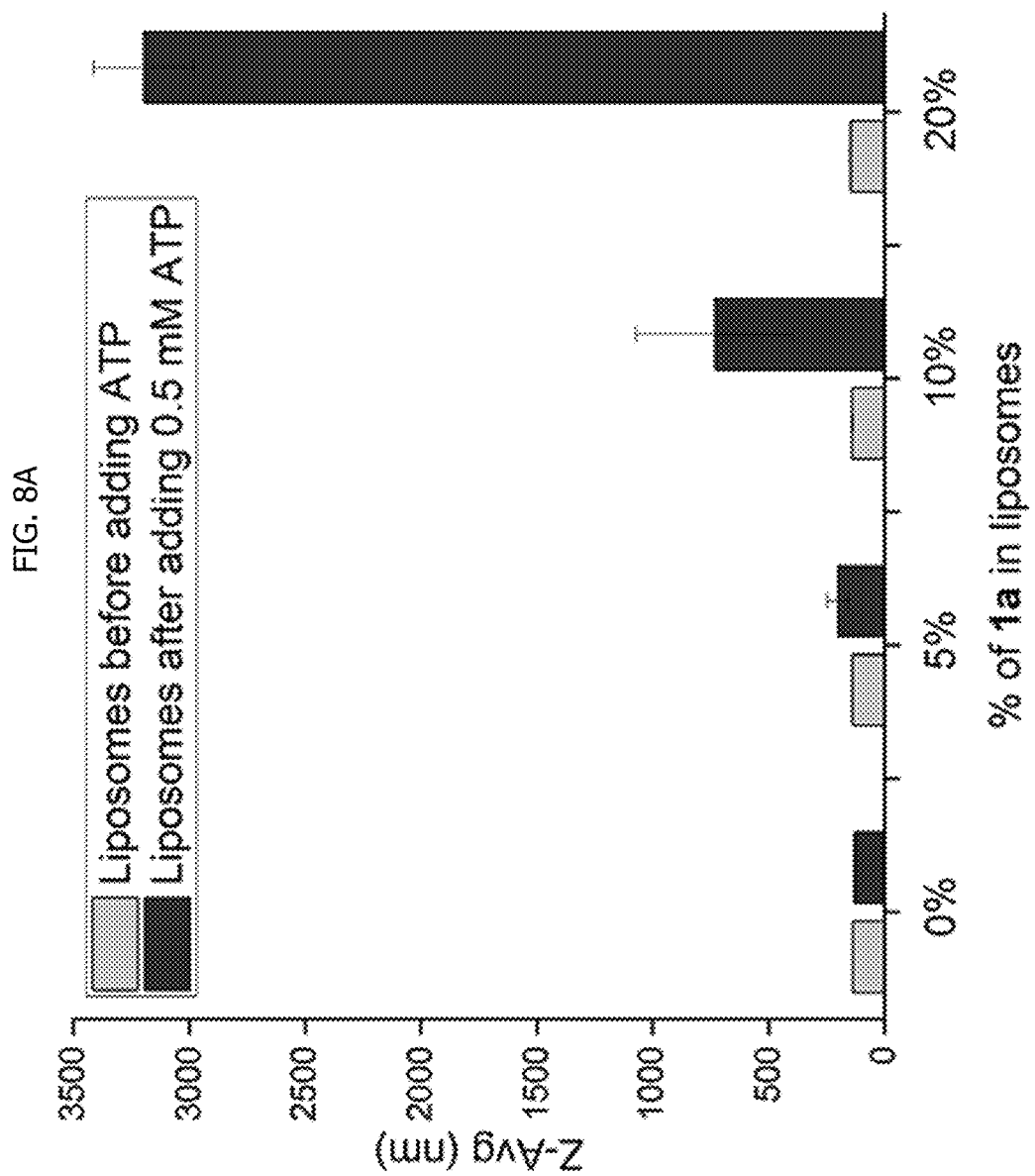

FIG. 8A provides a chart summarizing results obtained from DLS experiments before and after ATP treatment (or triggered release) of PC liposomes comprising 0, 5%, 10% or 20% 1a lipid switch molecules. For each liposome type, the left bar indicates Z-avg (nm) of the liposomes before adding ATP and the right bar indicates Z-avg (nm) of the liposomes after adding 0.5 mM ATP. Error bars indicated standard errors from at least three studies. All samples show uniformly sized particles prior to addition of the ATP. Stable liposomes comprising up to at least 20% 1a lipid switch molecules are formed. The liposome particle size of the liposome particles containing 1a lipid switch molecules increase upon addition of ATP. The particle size increase correlates with the percentage of 1a lipid switch molecules in the liposome. Liposomes comprising 5% 1a lipid switch molecules show a small increase in particle size. Liposomes comprising 10% 1a lipid switch molecules show a moderate increase in particle size, to greater than 500 nm. Liposomes comprising 20% 1a lipid switch molecules show a substantial increase in particle size, to greater than 3000 nm.

FIG. 8B provides a cryo-EM image of 10% 1a/PC liposomes before ATP addition. Unilamellar vesicles with expected diameters (approximately 140 nm) are visible (scale bar, 50 nm).

FIG. 8C provides a cryo-EM image of 10% 1a/PC liposomes 1 minute after ATP addition. Complex multilamellar structures are visible (scale bar, 200 nm). FIG. 8D provides an enlarged image from FIG. 8C showing detailed structures of the aggregates (scale bar, 50 nm). After ATP addition, the vesicles exhibit surprisingly substantial morphology changes.

FIG. 9A provides a chart summarizing results obtained from DLS experiments before and after ATP treatment (or triggered release) of PC liposomes comprising 10% or 20% 1b lipid switch molecules. For each liposome type, the left bar indicates Z-avg (nm) of the liposomes before adding ATP and the right bar indicates Z-avg (nm) of the liposomes after adding 0.5 mM ATP. Error bars indicated standard errors from at least three studies. All samples show uniformly sized particles prior to addition of the ATP. Stable liposomes comprising up to at least 20% 1b lipid switch molecules are formed. The liposome particle size of the liposome particles containing 1b lipid switch molecules increase upon addition of ATP. The particle size increase correlated with the percentage of 1b lipid switch molecules in the liposome. Liposomes comprising 10% 1b lipid switch molecules show a dramatic increase in particle size, to greater than 2000 nm. Liposomes comprising 20% 1b lipid switch molecules show a substantial increase in particle size, to greater than 4000 nm.

FIG. 9B presents the raw distribution curves for liposomes comprising 5%, 10% or 20% 1b lipid switch molecules without ATP treatment. Stable liposomes comprising at least up to 20% lipid switch molecules were formed.

Figure 9C:
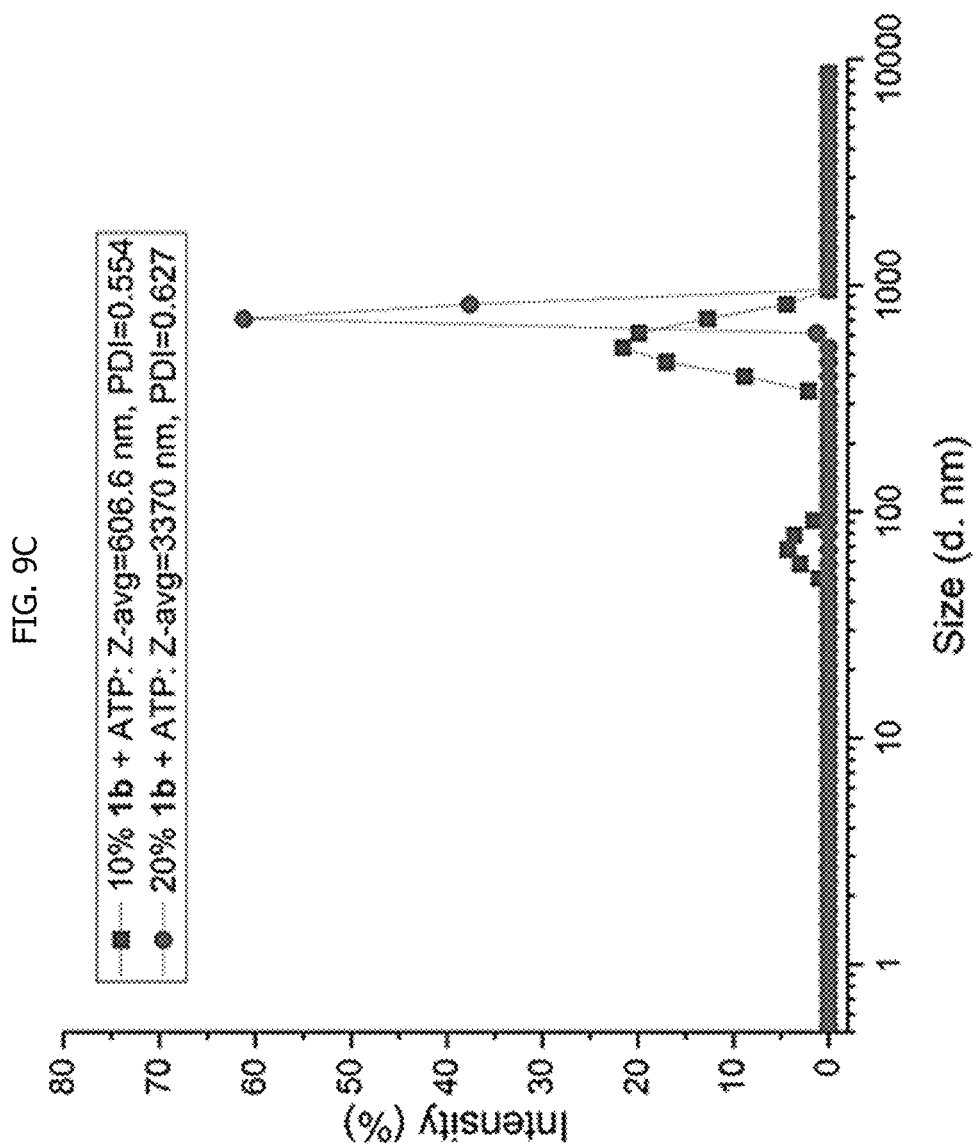

FIG. 9C presents representative distribution curves for liposomes comprising 10% or 20% 1b lipid switch molecules after ATP treatment.

Figure 10:
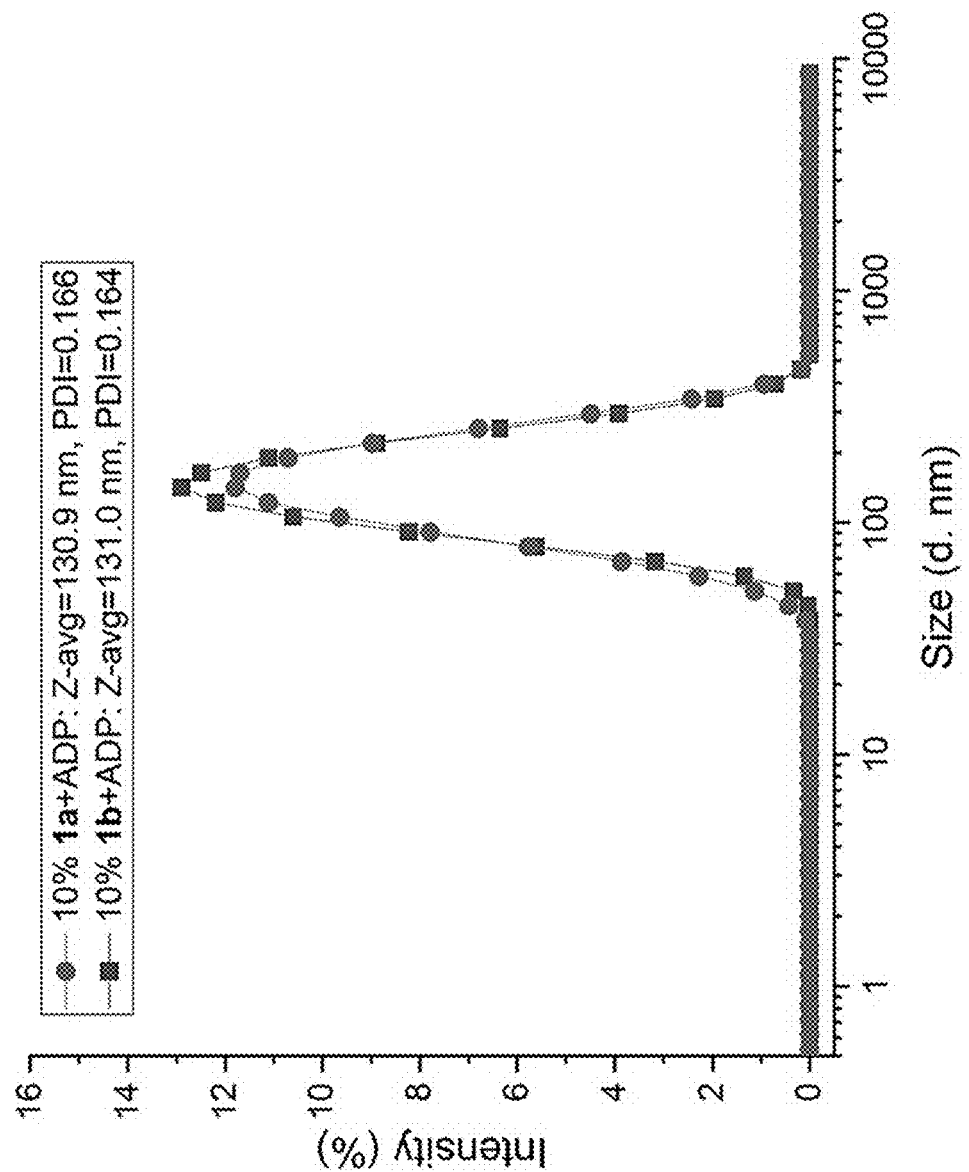

FIG. 10 presents the raw distribution curves for liposomes comprising 10% 1a or 10% 1b lipid switch molecules upon ADP treatment. No changes in particle size were detected. Absence of particle size change indicates no substantial morphological response by the liposomes to ADP.

FIG. 11A presents fluorescence microscope images of 10% 1a PC liposomes stained with Rhodamine-phosphatidylethanolamine (Rd-PE) before treatment with ATP (t=0 min) and after incubation with ATP (t=15 min). Significant fluorescence is visible after incubation with ATP in liposomes comprising 10% 1a lipid switch molecules. Highly fluorescent aggregates in the 2-3 µm size range are present. FIG. 11B presents fluorescence microscope images of PC liposomes (0% lipid switch molecules) stained with Rd-PE before treatment with ATP (t=0 min) and after incubation with ATP (t=15 min). No significant fluorescence is visible.

Figure 12A:
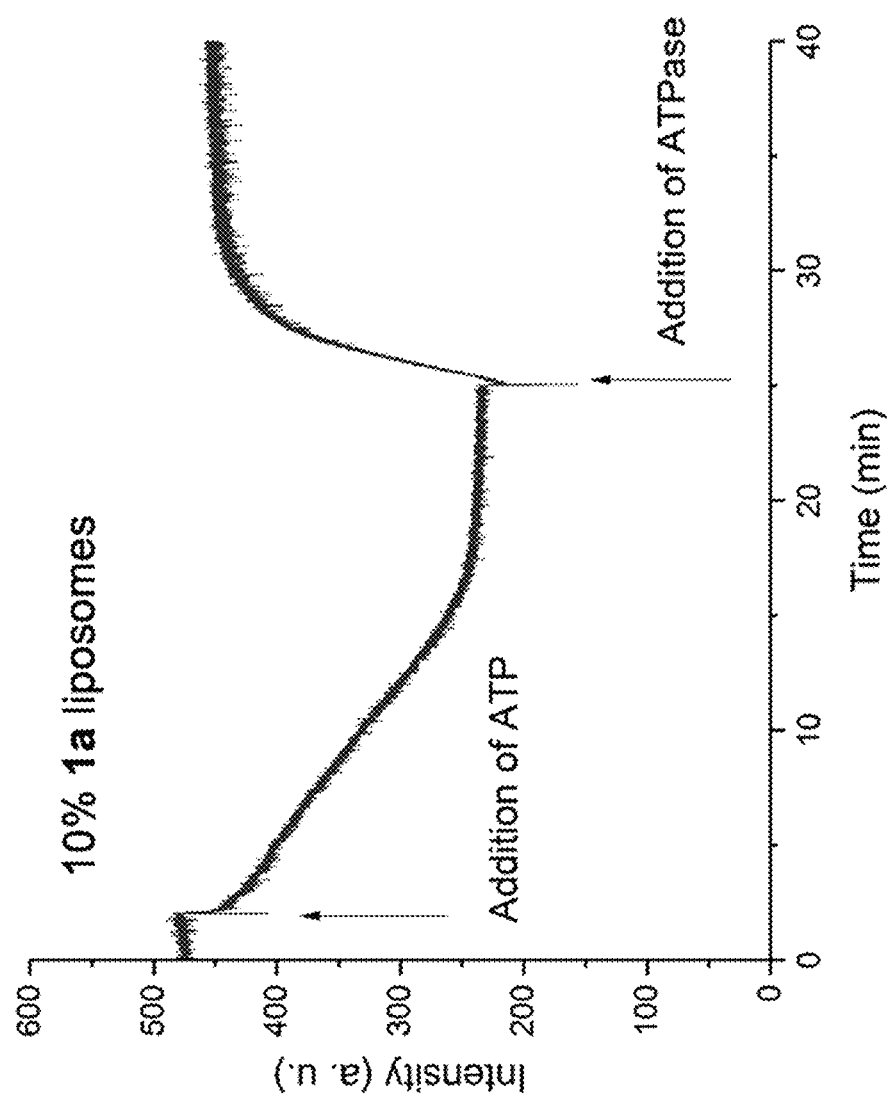
Figure 12B:

FIGS. 12A, 12B, 12C and 12D pertain to the reversibility of the Nile Red release from liposomes containing 10% 1a lipid switch molecules. FIG. 12A presents a kinetic curve indicating the fluorescence intensity of 10% 1a lipid switch molecule liposomes before ATP treatment, after ATP treatment and after the addition of ATPase. The time in minutes is shown on the x axis, the fluorescence intensity is shown on the y axis (intensity in a.u.). The addition of ATP is indicated with an arrow; the addition of ATPase is indicated with an arrow. After addition of ATP, the fluorescence intensity decreases. The decrease in fluorescence intensity indicates the release of Nile Red into solution. When ATPase is added, the fluorescence intensity abruptly increases to nearly the original level. The increased fluorescence intensity indicates that Nile Red is sequestered within stable liposomes. FIG. 12B provides an image of Eppendorf tubes containing a solution of the PC liposomes containing Nile Red and 10% 1a lipid switch molecules. The first tube contains only liposomes. The middle tube contains liposomes and ATP. The distinctly colored Nile Red precipitate is visible in the tube. The third tube contains the liposomes, ATP and ATPase. The distribution of the Nile Red coloration is similar to that of the tube containing only the liposomes and no ATP.

Figure 12C:
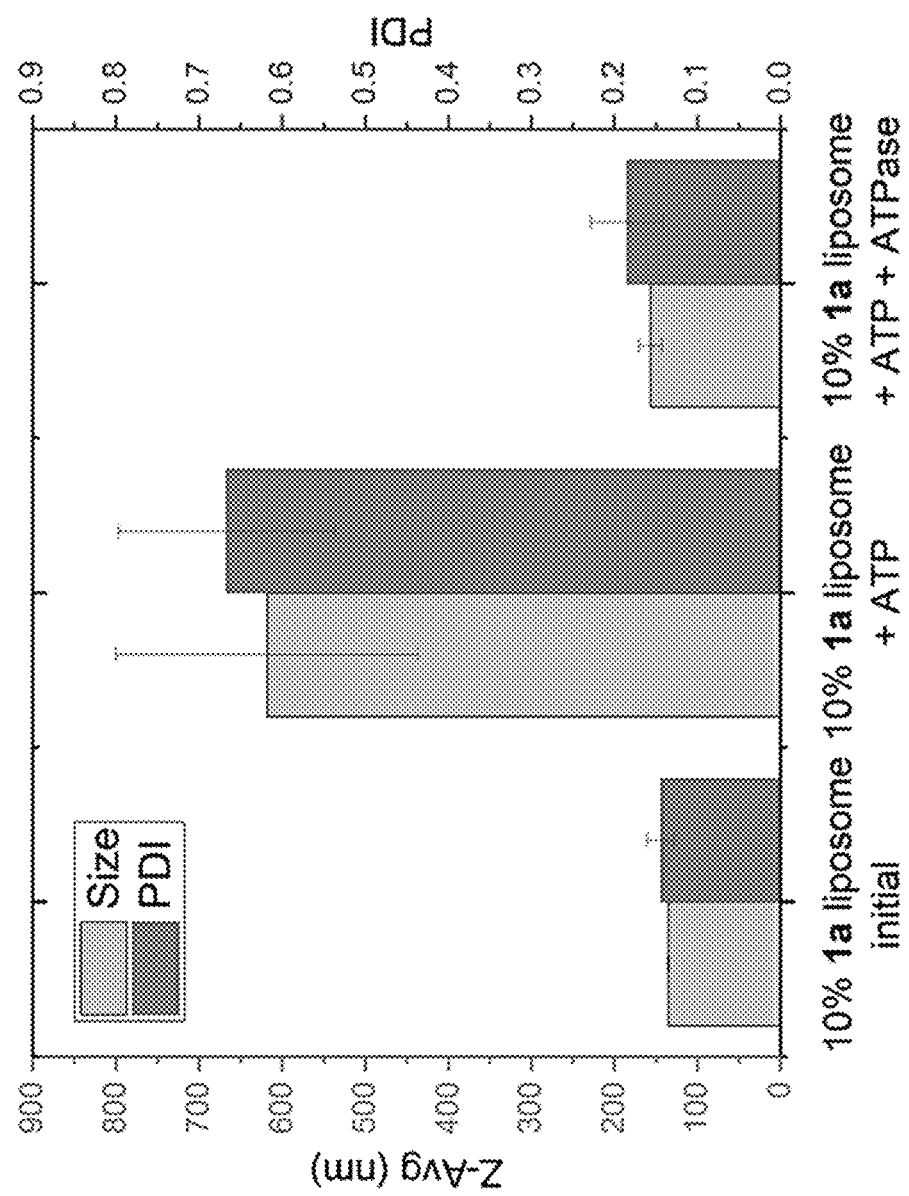
Figure 12D:
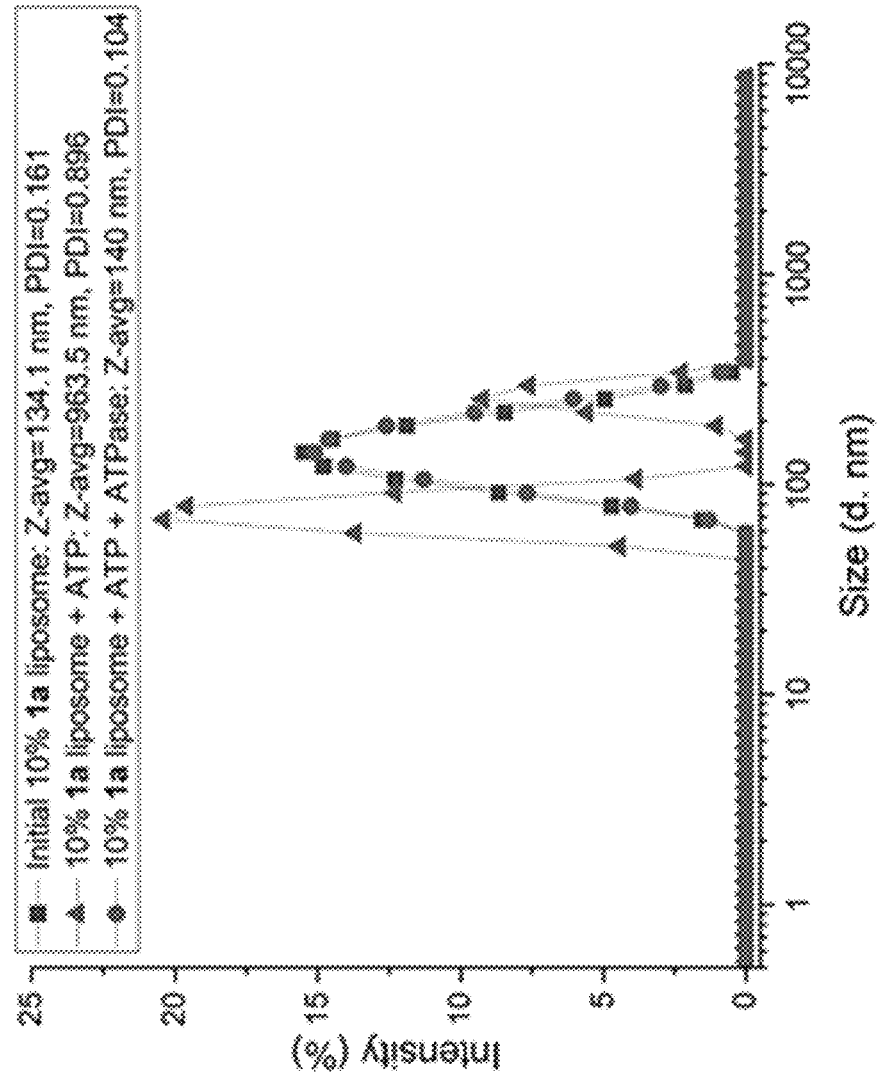

FIG. 12C provides a chart summarizing results obtained from dynamic light scattering (DLS) analysis of the liposome particles. The particle size increases in the presence of ATP. Subsequent treatment with ATPase results in a particle size decrease, returning to uniformly sized particles comparable to the initial liposomes. The polydispersity index (PDI) of the lipid nanoparticles is indicated in the chart. In the presence of ATP only, the PDI significantly increased, indicating more heterogeneous samples and disrupted liposomes. The liposomes without ATP and the liposomes in the presence of ATP plus ATPase show a PDI less than 0.2, indicating stable liposomes. FIG. 12D provides representative traces of size distributions of 10% lipid switch liposomes before ATP treatment, after ATP treatment and after ATP+ATPase treatments. The size distribution curves of the liposomes before ATP treatment and after ATP+ATPase treatment are very similar.

Figure 13:
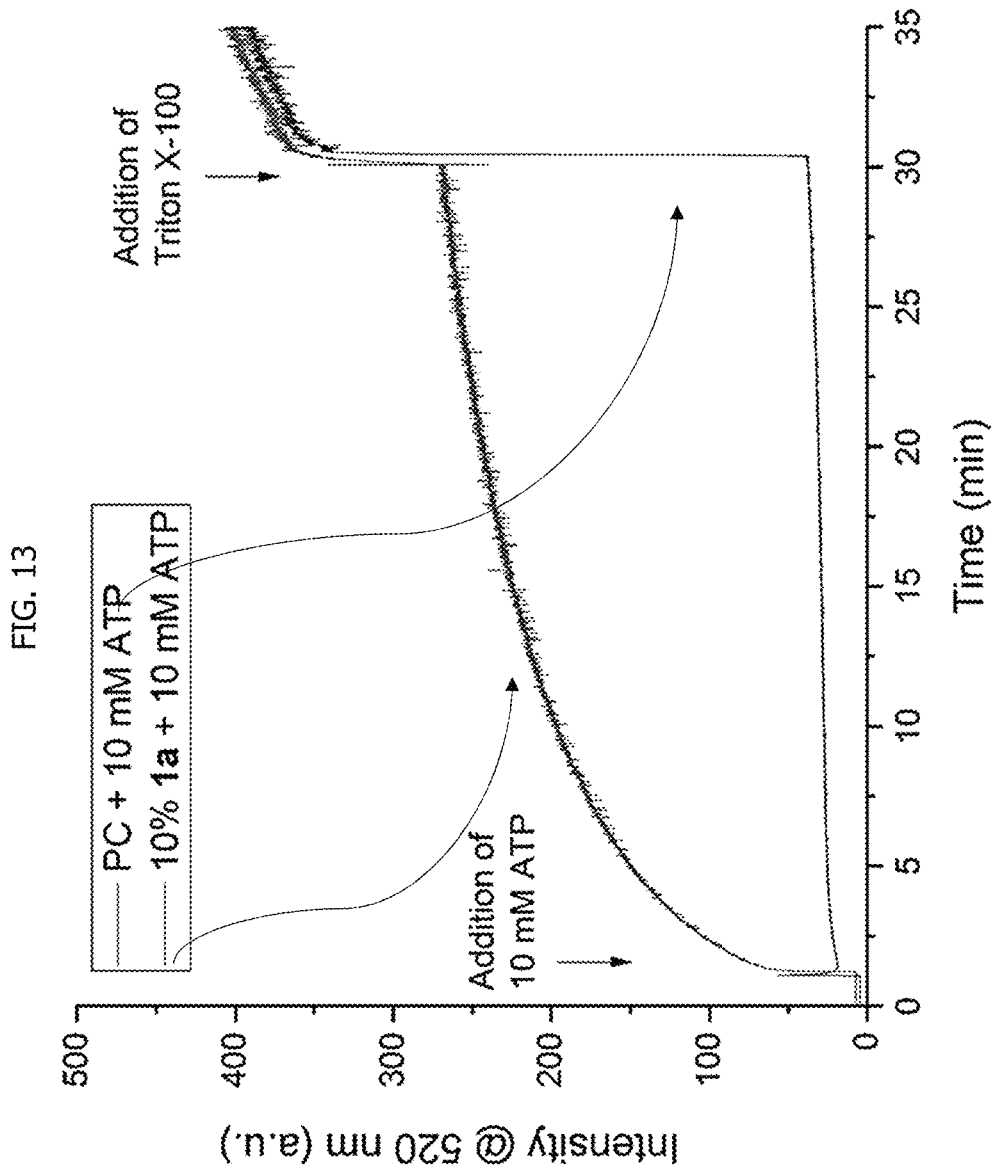

FIG. 13 depicts representative plots of kinetic calcein release for liposomes (PC) and liposomes containing 10% 1a lipid switch molecules upon treatment with ATP. Calcein is hydrophilic. The fluorescence intensity at 520 nm increases significantly upon addition of ATP to 10% 1a lipid switch liposomes. The fluorescence intensity at 520 nm of the 0% lipid switch liposomes remains low until addition of Triton X-100.

Figure 14:
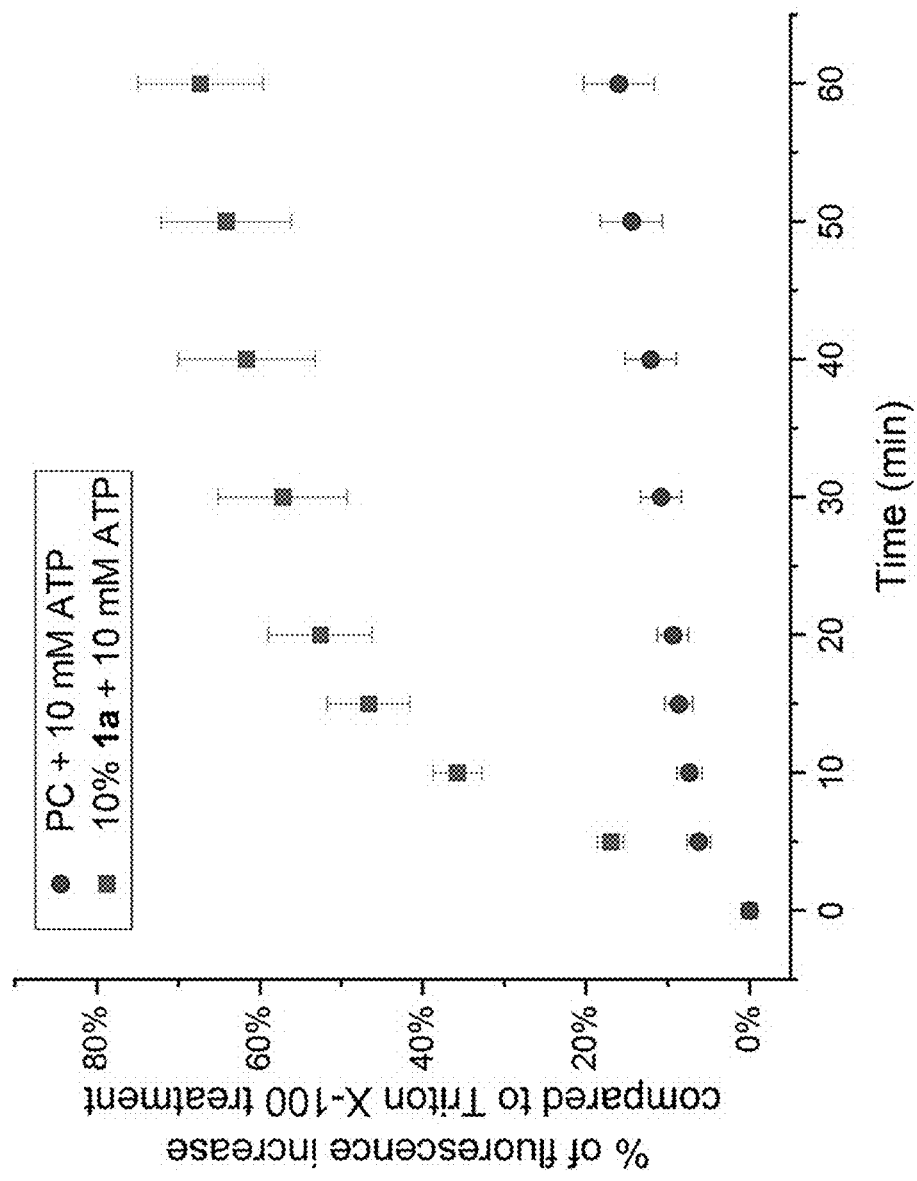

FIG. 14 provides a graphic showing the percent fluorescence increase upon addition of 10 mM ATP to liposomes comprising calcein. The fluorescent increase is relative to the total fluorescence intensity upon treatment with Triton X-100. Liposomes comprising 10% 1a lipid switch molecules in the liposome membrane showed a fluorescence intensity increase greater than 50% at 30 minutes and a fluorescence intensity increase of about 70% at one hour. Control liposomes lacking lipid switch molecules show a background fluorescence increase of less than 20% at one hour. The fluorescence increase of the liposomes comprising lipid switch molecules indicates increased liposome permeability and release of the hydrophilic calcein cargo. Error bars denote standard errors from at least three separate experiments.

Figure 15A:
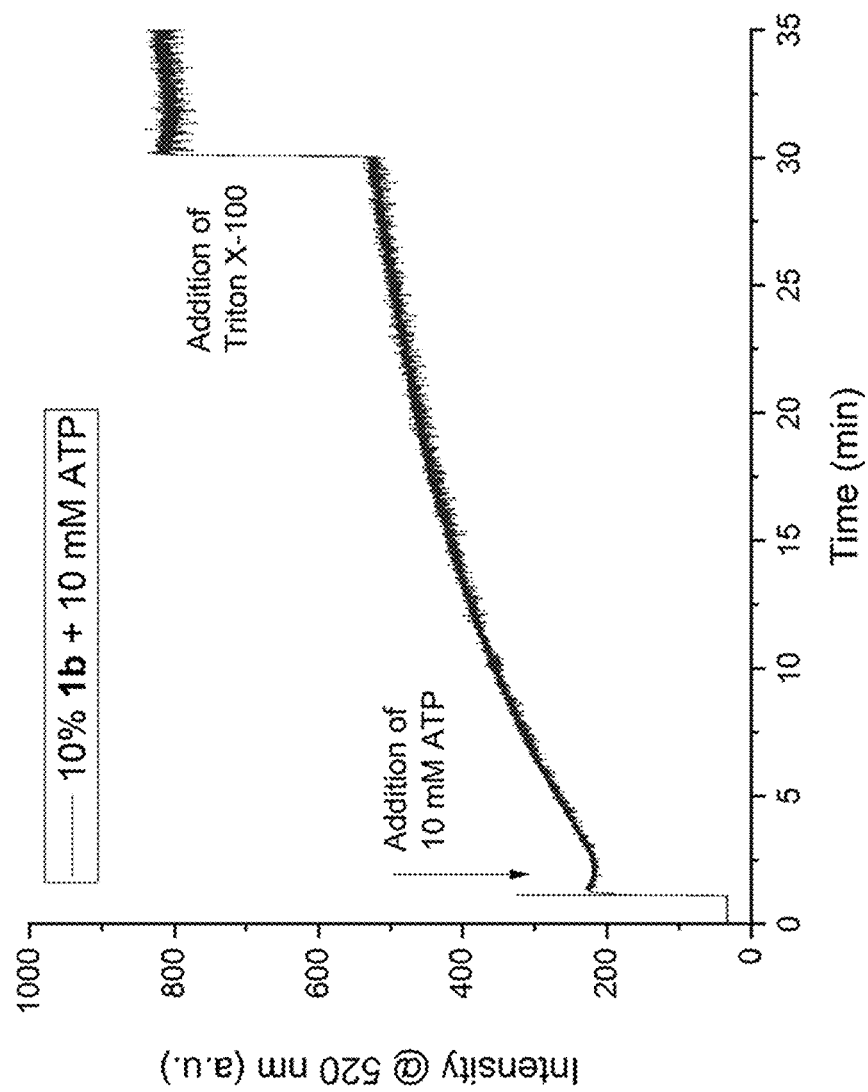
Figure 15B:
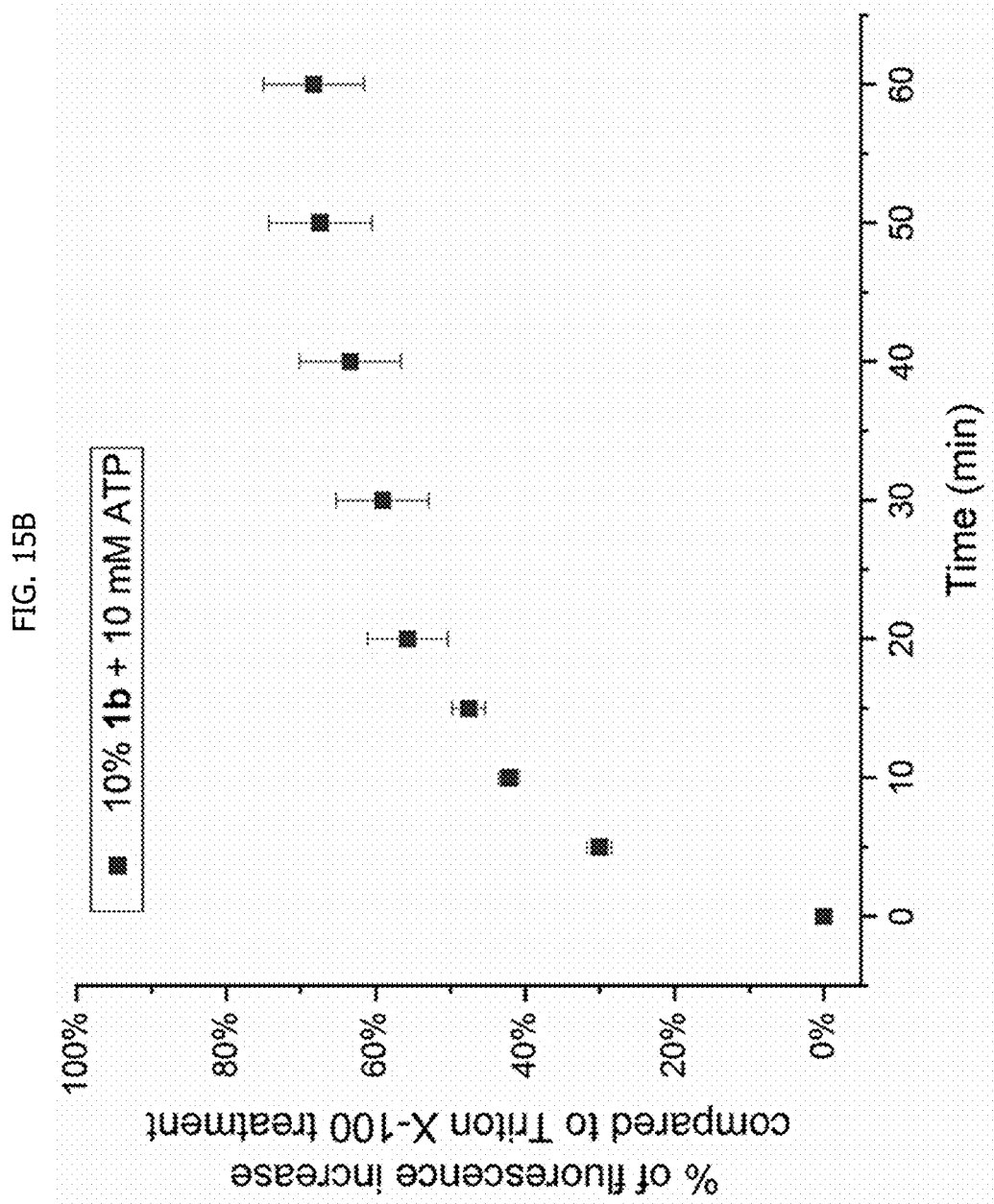

FIG. 15A depicts representative plots of kinetic calcein release for liposomes containing 10% 1b lipid switch molecules upon treatment with ATP. The fluorescence intensity at 520 nm increased significantly upon addition of ATP to 10% 1b lipid switch liposomes. FIG. 15B provides a graphic showing the percent fluorescence increase upon addition of 10 mM ATP to liposomes comprising calcein. The fluorescent increase is relative to the total fluorescence intensity upon treatment with Triton X-100. Liposomes comprising 10% 1b lipid switch molecules in the liposome membrane show a fluorescence intensity increase greater than 50% at 30 minutes and a fluorescence intensity increase of about 70% at one hour. The fluorescence increase of the liposomes comprising lipid switch molecules indicates increased liposome permeability and release of the hydrophilic calcein cargo. Error bars denote standard errors from at least three separate experiments.

Figure 16:
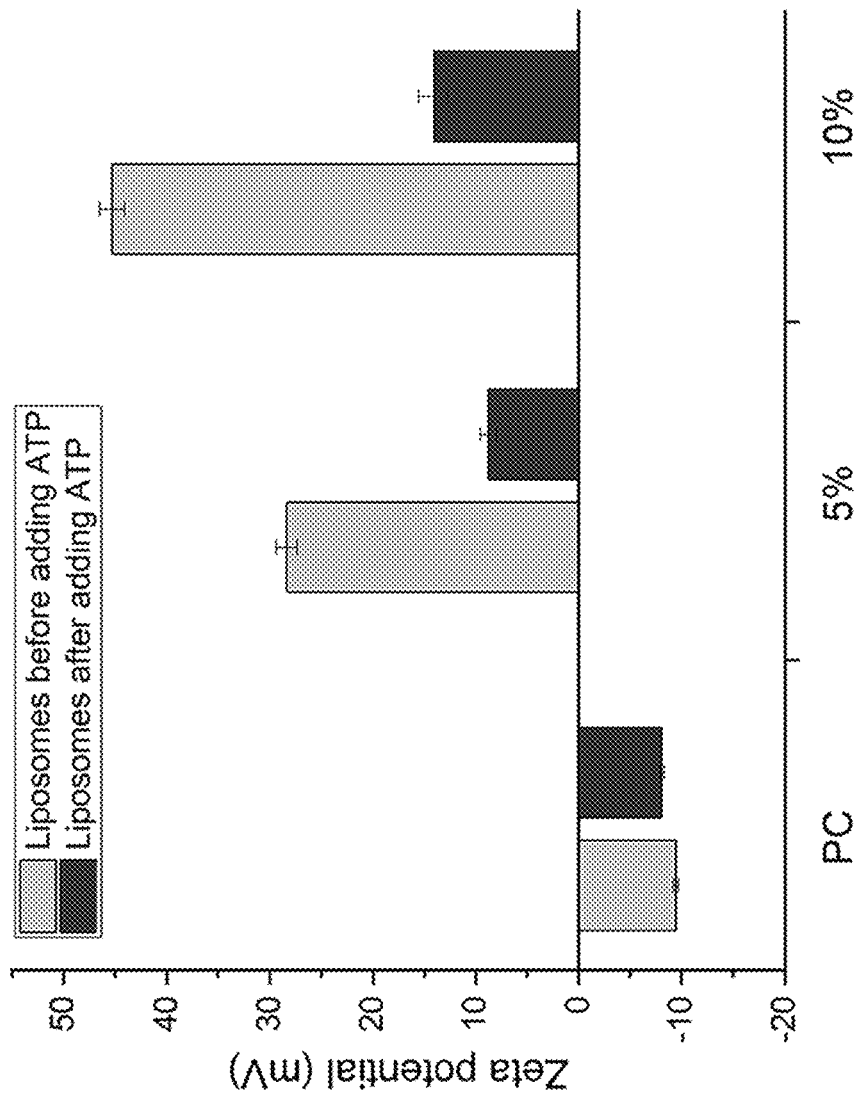

FIG. 16 provides a chart summarizing the Zeta potential (ZP) of phosphatidylcholine liposomes comprising 0%, 5% or 10% 1a lipid switch molecules before and after addition of ATP. The 100% PC liposomes (0% lipid switch molecules) show a slight negative charge which did not change substantially upon addition of ATP. Liposomes comprising 1a lipid switch molecules are positively charged. Before ATP addition, the ZP of the 5% 1a lipid switch molecule liposomes is greater than 25 mV and the ZP of the 10% lipid switch molecule liposomes is greater than 40 mV. The positive charge is a function of the percentage of lipid switch molecules present in the liposomes. Liposomes comprising 5% or 10% 1a lipid switch molecules show a decrease in the positive charge upon ATP addition.

Figure 17C:
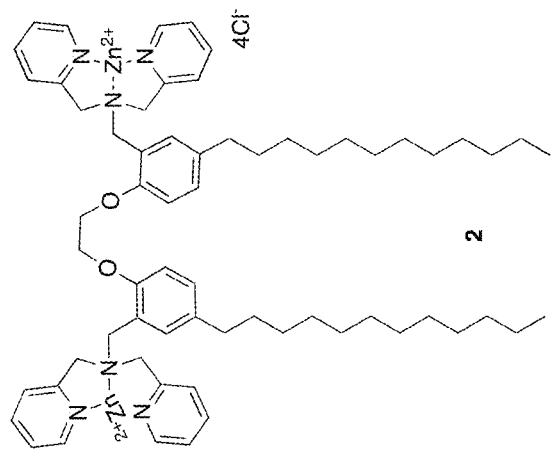
Figure 17B:
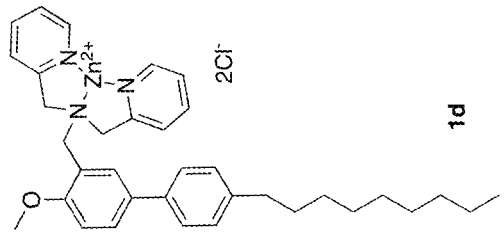
Figure 17A:
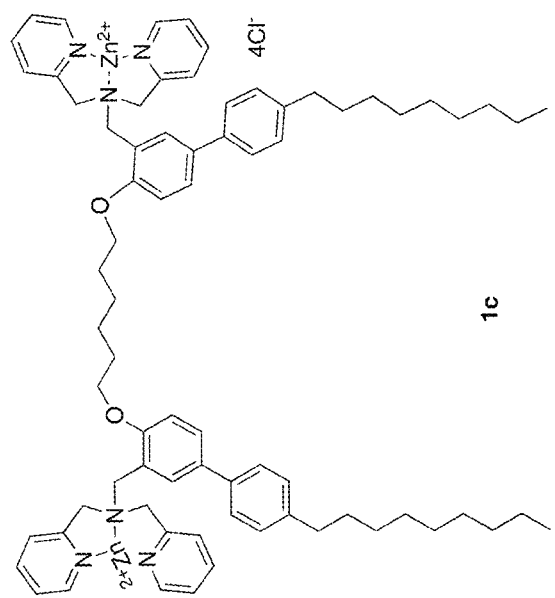

FIGS. 17A, 17B and 17C depict the structures of alternative lipid switch molecules. FIG. 17A shows the "1c" lipid switch molecule with a hexyl linker. The hexyl linker is longer and more flexible than the linkers in the "1a" and "1b" lipid switch molecules. FIG. 17B shows the "1d" lipid switch molecule in which $R_2$ is a single ZnDPA binding unit. FIG. 17C shows the "2" lipid switch molecule with hydrocarbons in the lipid scaffold.

Figure 18A:
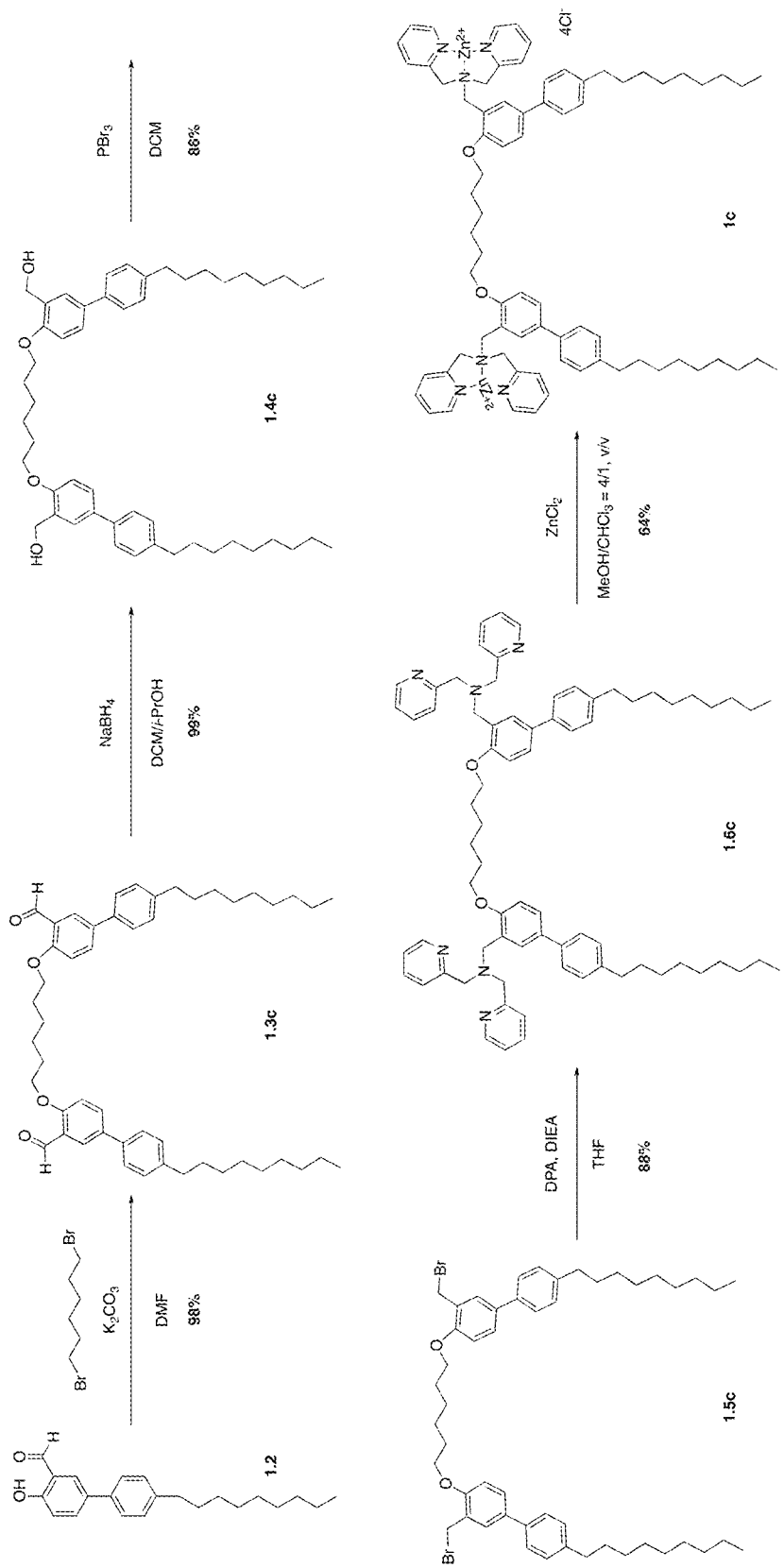
Figure 18B:
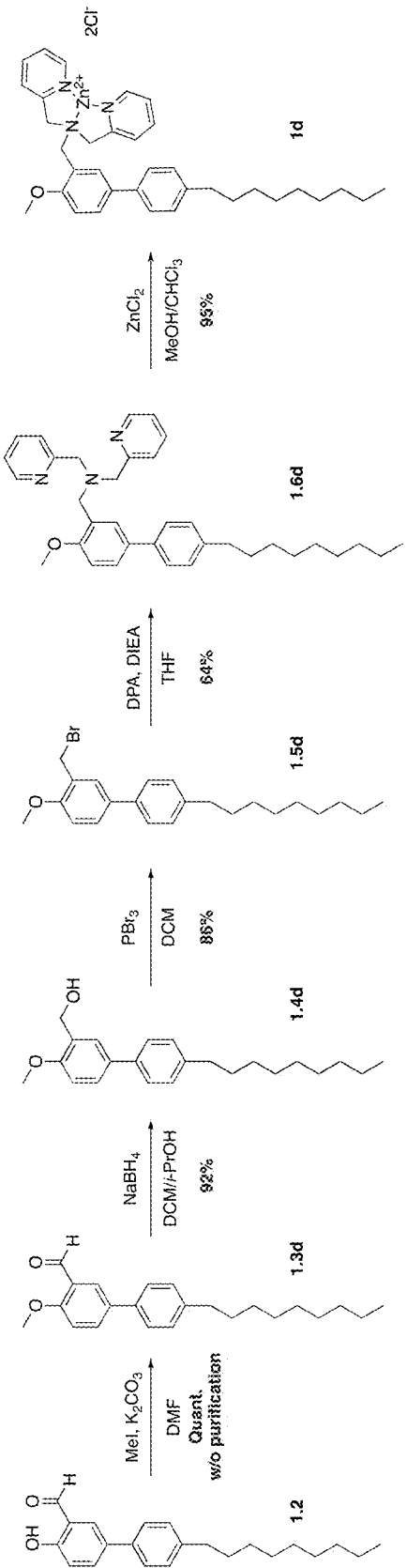
Figure 18C:
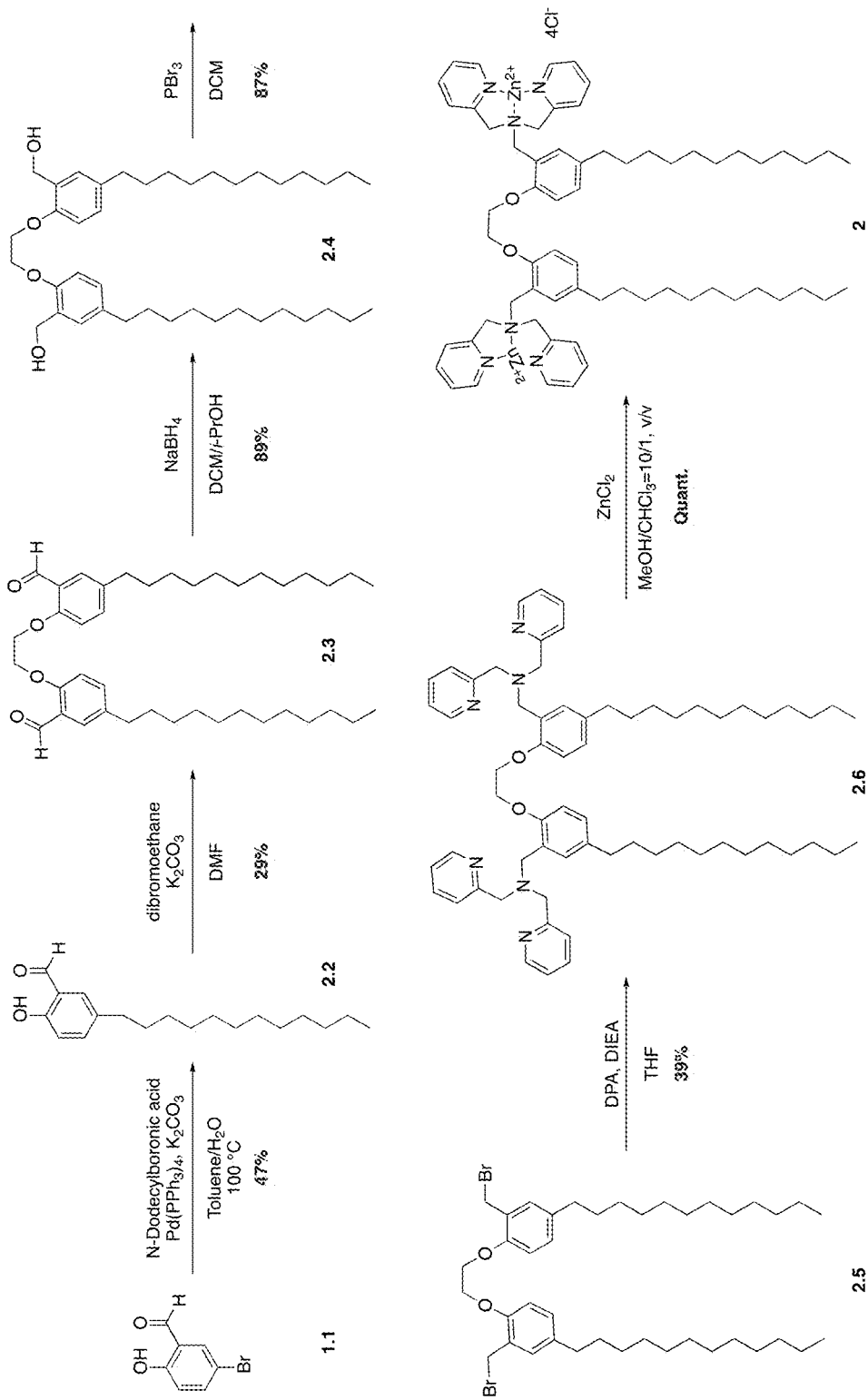

FIG. 18A depicts a synthetic route for a dimer molecule according to general formula I with a hexyl linker (1c lipid switch molecule). The synthesis route is similar to that of the 1a and 1b lipid switch molecules except for the use of 1,6-dibromohexane, followed by reduction, bromination, introduction of DPA units and Zn chelation. FIG. 18B depicts a synthetic route for a monomer molecule according to general formula II (1d lipid switch molecule). The alcohol group of 1.2 was methylated with iodomethane to generate 1.3d followed by reduction to 1.4d bromination to 1.5d, introduction of DPA units (1.6d) and zinc chelation to 1d. FIG. 18C depicts a synthetic route for a dimer molecule according to general formula I with altered C12 alkyl tails. Compound 2.2 was synthesized by Suzuki coupling between 1.1 and N-dodecylboronic acid. A similar route to that used for the 1a, 1b and 1c lipid switch molecules including the use of 1,2-dibromoethane to generate 2.3 followed by reduction to 2.4, bromination to 2.5, introduction of DPA units to 2.6 and zinc chelation to the final molecule (2 lipid switch molecule).

Figure 19A:
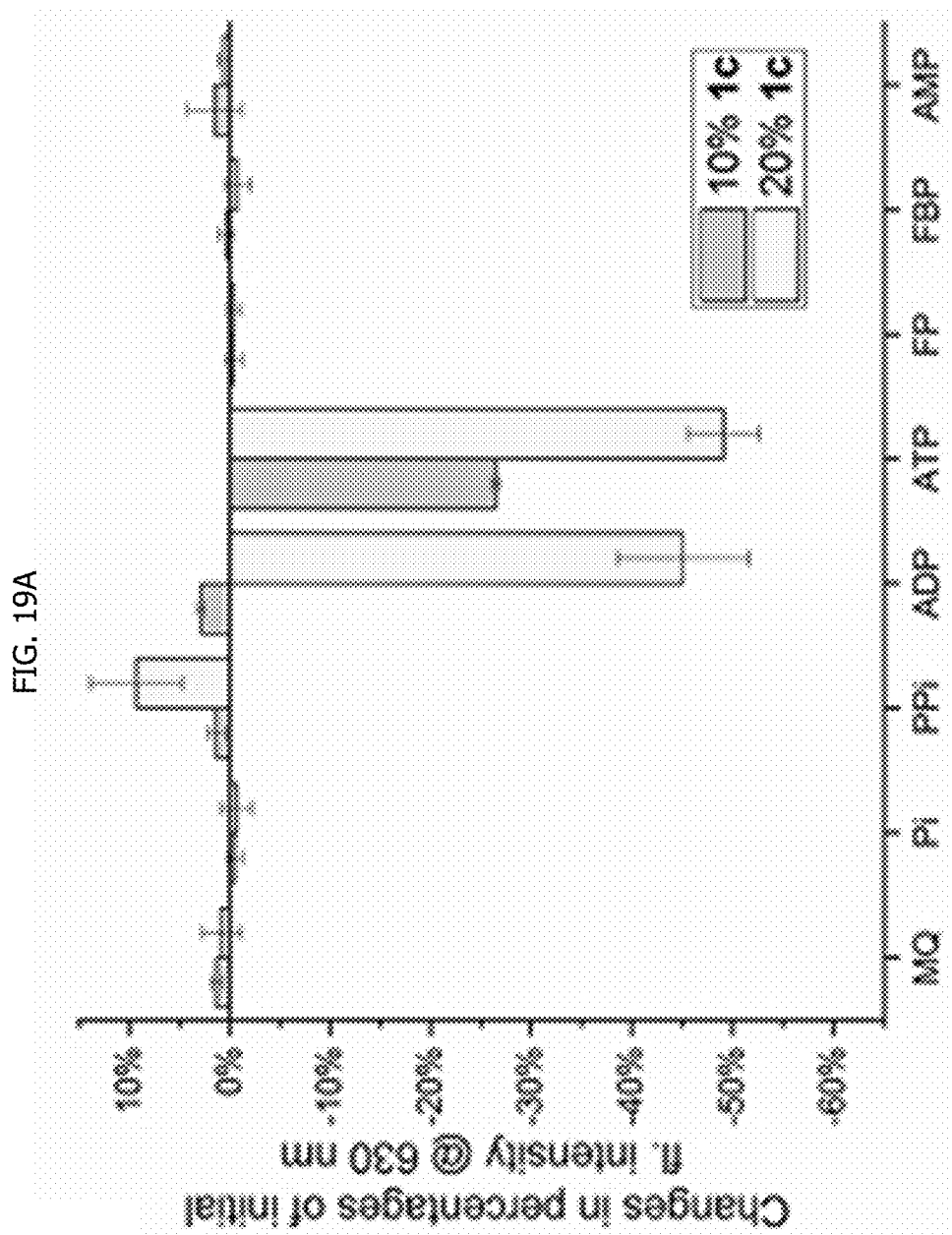

FIGS. 19A, 19B, 19C and 19D present information obtained from Nile Red release analysis of liposomes comprising the 1c lipid switch molecule at the indicated percentage (5%, 10% or 20%). FIG. 19A summarizes phosphorylated metabolite selectivity screen results. The indicated metabolite is on the x-axis; the change in percentage of the initial fluorescence intensity is shown on the y-axis. Liposomes comprised either 10% or 20% 1c lipid switch molecules. The fluorescence intensity of 20% 1c lipid switch molecule liposomes decreased significantly in response to both ATP and ADP, indicating NR release from the liposomes. The fluorescence intensity of 10% 1c lipid switch molecule liposomes decreased significantly in the presence of ATP, indicating release of NR from the 10% 1c liposomes. There was no decrease in fluorescence intensity of liposomes comprising 10% 1c lipid switch molecules and encapsulating NR in the presence of ADP.

Figure 19B:
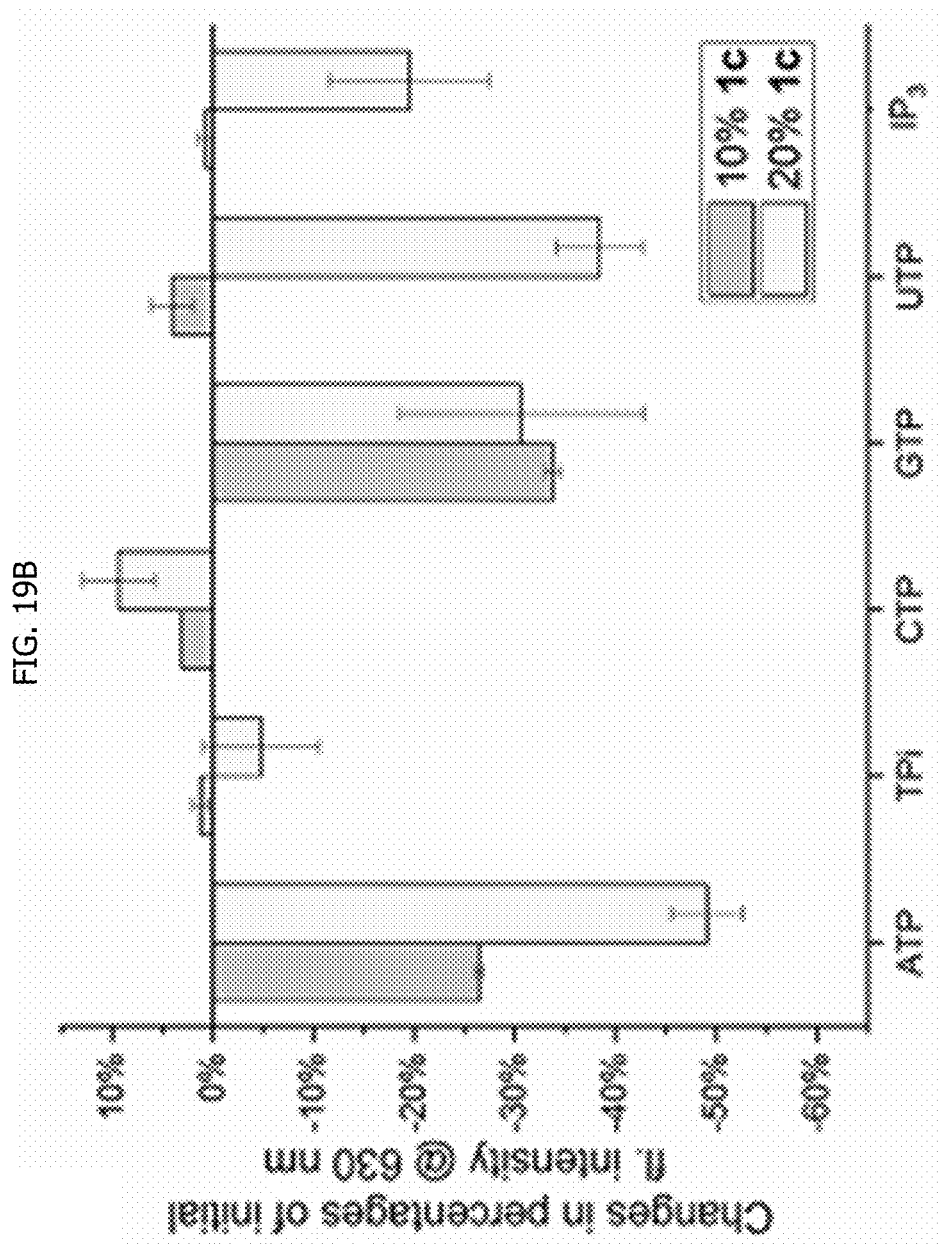

FIG. 19B summarizes results obtained from triphosphate metabolite selectivity screens with liposomes comprising 10% and 20% 1c lipid switch molecules and encapsulating NR. Liposomes comprising 20% 1c lipid switch molecules encapsulating NR exhibited a substantial decrease in fluorescence intensity in the presence of ATP, GTP, UTP and $IP_3$. The decrease in fluorescence intensity indicates release of the NR from the liposomes. Liposomes comprising 10% 1c lipid switch molecules encapsulating NR exhibited a substantial decrease in fluorescence intensity in the presence of ATP and GTP, indicating the 10% 1c liposomes are selectively responsive to ATP and GTP.

Figure 19C:
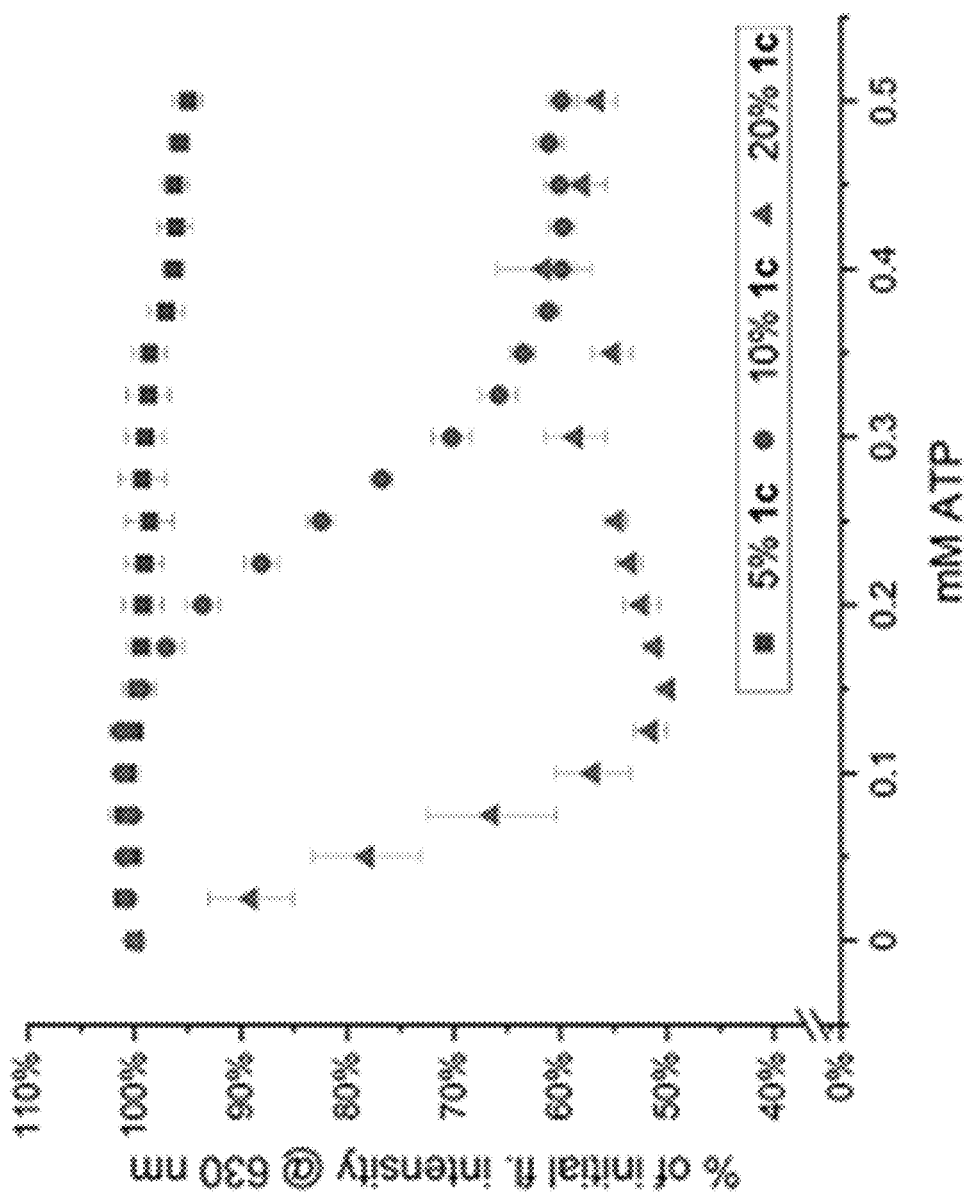

FIG. 19C summarizes results obtained from ATP titration experiments with 5%, 10% and 20% 1c lipid switch molecule liposomes. Liposomes comprising 10% and 20% 1c lipid switch molecules exhibited significant decreases fluorescence intensity in response to increasing ATP concentrations (x axis). Liposomes comprising 20% 1c lipid switch molecules exhibited a decrease in fluorescence intensity at less than 0.1 mM ATP. Liposomes comprising 10% 1c lipid switch molecules exhibited a significant substantial decrease in fluorescence intensity at a higher ATP concentration. Liposomes comprising 5% 1c lipid switch molecules exhibited no substantial decrease in fluorescence intensity at any ATP concentration up to and including 0.4 mM ATP.

Figure 19D:
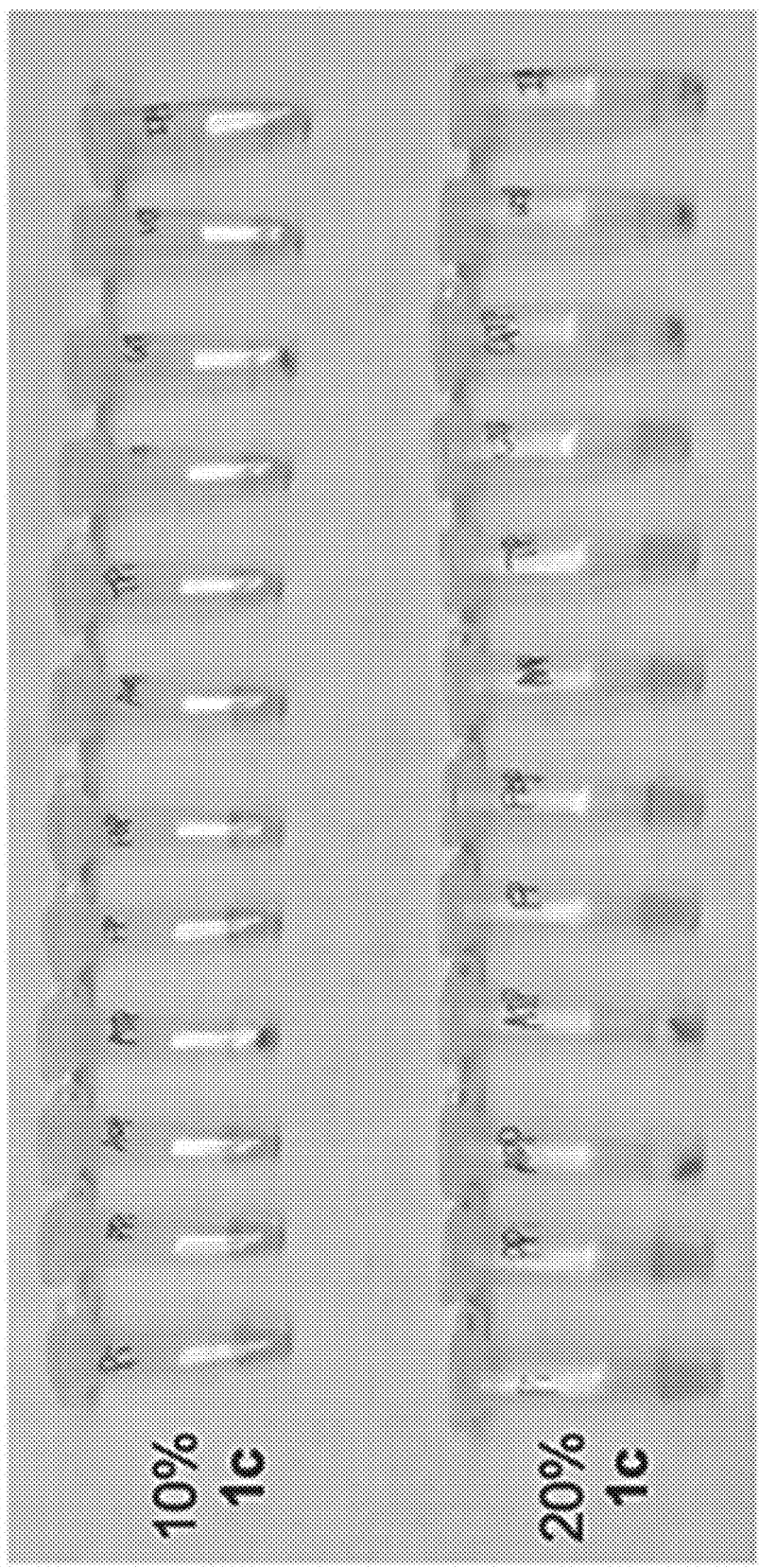

FIG. 19D provides a photograph of the microtubes taken during one of the phosphorylated molecule and triphosphate metabolite selectivity screens. The top row shows tubes containing liposomes with 10% 1c lipid switch molecules; the bottom row shows tubes containing liposomes with 20% 1c lipid switch molecules. The tubes contained the indicated phosphorylated molecule: Pi, PPi, ADP, ATP, FP, FBP, AMP, TPi, CTP, GTP, UTP and $IP_3$ (from left to right). With the 10% 1c liposomes a pink precipitate is visible in the tubes containing ATP and GTP indicating release of Nile Red in response to a target phosphorylated molecule. With the 20% 1c liposomes a pink precipitate is visible in the tubes containing ADP, ATP, GTP, UTP and IP3 indicating release of Nile Red in response to a target phosphorylated molecule.

Figure 20A:
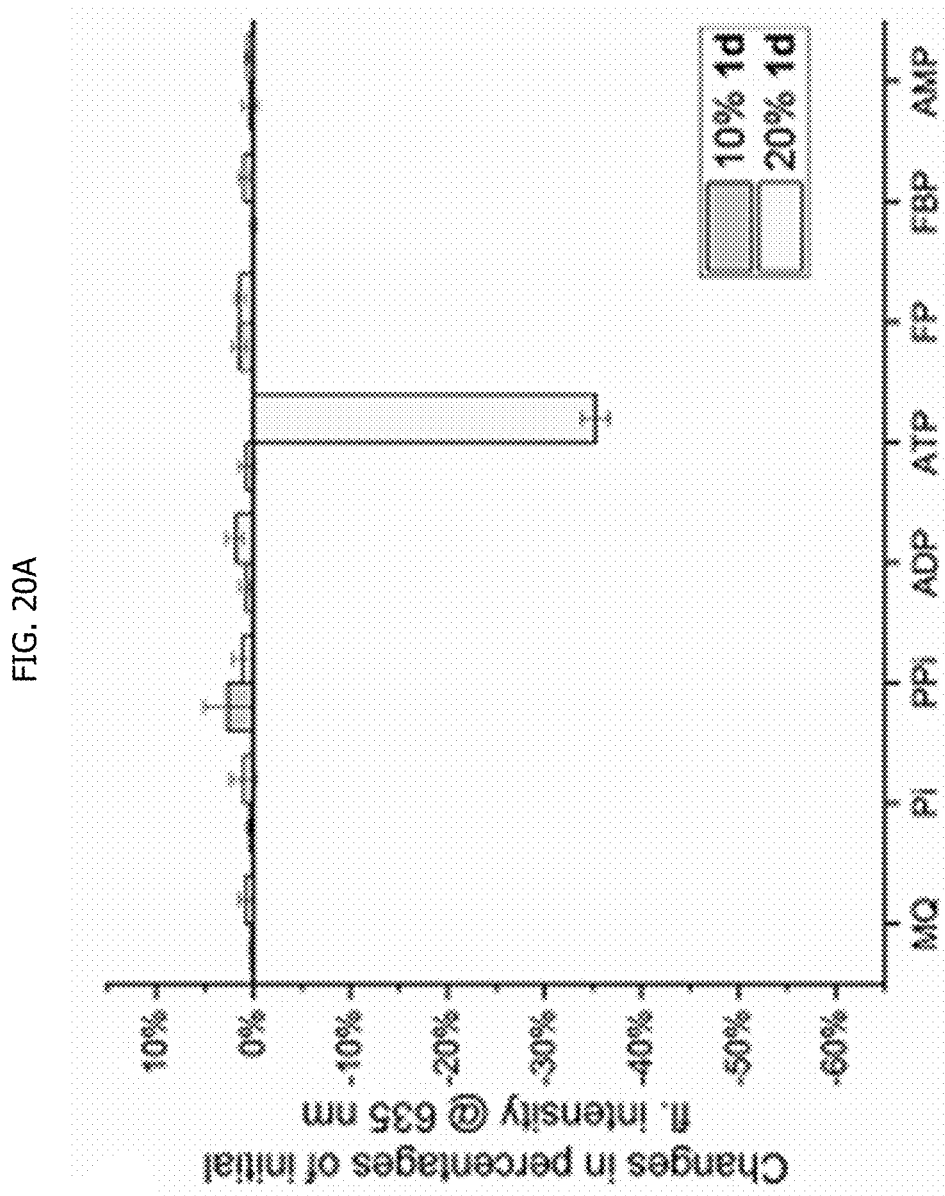

FIGS. 20A, 20B, 20C and 20D present information obtained from Nile Red release analysis of liposomes comprising the 1d lipid switch molecule at the indicated percentage (10% or 20%). FIG. 20A summarizes phosphorylated metabolite selectivity screen results. The indicated metabolite is on the x-axis; the change in percentage of the initial fluorescence intensity is shown on the y-axis. Liposomes comprised either 10% or 20% 1d lipid switch molecules. The fluorescence intensity of 20% 1d lipid switch molecule liposomes decreased significantly in response to ATP, indicating NR release from the liposomes. There was no decrease in fluorescence intensity of liposomes comprising 10% 1d lipid switch molecules and encapsulating NR in the presence of ATP. It is noted the 1d lipid switch molecule is a monomer molecule according to general formula II while the 1a, 1b, 1c and 2 lipid switch molecules are dimer molecules according to general formula I.

Figure 20B:
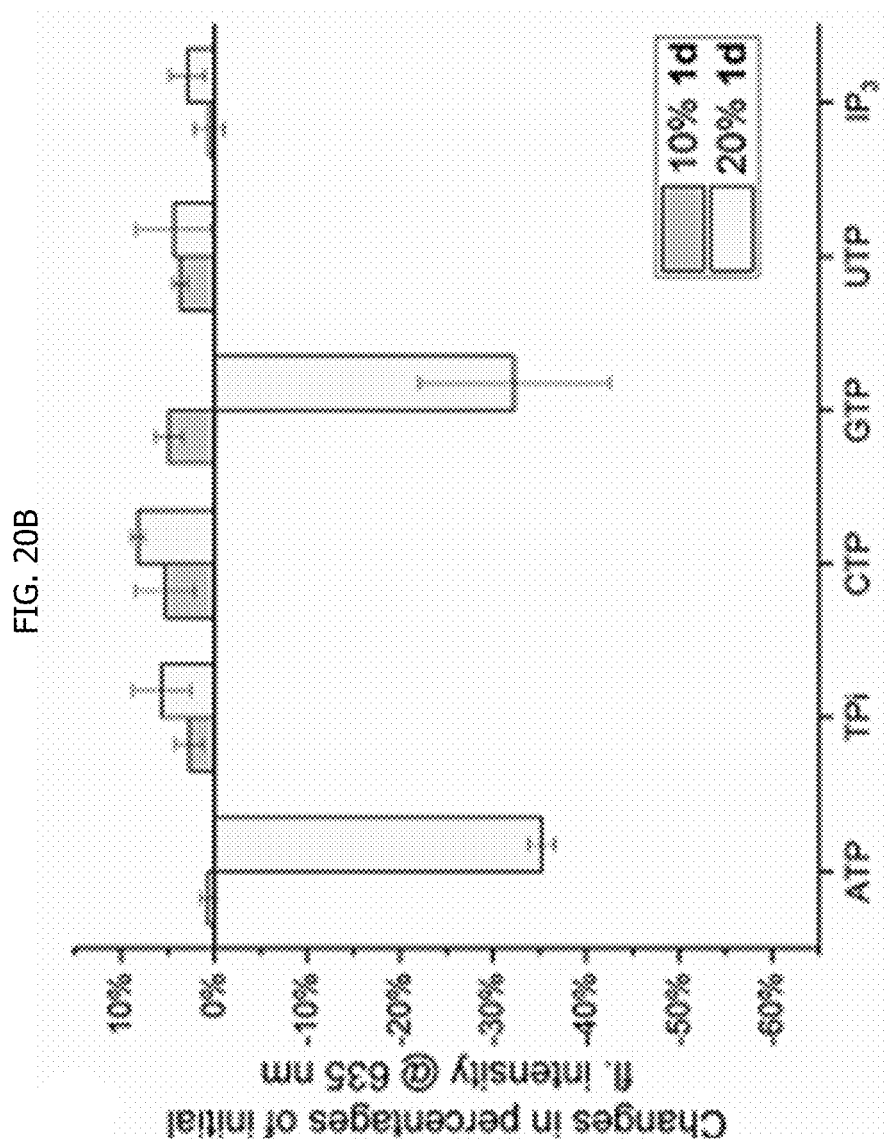

FIG. 20B summarizes results obtained from triphosphate metabolite selectivity screens with liposomes comprising 10% and 20% 1d lipid switch molecules and encapsulating NR. Liposomes comprising 20% 1d lipid switch molecules encapsulating NR exhibited a substantial decrease in fluorescence intensity in the presence of ATP and GTP. The decrease in fluorescence intensity indicates release of the NR from the liposomes.

Figure 20C:
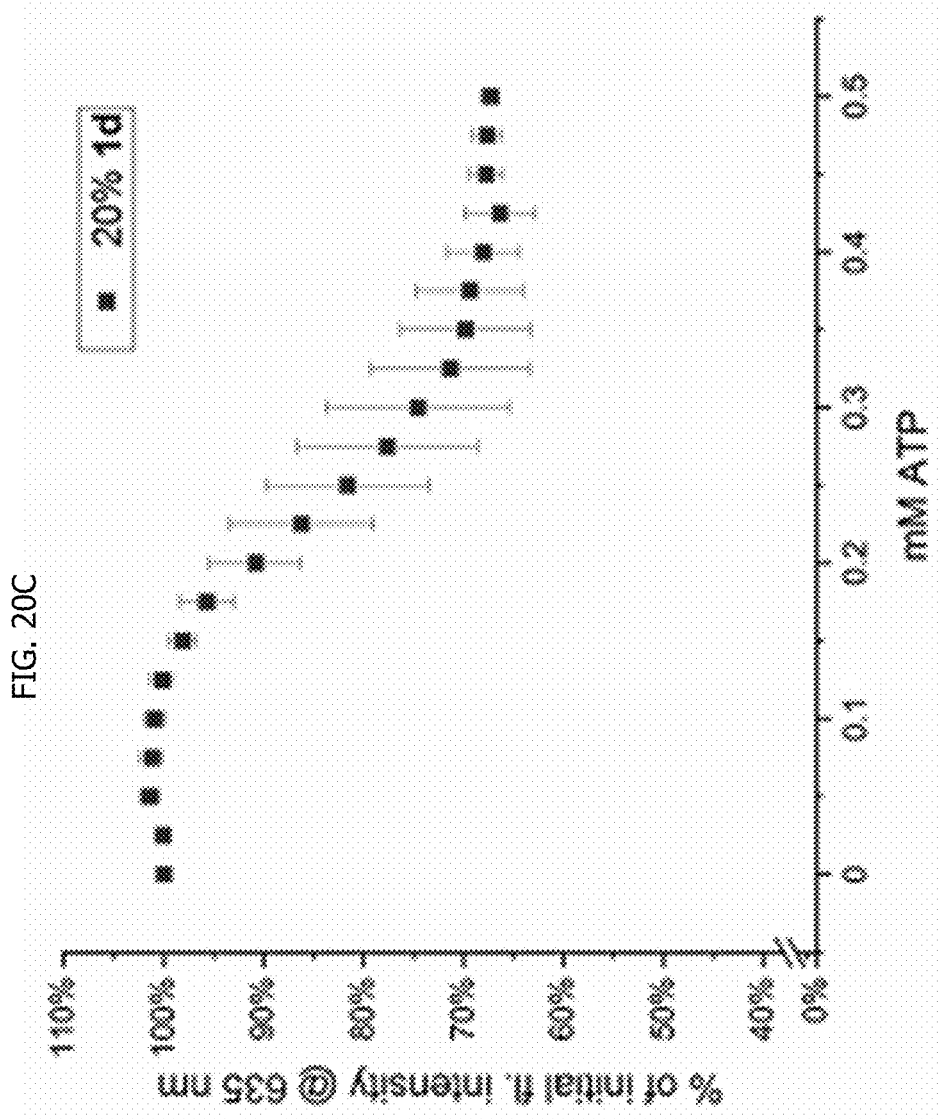

FIG. 20C summarizes results obtained from ATP titration experiments with 20% 1d lipid switch molecule liposomes. Liposomes comprising 20% 1d lipid switch molecules exhibited significant decreases fluorescence intensity in response to increasing ATP concentrations (x-axis). Liposomes comprising 20% 1d lipid switch molecules exhibited a decrease in fluorescence intensity at less than 0.2 mM ATP.

Figure 20D:
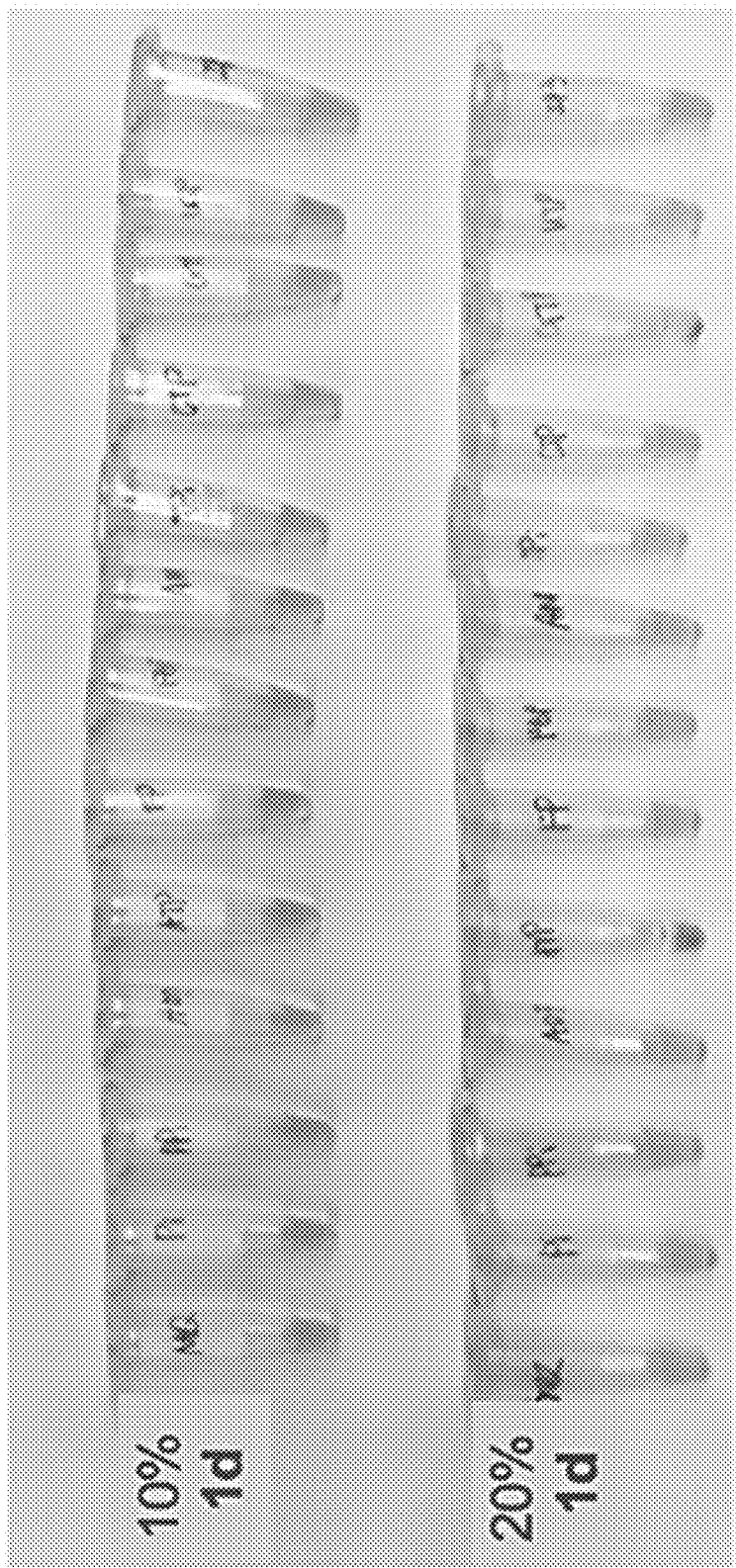

FIG. 20D provides a photograph of the microtubes taken during one of the phosphorylated molecule and triphosphate metabolite selectivity screens. The top row shows tubes containing liposomes with 10% 1d lipid switch molecules; the bottom row shows tubes containing liposomes with 20% 1d lipid switch molecules. The tubes contained the indicated phosphorylated molecule: MQ water (ctl), Pi, PPi, ADP, ATP, FP, FBP, AMP, TPi, CTP, GTP, UTP and $IP_3$ (from left to right). With the 20% 1d liposomes a pink precipitate is visible in the tubes containing ATP and GTP indicating release of Nile Red in response to a target phosphorylated molecule. With the 10% 1d liposomes no precipitate is visible in any of the tubes indicating limited or no release of Nile Red in response to any of the indicated phosphorylated molecules.

Figure 21C:
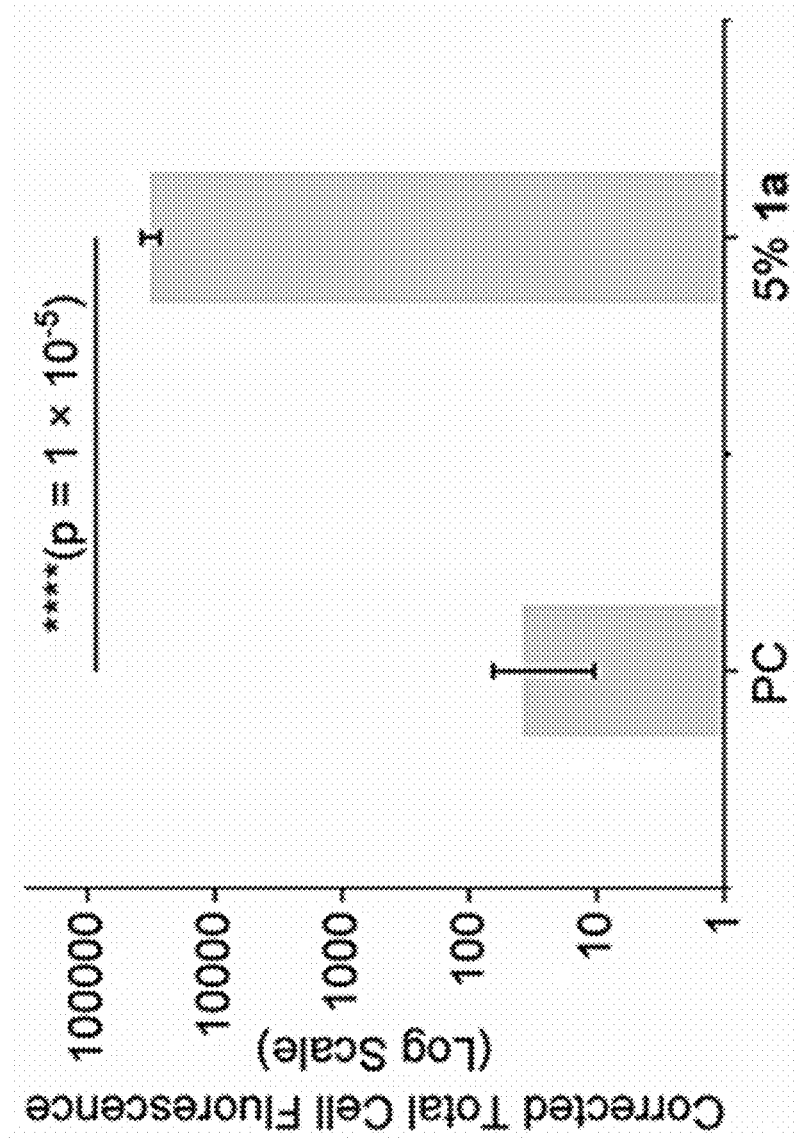

FIG. 21A provides a fluorescent micrograph of A375 cells treated with PC liposomes comprising 0% lipid switch molecules and Rd-PE for 30 minutes. Cells were stained with DAPI. Scale bars are 30 µm. Minimal cellular infiltration is visible. A375 is a human melanoma cell line. FIG. 21B provides a fluorescent micrograph of A375 cells treated with PC liposomes comprising 5% 1a lipid switch molecules and Rd-PE for 30 minutes. Cells were stained with DAPI. Scale bars are 30 µm. A substantial Rd-PE fluorescence is visible indicating cellular delivery of the liposomes. FIG. 21C provides a chart summarizing the increase in corrected total cell fluorescence (CTCF) via Image J. There is a significant, substantial increase in fluorescence in cells treated with liposomes comprising 5% 1a lipid switch molecules ($p=1.7 \times 10^{-5}$) versus cells treated with liposomes comprising 0% lipid switch molecules.

Figure 22:
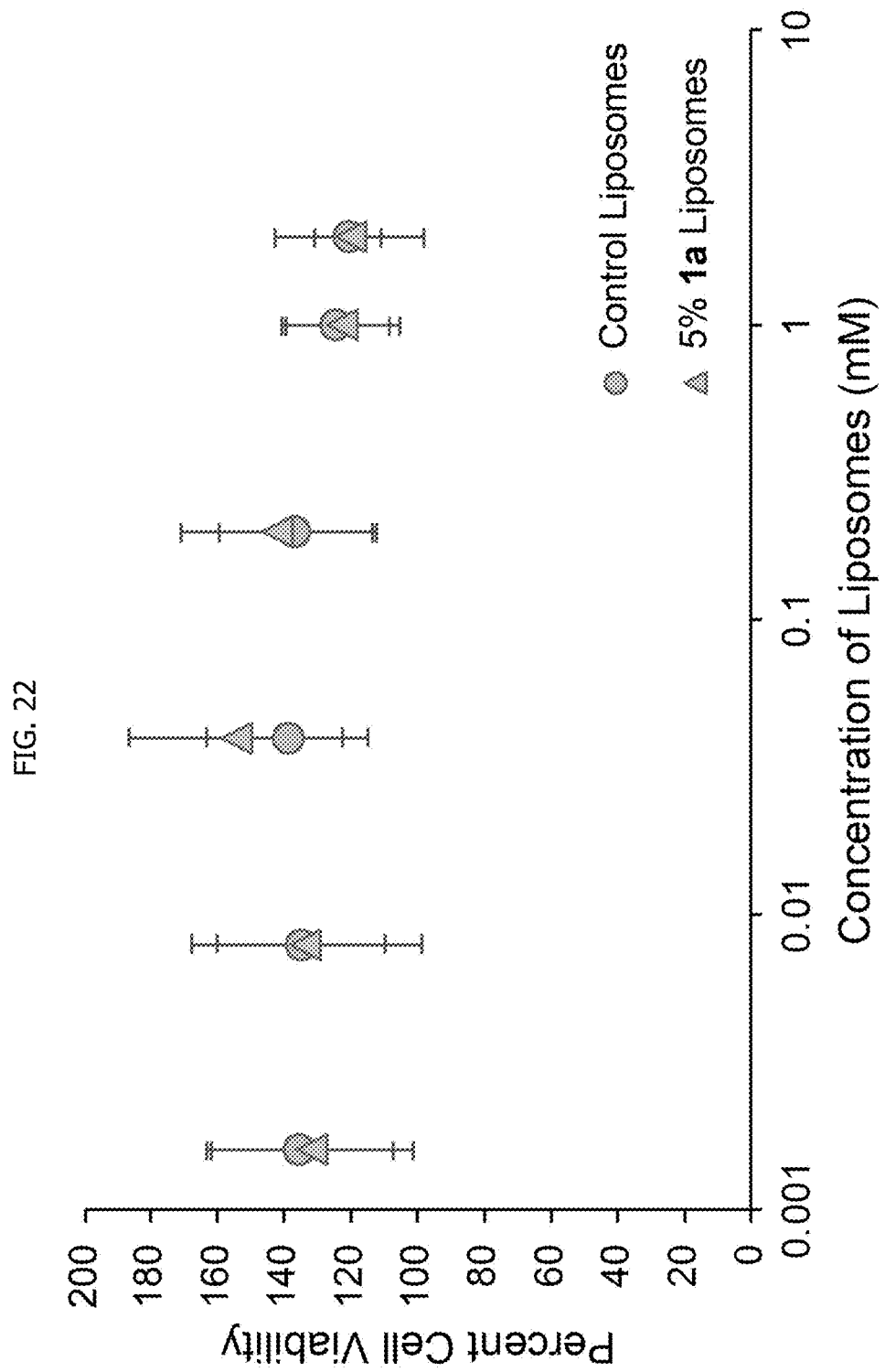

FIG. 22 presents a chart summarizing results obtained from an MTS cell viability evaluation. Cells were treated with a PC liposome control (circles) or liposomes comprising 5% 1a lipid switch molecules at varying concentrations for 30 minutes. Liposome concentrations were 2 mM, 1 mM, 200 µM, 40 µM, 8 µM, 1.6 µM or 0 µM. Cells were washed and incubated for 24 hours followed by staining with MTS reagent. A viability of 100% corresponds to the viability of cells treated with buffer only (0 µM). Error bars indicate the standard deviation from the mean (n=3). Viability of cells treated with PC liposomes only and 5% 1a lipid switch molecule liposomes are similar at the indicated liposome concentrations. There was no significant difference in cell viability for cells treated with liposomes comprising lipid switch molecules versus cells treated with PC only liposomes.

Figures 23A, 23B:
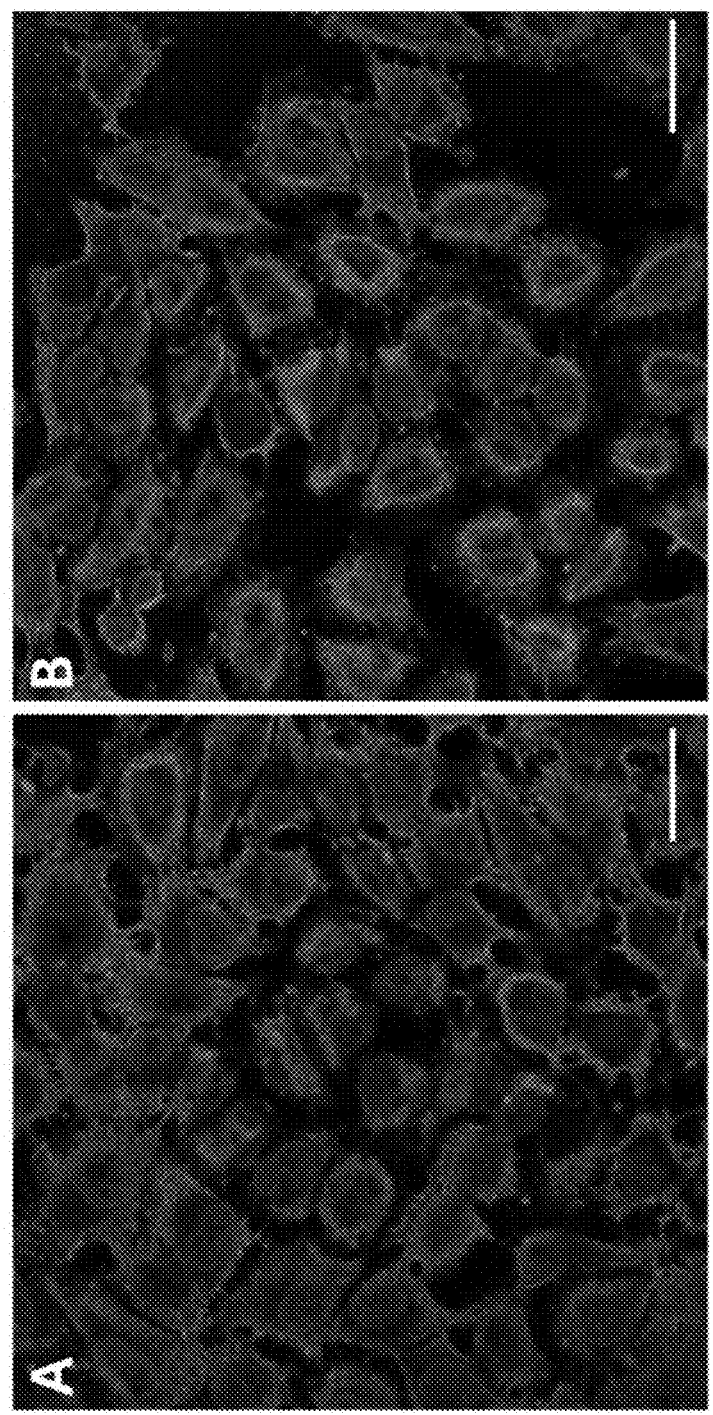
Figures 23C, 23D:
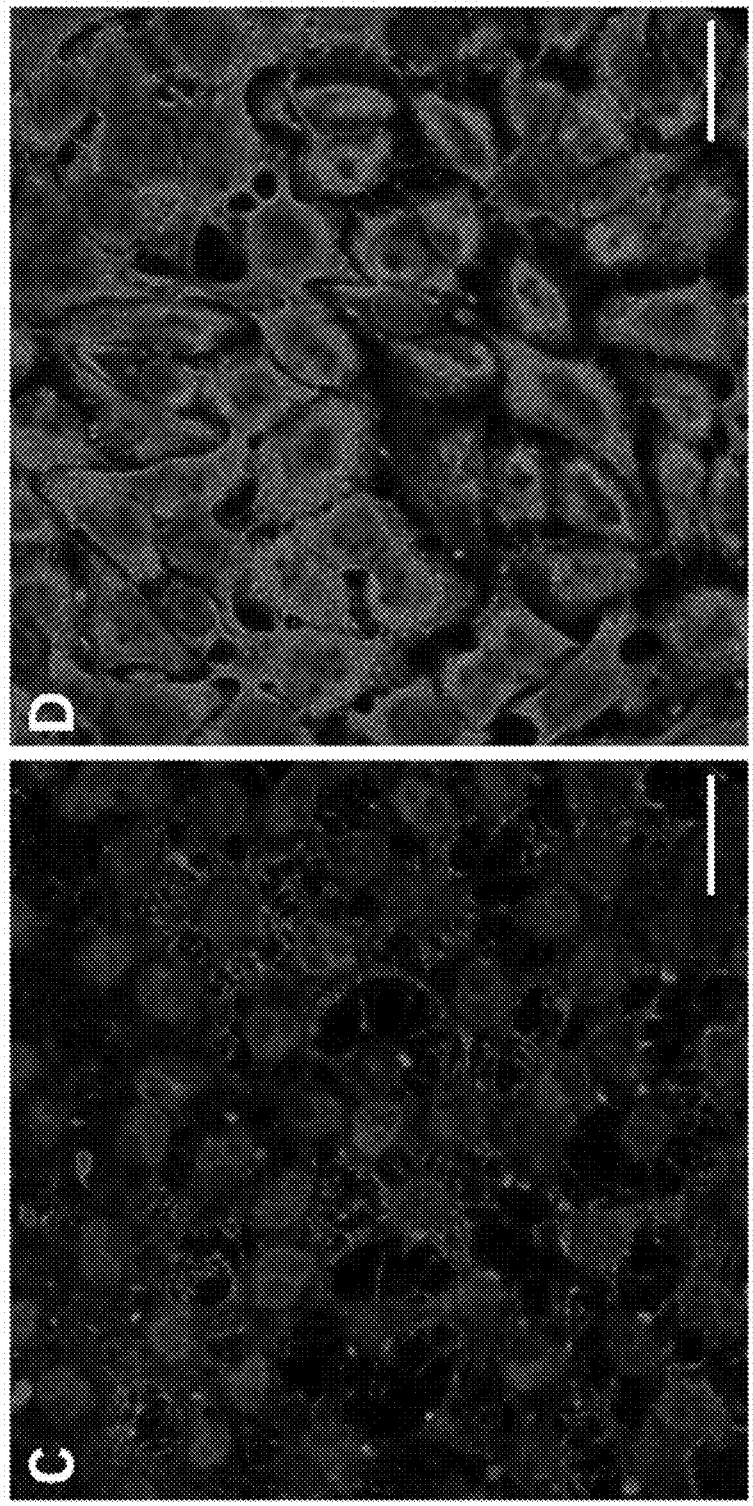
Figure 23E:
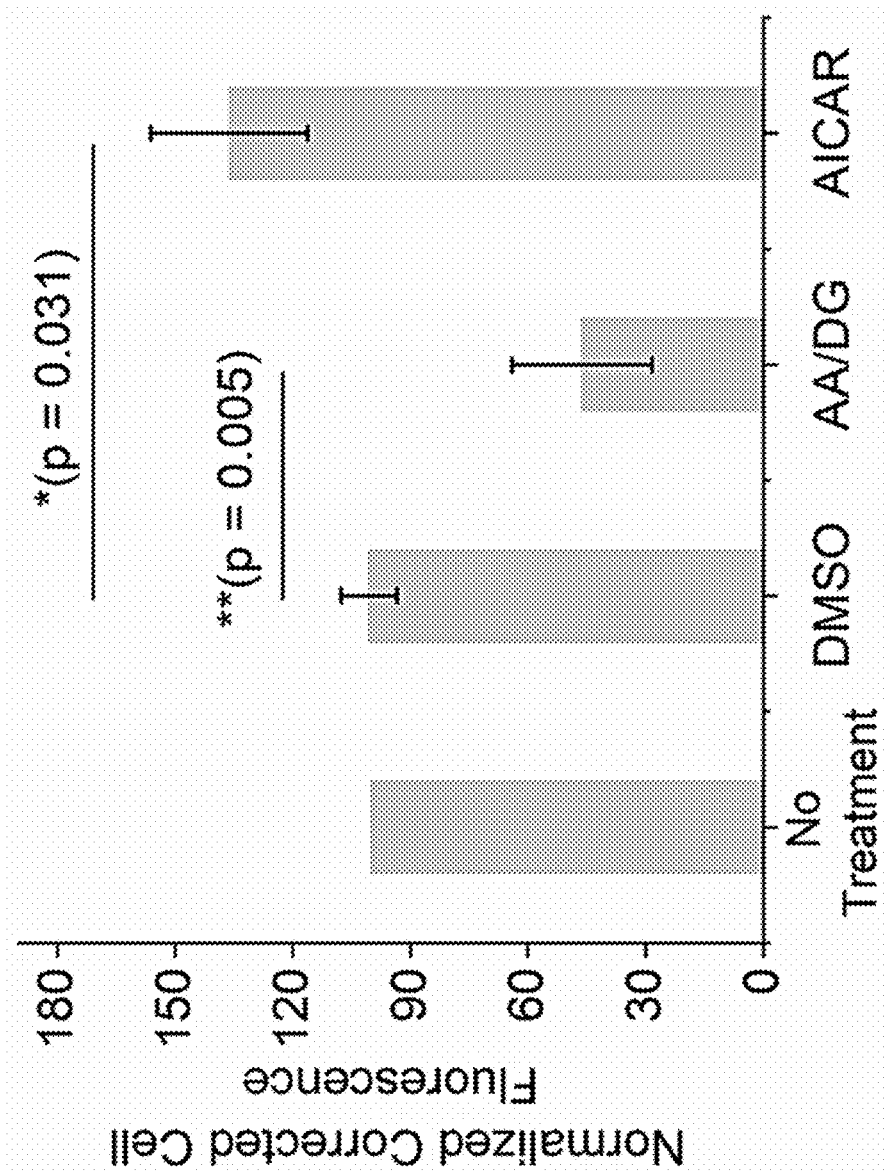

FIG. 23A provides a fluorescence micrograph of control cells followed by addition of 5% 1a lipid switch molecule liposomes comprising Rd-PE. The cells were stained with DAPI. 23B provides a fluorescence micrograph of control cells treated with diluted DMSO followed by addition of 5% 1a lipid switch molecule liposomes comprising Rd-PE. The cells were stained with DAPI. FIG. 23C provides a fluorescence micrograph of cells treated with AA/DG followed by addition of 5% 1a lipid switch molecule liposomes comprising Rd-PE. The cells were stained with DAPI. AA/DG decreases the ATP concentration in the cells. FIG. 23D provides a fluorescence micrograph of cells treated with AICAR followed by addition of 5% 1a lipid switch molecule liposomes comprising Rd-PE. The cells were stained with DAPI. AICAR increases the ATP concentration in the cells. FIG. 23E provides a chart summarizing Normalized Corrected Cell Fluorescence values for control cells, control cells treated with diluted DMSO, cells treated with AA/DG and cells treated with AICAR. There is a significant decrease in cell fluorescence in cells pre-treated with AA/DG. The decrease in cell fluorescence resulting from Rd-PE indicates a decrease in liposome uptake in cells with reduced ATP. Conversely, there is a significant increase in cell fluorescence in cells pre-treated with AICAR. The increase in cell fluorescence indicates an increase in liposome uptake in cells with increased ATP.

DETAILED DESCRIPTION

The application provides monomer and dimer molecules according to general formula (I) and (II).

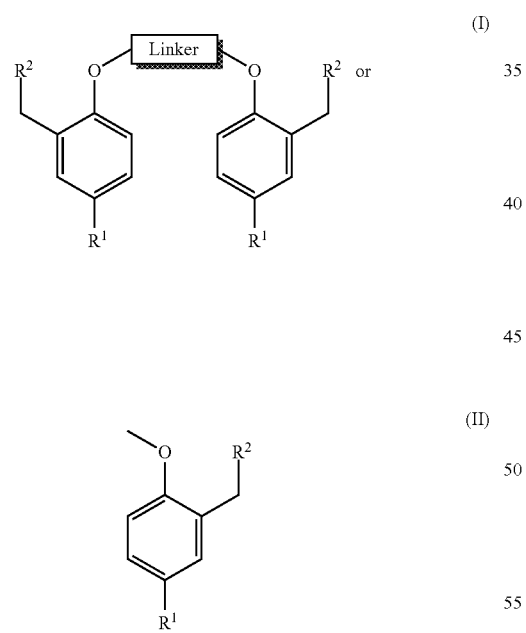

$R^1$ is a hydrophobic tail having at least 6 carbons. $R^2$ is selected from the group consisting of

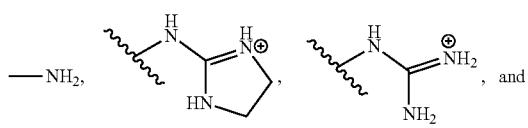

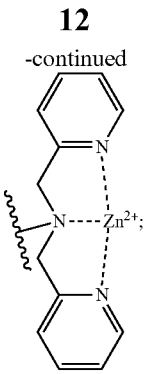

and the linker is a saturated carbon chain having 2 to 6 carbons or is a para-xylene linker. When $R^2$ is charged, anions of equivalent number are present to render the charge neutral.

In all aspects, the hydrophobic tail can include an aromatic ring. In some embodiments, the hydrophobic tail begins with the aromatic ring and has a saturated carbon chain extending therefrom that comprises 4 to 10 carbons. In one embodiment, the hydrophobic tail begins with an aromatic ring and has a saturated carbon chain extending therefrom that comprises 9 carbons.

In one embodiment of the monomer molecule, $R^1$ is nonylphenyl and $R^2$ is the zinc (II) dipicolylamine (ZnDPA). This molecule is referred to herein in the Examples as "1d".

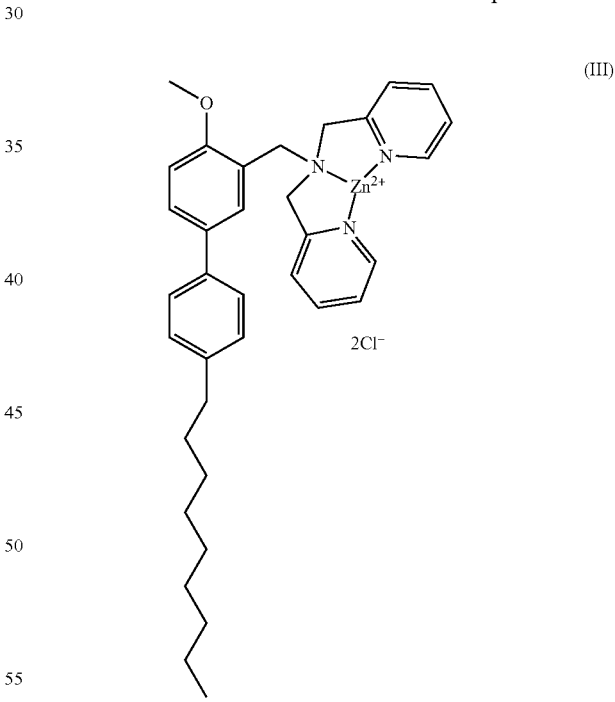

In other aspects, the hydrophobic tail can be a saturated carbon chain having 6 to 18 carbons (each integer between 6 and 18 is possible as the length of the carbon chain).

In one embodiment, $R^1$ is a hydrophobic tail that is a saturated carbon chain having 12 carbons, $R^2$ is ZnDPA and the molecule is a dimer.

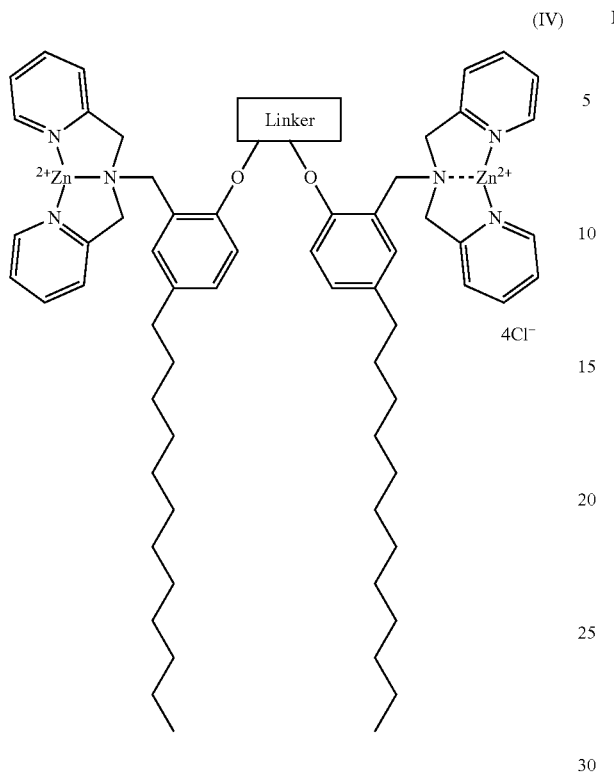

(IV)

4Cl⁻

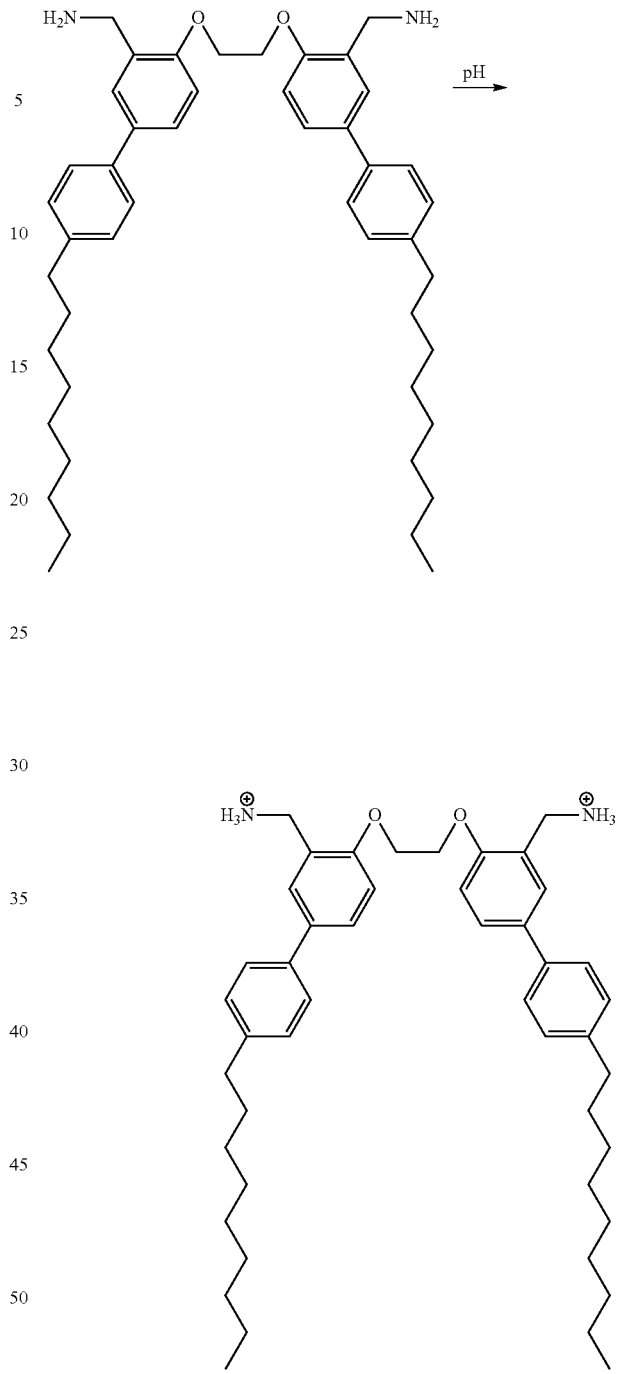

The linker can be a saturated carbon chain having 2 to 6 carbons or is a para-xylene linker. In one embodiment, the linker is an ethylene linker, a pentylene linker, a hexylene linker or a p-xylene linker

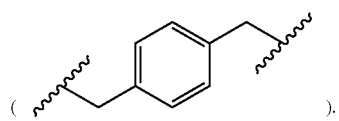 [SMILES: *Cc1ccc(C*)cc1]

In one embodiment, $R^1$ is nonylphenyl, $R^2$ is —NH$_2$, the molecule is a dimer and the linker is ethylene. For this dimer molecule, a change in pH can protonate the nitrogen of $R^2$.

In one embodiment, $R^1$ is nonylphenyl, $R^2$ is the zinc(II) dipicolylamine (ZnDPA), the molecule is a dimer. The linker can be a saturated carbon chain having 2 to 6 carbons or is a p-xylene linker. In one embodiment, the linker is can be ethylene, hexylene, or p-xylene

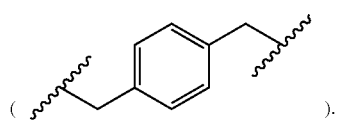 [SMILES: *Cc1ccc(C*)cc1]

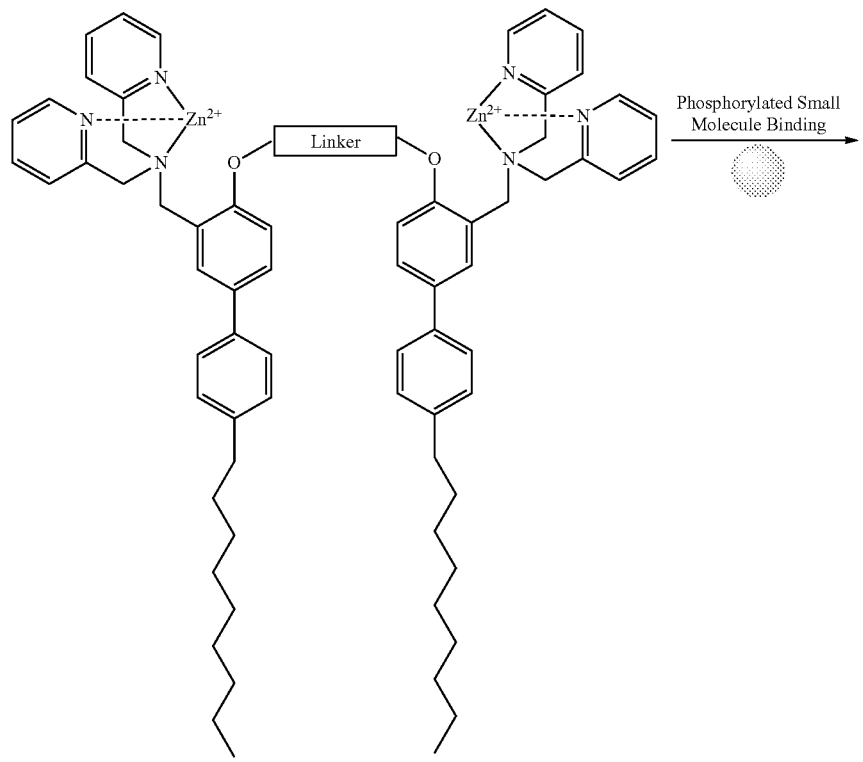

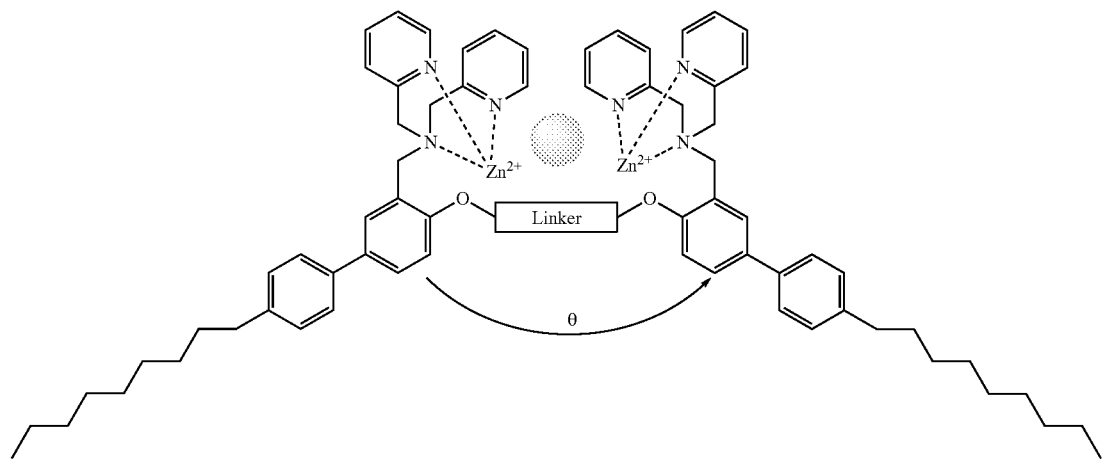

The unique characteristic of the dimer molecules alone and a pair of monomer molecules spaced coordinatingly within a liposome membrane is that the $R^2$ groups can bind a phosphorylated small molecule therebetween. The phosphorylated molecule can be selected form the group consisting of ATP, ADP, AMP, UTP, GTP, CTP, TTP, TPi and I P3. As represented by the chemical structures above, the binding of the phosphorylated molecule between the $R^2$ groups, conformationally changes the shape of the molecule. The change is from a generally compact structure in which the hydrophobic tails are generally parallel to one another (before) to an open position pivoted about the linker, where each of the hydrophobic tails have moved outward away from the original parallel orientation (increasing the cone angle $\theta$) and results in a generally conical shape. Before, the molecule has a generally cylindrical structure. The linker's chain length changes the cavity size between the $R^2$ groups and the flexibility of the dimer. Phosphorylated molecules of particular interest are ATP and ADP.

In one embodiment, $R^1$ is nonylphenyl, $R^2$ is

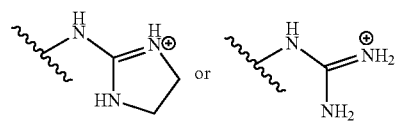

and the molecule is a dimer. The linker may be any of those noted above. In one embodiment, the linker is ethylene.

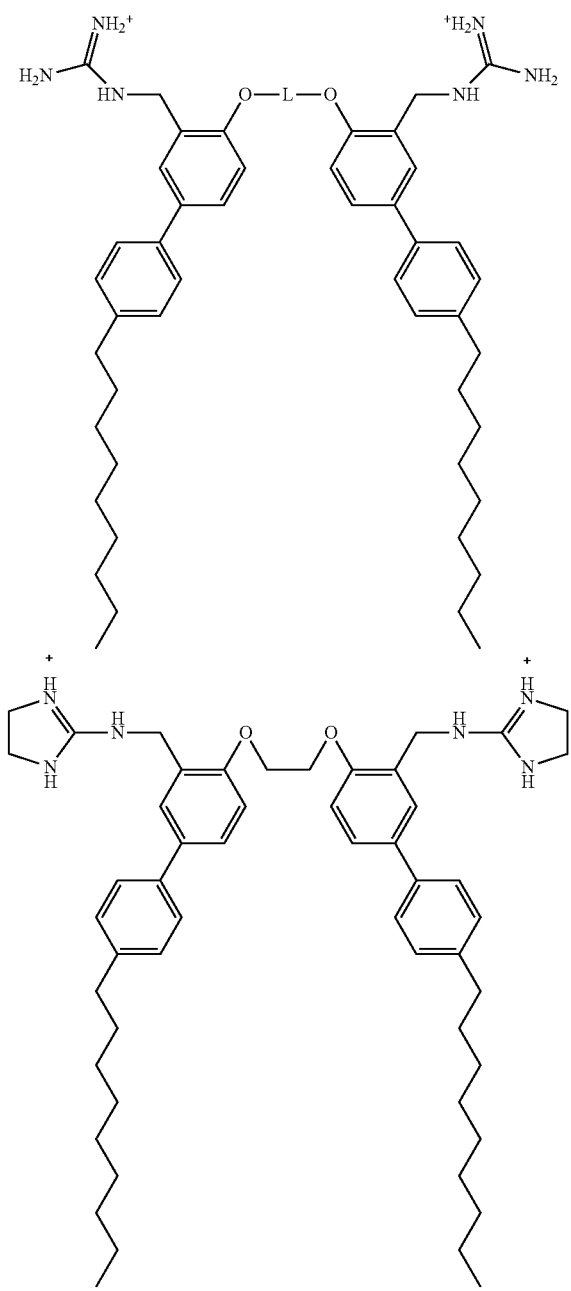

Figure 1:
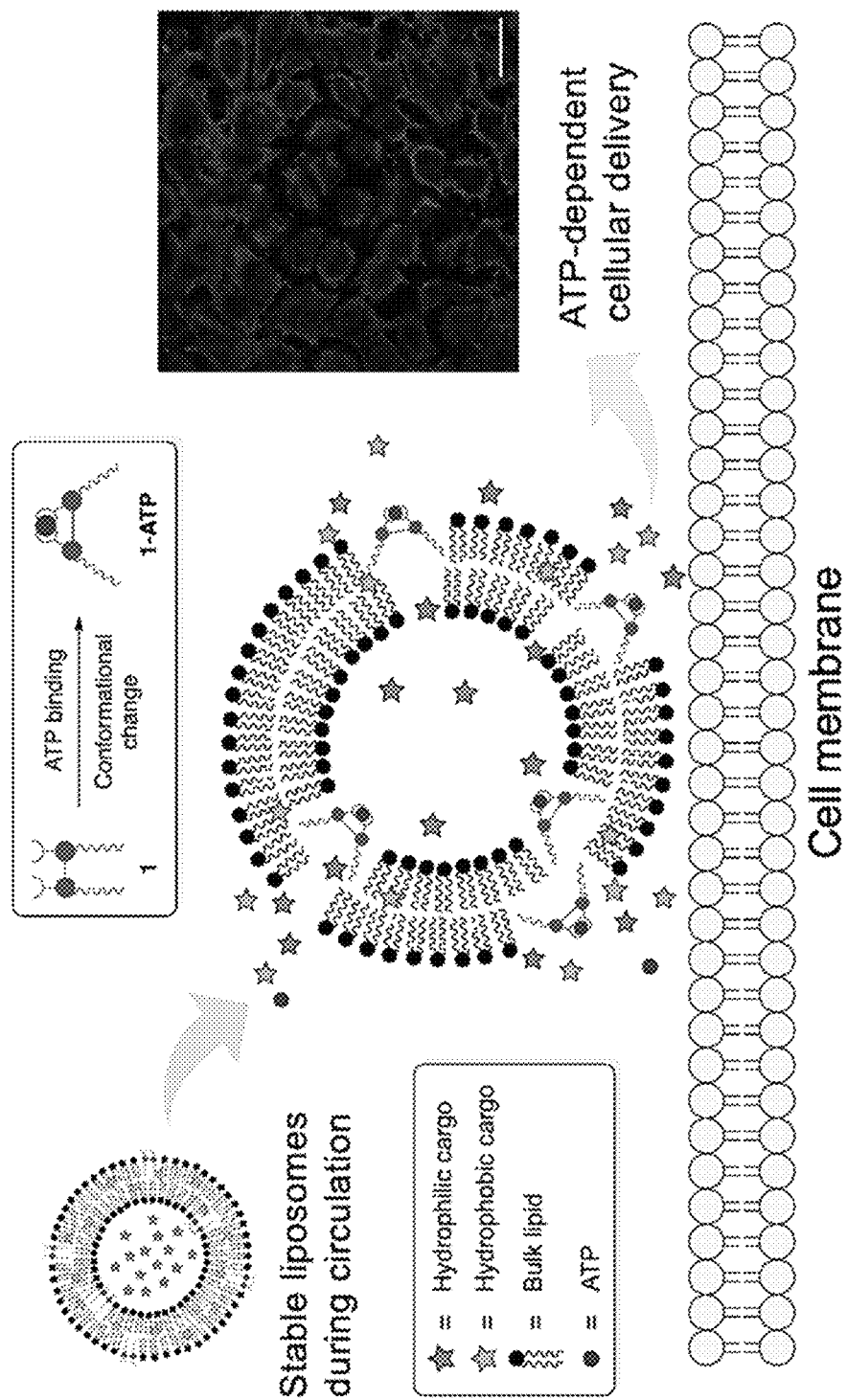
FIG. 1 provides a cartoon depiction of a selectively responsive liposome comprising lipid switch molecules prior to binding the target molecule (upper left) and after binding a target molecule. The selectively responsive liposome comprises a hydrophobic or a hydrophilic compound as a cargo therapeutic agent. Hydrophobic compounds are carried in the lipid membrane, while hydrophilic compounds are encapsulated by the selectively responsive liposome. Upon binding a target such as ATP, the lipid switch molecules undergo a conformational change that disrupts the liposome membrane. The change in shape results in release of the therapeutic agent from the liposome and target driven delivery of a therapeutic agent.
Figure 2A:
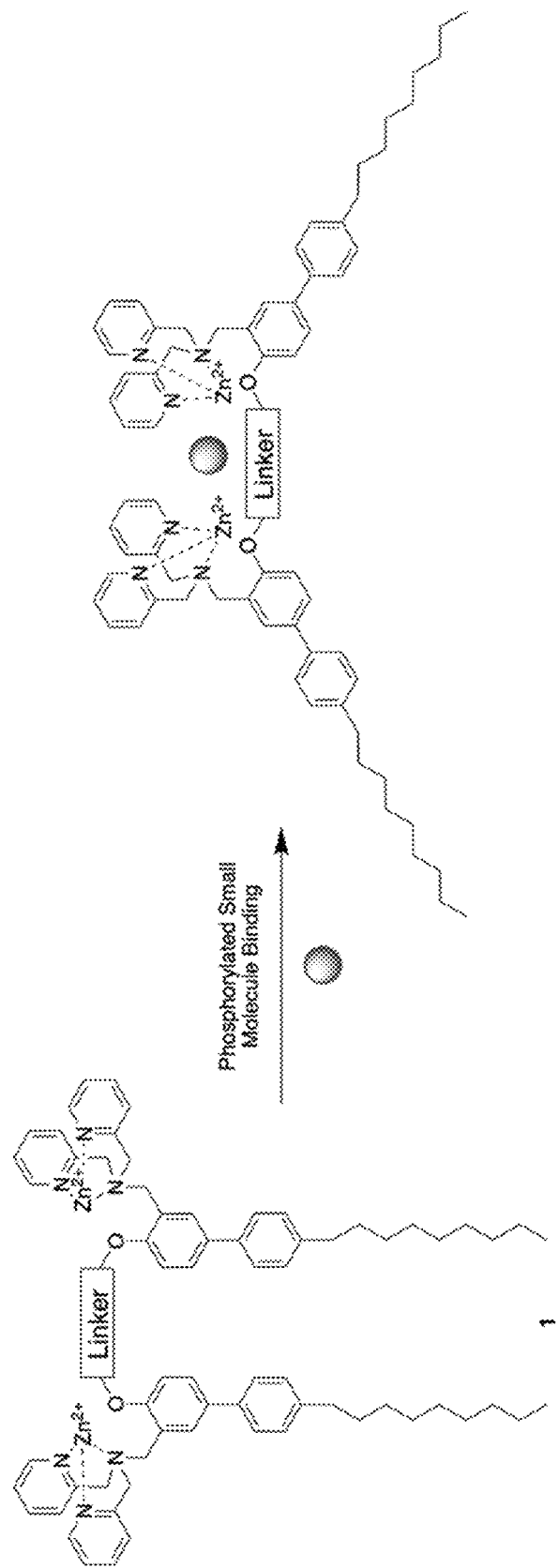
FIG. 2A depicts an example of one type of lipid switch molecule and the effect of binding a target molecule. This example of a dimer molecule comprises 2 $R_2$ units, a linker and 2 $R_1$ units. The cartoon depicts binding of a phosphorylated small molecule and the resulting conformation change. The type of lipid switch molecule depicted herein is designed to adopt a cylindrical structure in the membrane when not bound to a target molecule. Binding of a target molecule to the lipid switch molecule leads to increased cone angle and non-bilayer properties.
Figure 2B:
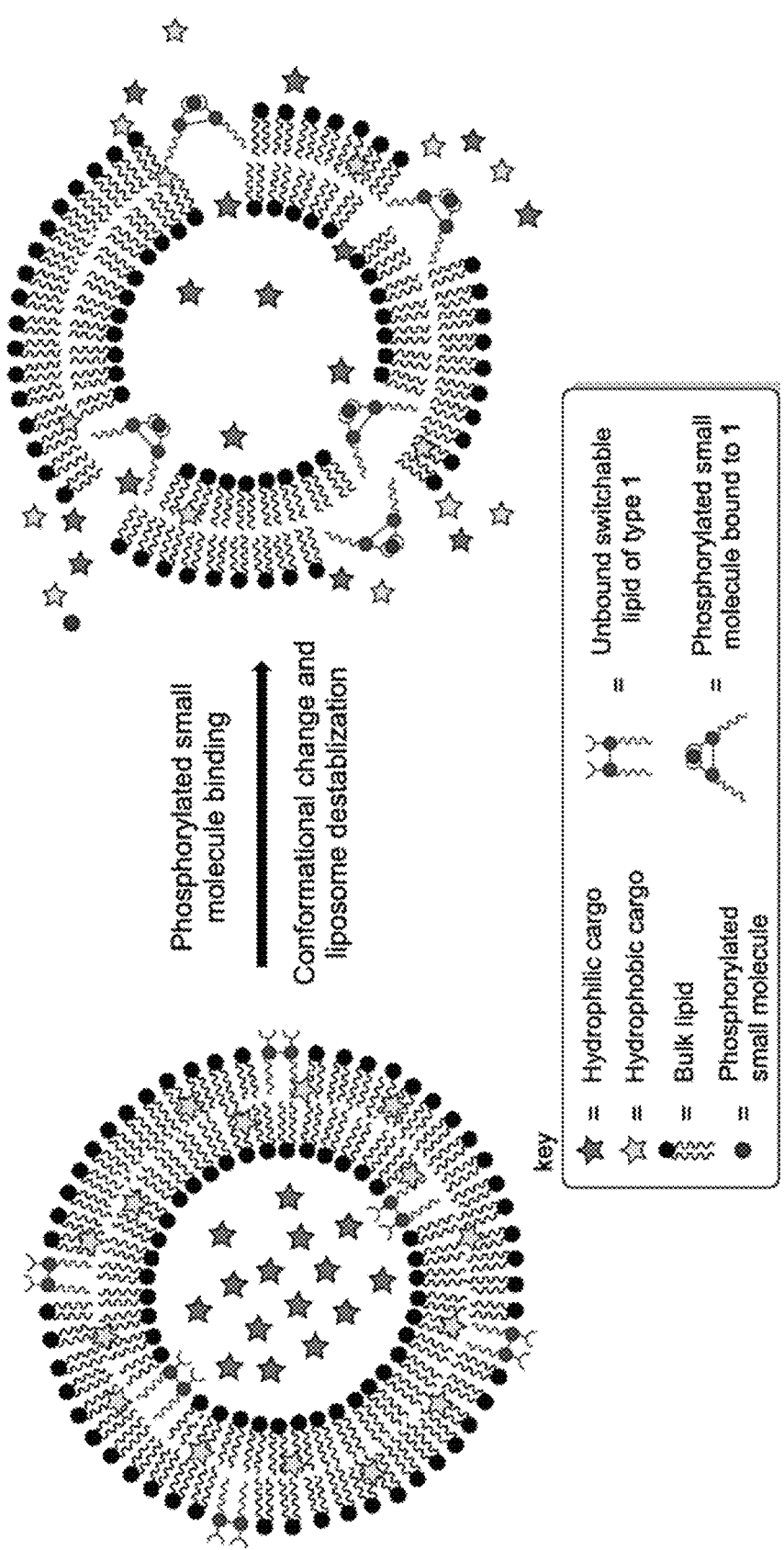
FIG. 2B depicts the general design of a selectively responsive liposome. In this example the target is a phosphorylated small molecule. Upon binding of a target or guest molecule, the conformational change of the lipid switch molecule disrupts membrane integrity and releases a cargo compound such as a therapeutic agent.

When monomer or dimer molecules of the current application are incorporated into liposomes as part of the liposomal membrane, they function as lipid switch molecules. A lipid switch molecule is a molecule that upon binding a preselected target molecule between the $R^2$ groups changes shape, which destabilizes a liposome's membrane thereby releasing a therapeutic agent stored within the liposome. This "switch" functionality is exemplified in FIGS. 1 and 2B. Selectively responsive liposomes to phosphorylated small molecules are created herein based on the selection of the $R^2$ groups and the percentage of the monomer or dimer molecules in the liposome membrane. By "conformational change" is intended an alteration in shape.

Phosphorylated molecules are of particular interest as a target for responsive liposomes since the introduction of phosphate groups into biomolecules is a critical means for regulating biological function. For example, ATP occurs in high concentrations in biological systems, yet is tightly regulated in biological systems. ATP is a universal energy source that controls vital biological processes including signaling, energy transduction, regulation of cellular metabolism and DNA replication. ATP exhibits low concentrations in the extracellular space of healthy tissues (0.01-0.1 mM) (see Gilbert et al 2019 *Oncogene* 38-194-208). Increases in ATP concentration up to the high mM rage are associated with tumors and cancers resulting from conditions including hypoxia, inflammation and mechanical stress. Increases in extracellular ATP concentration are also associated with activation of inflammatory responses and with inflammation. The selectively responsive liposomes of the current application may be used to deliver a therapeutic agent to any region of a subject with elevated levels of the target phosphorylated molecule. Regions with elevated levels of ATP include but are not limited to cancers, cancer cells, tumors, tumor cells, inflamed tissue and regions which are experiencing an immune response.

The following passages describe different aspects of the invention in greater detail. Each aspect, embodiment, or feature of the invention may be combined with any other aspect, embodiment, or feature the invention unless clearly indicated to the contrary.

Definitions

The terms "a" and "an" are defined as one or more unless this disclosure explicitly requires otherwise. "A", "an", and "the", as used herein, can include plural referents unless expressly and unequivocally limited to one referent.

Percent of dimer or monomer molecule according to general formula (I) or (II) in a liposome refers to mole percent. All temperatures are in degrees Celsius (° C.) unless otherwise specified.

Ranges may be expressed herein as from "about" one particular value, and/or to "about" another particular value. When such a range is expressed; +/−5% or more preferably +/−2% is included. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the disclosed methods or compositions can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

As used herein, the terms "treat," "treating," "treatment," and the like refer to reducing or ameliorating a disorder and/or symptoms associated therewith. It will be appreciated that, although not precluded, treating a disorder or condition does not require that the disorder, condition or symptoms associated therewith be completely eliminated. The term "ameliorating" with reference to a disease or pathological condition refers to any observable beneficial effect of the treatment. The beneficial effect can be evidenced, for example, by a delayed onset of clinical symptoms of the disease in a susceptible subject, a reduction in severity of at least one clinical symptom of the disease, a slower progression of the disease, an improvement in the overall health or well-being of the subject or by other parameters well known in the art that are specific to a particular disease. It is recognized that a reduction in severity of at least one clinical symptom of the disease does not require an alteration or reduction in severity of another clinical symptom of the disease.

As used herein, "administration" or "administering" refers to the introduction of a composition into a subject by a chosen route. For example, if the chosen route is injection, the compositions described herein may be administered by intraperitoneal or intravenous injection. Administration can be affected or performed using any of the various methods and delivery systems known to those skilled in the art. The administering can be performed, for example, but not limited to, intravenously, orally, via implant, transmucosally, transdermally, topically, intramuscularly, intra-articularly, subcutaneously or extracorporeally. In certain embodiments, the liposomes of the current application may be locally or systemically administered to relevant tissues ex vivo or in vivo through, for example, but not limited to, injection, infusion or stent.

The liposomes of the current application may be used to evaluate samples removed from a subject prior to, during or after surgery. It is particularly envisioned that the selectively responsive liposomes and the agent contained therein may be used to evaluate samples obtained when excising a cancerous or pre-cancerous region during or after surgery.

As used herein, the terms "prevent," "preventing," "prevention," "prophylactic treatment" and the like are encompassed within the term "treating," and refer to reducing the probability of developing a disorder or condition in a subject, who does not have, but is at risk of or susceptible to developing a disorder or condition.

As used herein, "effective amount" or "suitable amount" or "therapeutically effective amount" refers to an amount of a substance sufficient to effect the beneficial or desired clinical or biochemical results. An effective amount may be administered one or more times. For example, an effective amount of a composition as described herein is an amount that has a sufficient number of liposomes or selectively responsive liposomes to deliver a desired dosage of the selected therapeutic agent for the selected treatment, regardless of whether the treatment is for an acute condition or a chronic condition. The effective amount may be delivered in a single dose or in multiple doses over any pre-selected period of time, for example, once during a procedure for treatment of an acute condition, or daily, weekly, or monthly regimens for chronic conditions, more specifically, hourly, three or four times daily, twice daily, once daily, once or twice weekly over a week, month or multiple months up to and including years. It is recognized that an effective amount for identification purposes may be different from an effective amount for treatment purposes.

As used herein, a "subject" refers to an animal, including a vertebrate. The vertebrate may be a mammal, a domesticated animal or an animal receiving veterinary care, or for example a human. The subject may be a human patient. A subject may be a patient suffering from or suspected of suffering from a disease or condition and may be in need of treatment or diagnosis or may be in need of monitoring for the progression of the disease or condition. The subject may also be on a treatment therapy that needs to be monitored for efficacy.

As used herein, "pharmaceutically acceptable" means physiologically tolerable, for either human or veterinary applications. In addition, "pharmaceutically acceptable" is meant a material that is not biologically or otherwise undesirable, i.e., the material may be administered to a subject without causing any undesirable biological effects or interacting in a deleterious manner with any of the other components of the pharmaceutical composition in which it is contained. Essentially, the pharmaceutically acceptable material is nontoxic to the recipient. The carrier would naturally be selected to minimize any degradation of the active ingredient and to minimize any adverse side effects in the subject, as would be well known to one of skill in the art. For a discussion of pharmaceutically acceptable carriers and other components of pharmaceutical compositions, see, for example, Remington's Pharmaceutical Sciences, 18th ed., Mack Publishing Company, 1990.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the described invention, the preferred methods and materials are now described. All publications mentioned herein are incorporated herein by reference to disclose and describe the methods and/or materials in connection with which the publications are cited.

As broadly defined and exemplified herein a liposome is a spherical vesicle having at least one lipid bilayer. As disclosed herein the present liposomes can be used as a vehicle for administration of nutrients and pharmaceutical drugs. In addition, the formulator can modify the disclosed methods and processes to achieve surface modification of the liposome. Such modifications can enhance the delivery of the active pharmaceutical ingredients or cell-penetrating peptides to their intended biological target.

Entrapped in the liposomes is a therapeutic agent for delivery intracellularly to target cells. A variety of therapeutic agents can be entrapped in the liposomes, including water-soluble (hydrophilic) agents that can be stably encapsulated in the aqueous compartment of the liposome (i.e., the core), lipophilic compounds that stably partition in the lipid phase of the vesicles, hydrophobic agents that can be carried within the lipid bilayer, and combinations thereof. Exemplary water-soluble compounds include small, water-soluble organic compounds, peptides, proteins, DNA plasmids, oligonucleotides, gene fragments, anti-cancer agents, anti-tumor agents, chemotherapy agents, hormones, antimicrobial agents. The liposome-entrapped compound may also be an imaging agent for tracking progression of a disease. Imaging agents include, but are not limited to, dyes, labels, and chelates of radionuclides.

The entrapped agent may also be a reporter molecule, such as an enzyme or a fluorophore, for use in in vitro diagnostic assays. Such liposomes having an entrapped reporter molecule may be delivered by fusion to either target cells or receptor-containing liposomes.

In one embodiment, the compound is useful for treatment of a plasma cell disorder, such as multiple myeloma, which is characterized by neoplasms of B-lymphocyte lineage cells. Therapeutic agents preferred for treatment of multiple myeloma include melphalan, cyclophosphamide, prednisone, chlorambucil, carmustine, dexamethasone, doxorubicin, cisplatin, paclitaxel, vincristine, lomustine, and interferon. Typical doses for standard chemotherapy treatment for some of these drugs are as follows: melphalan, 8 mg/m$^2$ body surface area per day; cyclophosphamide, 200 mg/m$^2$ per day; chlorambucil, 8 mg/m$^2$ per day; prednisone 25-60 mg/m$^2$ per day, vincristine (1.4 mg/m$^2$) and doxorubicin (60-75 mg/m$^2$).

Also contemplated is intracytoplasmic delivery of plasmids, antisense oligonucleotides, and ribozymes for the treatment of cancer and viral infections.

In the present invention, the therapeutic agent is entrapped in the liposome, by methods discussed below, for administration parenterally to a subject. The dose used for liposome administration may initially be based on the standard chemotherapeutic dose and adjusted accordingly over the course of treatment by monitoring the disease progression.

The therapeutic agent can be a "biologically active agent." A biologically active agent is any compound which when administered to a subject elicits a biological response. These active ingredients include pharmaceutically active ingredients such as pharmaceutically active ingredients (API's) of any kind. For example, antipyretics, analgesics, anti-malarials, antibiotics, antiseptics, mood stabilizers, hormone replacements, contraceptives, stimulants, tranquilizers, statins, f3-receptor blockers, anti-hypertensives, anticoagulants, brochodialators, corticosteroids, insulin, and vaccines. Further examples include monoclonal antibodies, immunoglobins, immunosuppresants, interferons, therapeutic antibodies, enzymes, peptides, DNA and RNA and fragments thereof. In addition, several aspects include liposomes containing cell-penetrating peptides.

Lipid Bilayer Precursors

Non-limiting example of lipid bilayer precursors include the following:

Phospholipids: Suitable phospholipids include phosphatidylcholine (for example, dioleoyl phosphatidylcholine, dilauroyl phosphatidylcholine, dimyristoyl phosphatidylcholine, dipalmitoyl phosphatidylcholine, distearoyl phosphatidylcholine, etc.), phosphatidylglycerol (for example, di-oleoyl phosphatidylglycerol, dilauroyl phosphatidylglycerol, dimyristoyl phosphatidylglycerol, dipalmitoyl phosphatidylglycerol, distearoyl phosphatidyl diglycerol, etc.), phosphatidylethanolamine (for example, dilauroyl phosphatidylethanolamine, dimyristoyl phosphatidylethanolamine, dipalmitoyl phosphatidylethanolamine, distearoyl phosphatidyl diethanolamine, etc.), phosphatidylserine, phosphatidylinositol, phosphatidic acid, cardiolipin, sphingomyelin, ceramide phosphoryl ethanolamine, ceramide phosphoryl glycerol, ceramide phosphoryl glycerol phosphate, 1,2-dimyristoyl-1,2-deoxy phosphatidylcholine, plasmalogens, yolk lecithin, and soybean lecithin.

Glycolipids: Non-limiting examples of glycolipids include glyceroglycolipid (for example, di-glycosyl diglyceride, digalactosyldiglyceride, galactosyl diglyceride, glycosyl diglyceride), glycosphingolipid (for example, galactosyl cerebroside, lactosyl cerebroside, ganglioside) or the like.

Sterols: Non-limiting examples of sterols include animal-derived sterols (for example, cholesterol, cholesterol succinate, cholestanol, lanosterol, dihydrolanosterol, desmosterol, dihydrocholesterol), sterols of plant origin (phytosterols) (for example, stigmasterol, sitosterol, campesterol, brassicasterol), microbial-derived sterols (for example, chimosuteroru, ergosterol), and the like.

Fatty Acids: Suitable fatty acids include $C_{12}$-$C_{20}$ saturated or unsaturated fatty acids, for example, myristic acid, palmitic acid, oleic acid, stearic acid, arachidonic acid.

Membrane Stabilizing Agents: Suitable membrane stabilizing agents include mono-, di- and triglycerides. Typically, when the stabilizing agents are derived from plant sources, they include an admixture of fatty acids. The artisan of ordinary skill can select the desired triglycerides to provide the desired lipid bilayer.

Pegylated Precursors: Non-limiting examples of pegylated precursors includes 1,2-distearoyl-sn-glycero-3-phosphoethanolamine-N-dibenzocyclooctyl[polyethylene glycol-2000 (DSPE-PEG2K). These pegylated lipid bilayer precursors can also be compounds such as a conjugate of DSPE-PEG2K and octaarginine.

Liposomes may be prepared by a variety of methods known in the art. Methods of preparing liposomes include, but are not limited to, standard thin-film hydration techniques, film formation, hydration and freeze-thaw cycling as well as extrusion through a 200 nm membrane. Any method of preparing liposomes known in the art may be used. Liposome precursors include, but are not limited to phospholipids, glycolipids, sterols, membrane stabilizing agents, pegylated precursors, phosphatidylcholine, and phosphatidylserine.

The percentage of lipid switch molecules in a liposome may vary depending upon the desired selectivity and preferred target. The percentage of lipid switch molecules in a liposome refers to the percentage of a dimer molecule according to general formula (I) or of a monomer molecule according to general formula (II) in the liposome membrane of a liposome. The phrases "percentage of lipid switch molecules in a liposome", "percentage of lipid switch molecules in a liposome membrane", and "percentage of a dimer or monomer molecule according to general formulas (I) and (II)" are used interchangeably herein. The terms "percentage of a dimer molecule according to general formula (I)" and "percentage of a monomer molecule according to general formula (II)" refer to the indicated subset of lipid switch molecules. By "percentage of lipid switch molecules in a liposome membrane" is intended the mole percent or percentage of the total moles in the liposome membrane. Mole percent is equal to the mole fraction of the component multiplied by 100. Therapeutic agents are not considered in determining mole percent. The percentage of lipid switch molecules in a liposome may be designated by "x % lipid switch molecule", "x % (indicated species of lipid switch molecule)" and other similar phrases.

The percentage of lipid switch molecules in a liposome membrane may range between about 0.001% and about 50%, between about 0.01% and about 45%, between about 0.1% and about 45%, between about 0.5% and about 45%, between about 1% to about 40%, between about 2% to about 40%, between about 3% to about 40%, between about 4% to about 40%, between about 5% to about 40%, between about 6% and about 40%, between about 7% and about 40%, between about 8%, and about 40%, between about 9% and about 40%, between about 10% and about 40%, between about 11% and about 40%, between about 12% and about 40%, between about 13% and about 40%, between about 14% and about 40%, between about 15% and about 40%, between about 16% and about 40%, between about 17% and about 40%, between about 18% and about 40%, between about 19% and about 40%, between about 20% and about 40%, between about 21% and about 40%, between about 22% and about 40%, between about 23% and about 40%, between about 24% and about 40%, between about 25% and about 40%, between about 26% and about 40%, between about 27% and about 40%, between about 28% and about 40%, between about 29% and about 40%, between about 30% and about 40%, between about 31% and about 40%, between about 32% and about 40%, between about 33% and about 40%, between about 34% and about 40%, between about 35% and about 40%, between about 36% and about 40%, between about 37% and about 40%, between about 38% and about 40%, between about 39% and about 40%, between about 1% and less than about 40%, between about 1% and less than about 35%, between about 1% and less than about 35%, between about 1% and less than about 25%, between about 1% and less than about 20%, between about 1% and less than about 15%, between about 1% and less than about 10%, between about 2% and less than about 40%, between about 2% and less than about 35%, between about 2% and less than about 30%, between about 2% and less than about 25%, between about 2% and less than about 20%, between about 2% and less than about 15%, between about 2% and less than about 10%, between about 3% and less than about 40%, between about 3% and less than about 35%, between about 3% and less than about 30%, between about 3% and less than about 25%, between about 3% and less than about 20%, between about 3% and less than about 15%, about 4%, about 5%, about 6%, about 7%, about 8%, about 9%, about 10%, about 11%, about 12%, about 13%, about 14%, about 15%, about 16%, about 17%, about 18%, about 19%, about 20%, about 22%, about 24%, about 26%, about 28%, about 30%, about 32%, about 34%, about 36%, about 38%, about 40%, between about 5% and about 40%, between about 10% and 40%, between about 15% and about 40%, between about 20% and about 40%, between about 25% and about 40%, between about 30% and about 40%, and between about 35% and about 40%.

A liposome of the current application may have a liposome membrane selected from the group of liposome membranes comprising a dimer molecule according to general formula (I) as between about 1% and about 20% and liposome membranes comprising a monomer molecule according to general formula (II) as between about 10% and about 40%. The percentage of a dimer molecule according to general formula (I) that is optimal for a selective response to a particular target phosphorylated molecule of interest may be less than the percentage of a monomer molecule according to general formula (II) that is optimal for a selective response to that particular target phosphorylated molecule of interest.

Phosphorylated small molecules include, but are not limited to, inorganic phosphate (Pi), inorganic pyrophosphate (PPi), adenosine triphosphate (ATP), adenosine diphosphate (ADP), adenosine monophosphate (AMP), D-fructose-6-phosphate (FP), D-fructose-1,6-biphosphate (FBP), inorganic triphosphate (TPi), cytidine triphosphate (CTP), guanidine triphosphate (GTP), uridine triphosphate (UTP), TTP and inositol-1,4,5-triphosphate (IP$_3$). ATP, TPi, CTP, GTP and UTP are structurally similar metabolites that are upregulated in tumor cells. IP$_3$ is a signaling molecule that releases calcium stores.

By "target phosphorylated molecule" is intended a particular phosphorylated molecule or select group of phosphorylated molecules that causes a dimer molecule or monomer molecule according to general formulas (I) and (II) to conformationally change shape when the target phosphorylated molecule becomes bound between the R$^2$ groups thereby disrupting the liposome membrane and releasing the therapeutic agent. It is noted that changing the percentage of a particular species of dimer molecule or monomer molecule in a liposome membrane may alter the selectivity of the liposome. For example, a liposome comprising 5% of a dimer molecule or monomer molecule according to general formula (I) or (II) may not release the therapeutic agent in response to a target phosphorylated molecule while a liposome comprising 20% of a dimer molecule or monomer molecule according to general formula (I) or (II) may respond to multiple phosphorylated molecules including a target phosphorylated molecule and additional phosphorylated molecules. A selectively response liposome releases the therapeutic agent in response to a target phosphorylated molecule or select group of phosphorylated molecules but does not release the therapeutic agent in response to other phosphorylated molecules. It is recognized that the lipid switch molecule and percentage of lipid switch molecule in a selectively responsive liposome determine the target phosphorylated molecule or select group of phosphorylated molecules. Thus a selectively response liposome may be designed to respond to the target phosphorylated molecule where the target phosphorylated molecule is selected from the group comprising ATP, CTP, GTP, UTP, TPi, ADP, AMP, TTP, IP3, ATP and ADP, ATP and GTP, ATP and UTP and combinations thereof.

Various lipid switch molecules have been developed. Lipid switch molecules are dimer or monomer molecules according to general formulas (I) and (II)

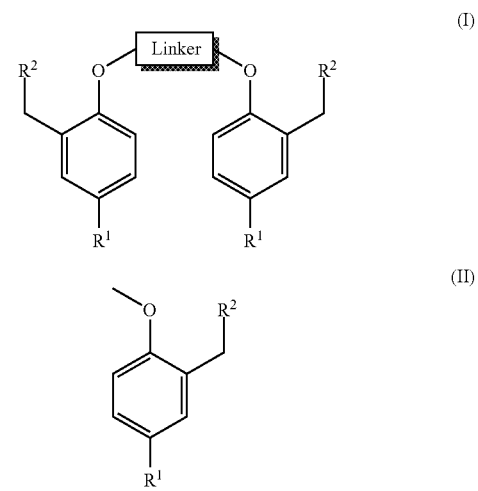

wherein R$^1$ is a hydrophobic tail having at least 6 carbons;

wherein R$^2$ is selected from the group consisting of

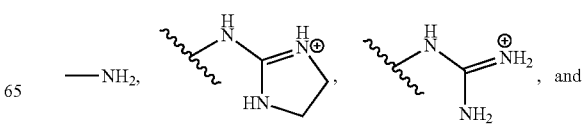

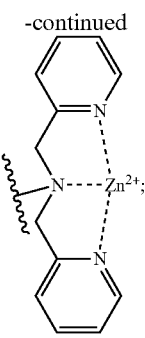

wherein, for the dimer, the linker is a saturated carbon chain having 2 to 6 carbons or is a para-xylene linker; and when $R^2$ is charged anions are present to render the charge neutral. Lipid switch molecules include, but are not limited to the molecules set forth in FIG. 3 and FIG. 17, also known as the 1a lipid switch molecule, the 1b lipid switch molecule, the 1c lipid switch molecule, the 1d lipid switch molecule and the 2 lipid switch molecule. It is recognized that liposomes comprising different lipid switch molecules may have different target phosphorylated molecules and that varying the percentage of a lipid switch molecule in the liposome membrane may further refine the target phosphorylated molecule to which the liposome responds. It is envisioned that a liposome of the current application may comprise a single type of lipid switch molecule or multiple types of lipid switch molecules.

The selectively responsive liposomes may be used to selectively deliver a therapeutic agent to cells with an elevated level of the liposome target. For example, cancer and tumor cells have elevated ATP levels. A selectively responsive liposome with a preferred target of ATP may be used to deliver an anti-cancer therapeutic agent to a cancer or tumor cell. Microbes such as C. albicans cause an increase in extracellular ATP (see for example Ho et al 2020 Cells 9(3):699). A selectively responsive liposome with a preferred target of ATP may be used to deliver a therapeutic agent to a region of an organism with a microbial infection and elevated extracellular ATP.

"Disrupting the liposome membrane" is intended to encompass any disruption, alteration, shift, modulation, conformational change or structural reorganization of the liposome membrane that increases the permeability of the liposome and allows release of a therapeutic agent from the liposome. It is recognized that hydrophilic therapeutic agents may be found within the liposome membrane and released from the membrane while hydrophobic therapeutic agents may be encapsulated by the liposome membrane and released through the membrane. It is recognized that disrupting the liposome membrane and release of a therapeutic agent may require binding of phosphorylated molecules to a plurality of dimer or monomer molecules according to general formula (I) or general formula (II). In some instances, disrupting the liposome membrane and release of a therapeutic agent may require binding of phosphorylated molecules to a majority of dimer or monomer molecules according to general formula (I) or general formula (II). Disrupting the liposome membrane may be reversible upon a decrease in the concentration of the phosphorylated molecules.

Delivery of a therapeutic agent to a cancer, tumor, cancer cells and tumor cells of a subject is encompassed by the current application. Cancers are known and include, but are not limited to, skin cancer, lung cancer, breast cancer, prostate cancer, ovarian cancer, brain cancer, pancreatic cancer, lymphomas, bone cancer, stomach cancer, liver cancer, bladder cancer, kidney cancer, squamous cell carcinoma (SCC), melanoma, basal cell carcinoma (BCC), cutaneous t-cell lymphoma, dermatofibrosarcoma protuberans (DFS), merkel cell carcinoma, sebaceous carcinoma, cutaneous invasive melanoma, malignant melanoma, atypical intrepidermal melanocytic variants, cutaneous squamous cell carcinoma, acantholytic squamous cell carcinoma, non-melanoma skin cancers, parotid cancer, kaposi's sarcoma, oral cancers, oral leukokeratosis, colorectal cancer, acute lymphoblastic leukemia, acute myeloid leukemia, adrenocortical carcinoma, anal cancer, astrocytomas, rhabdoid tumor, bladder cancer, brain tumors, bronchial tumors, Non-Hodgkin lymphoma, carcinoid tumors, cardiac tumors, medulloblastoma, glioblastoma, cervical cancers, chronic lymphocytic leukemia, chronic myelogenous leukemia, chronic myeloproliferative neoplasm, colorectal cancer, craniopharyngioma, ductal carcinoma in situ, endometrial cancer, ependymoma, esophageal cancer, Ewing sarcoma, esthesioneuroblastoma, retinoblastoma, intraocular melanoma, Fallopian tube cancer, gallbladder cancer, gastric cancer, hairy cell leukemia, Hodgkin lymphoma, intraocular melanoma, islet cell tumors, kidney cancer, Langerhans cell histiocytosis, laryngeal cancer, leukemia, lymphoma, mesothelioma, midline tract carcinoma, nasopharyngeal cancer, neuroblastoma, non-small cell lung cancer, osteosarcoma, ovarian cancer, penile cancer, pituitary tumor, peritoneal cancer, rectal cancer, sarcoma, osteosarcoma, Sezary syndrome, small cell lung cancer, small intestine cancer, soft tissue sarcoma, testicular cancer, thyroid cancer, urethral cancer, vaginal cancer, vulvar cancer, wilms tumor and precancerous conditions including but not limited to actinic keratoses and lentigo maligna.

It will be understood that the reference to the below examples is for illustration purposes only and do not limit the scope of the claims.

EXAMPLES

Example 1. Synthesis of a Dimer Molecule According to General Formula I

Figure 3:
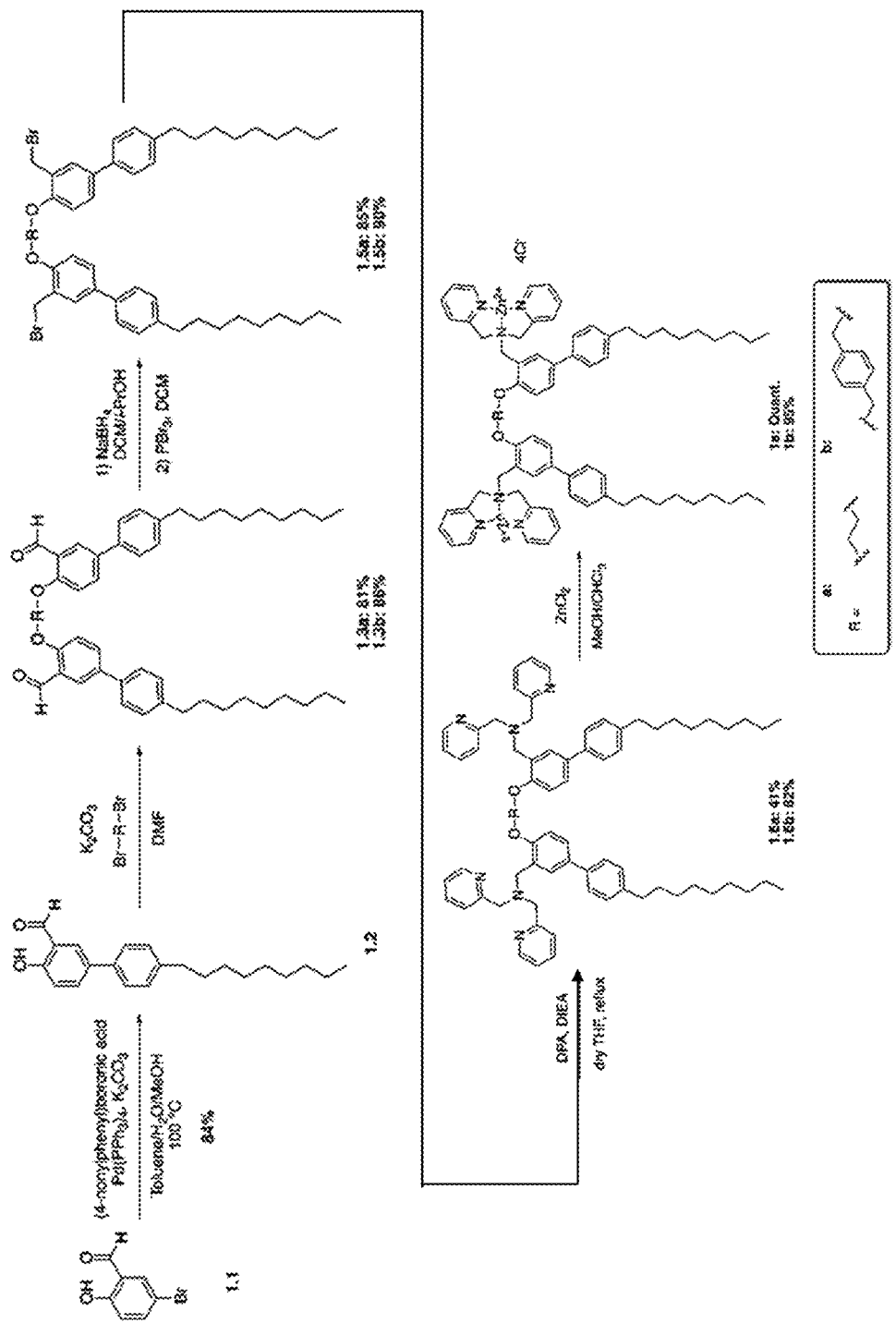
FIG. 3 provides a general overview of the synthetic route for dimer molecules of general formula (I), particularly showing lipid switch molecule 1a and lipid switch molecule 1b. Lipid switch molecule 1a has a short ethylene linker; lipid switch molecule 1b has a slightly longer aromatic p-xylene linker.

The general process for synthesis of a dimer molecule according to general formula I is set forth in FIG. 3. Compound 1.1 was coupled with (4-nonophenyl) boronic acid to produce 1.2 followed by dimerization using dibromoethane to compound 1.3a or p-xylyene dibromide to 1.3b, aldehyde reduction and bromination/dibromination to 1.5a-b, introduction of the DPA units of 1.6a-b and finally zinc chelation to generate lipid switch molecules 1a and 1b.

Example 2. Preparation of Selectively Responsive Liposomes

Lipid switch molecule 1a was incorporated into liposomes otherwise comprised of phosphatidylcholine (PC) mixed isomers obtained from egg. Lipid switch molecule 1 was included at different percentages ranging from 0 to 20%. PC mixed isomers are a bilayer forming lipid. Nile Red (NR) is a hydrophobic dye which fluoresces when solubilized in a membrane bilayer but for which fluorescence is diminished following release into aqueous media. The unilamellar liposomes were prepared using standard thin-film hydration techniques including film formation, hydration and freeze-thaw cycling as well as extrusion through a 200 nm membrane.

For Nile red release assays, stock solutions of 5 mM lipid switches 1a, 1b, 1c, 1d and 2 were prepared in CHCl$_3$/MeOH solution (1/1, v/v). As noted in Example 1, FIG. 3 includes the chemical structure of 1a and 1b. The chemical structure of 1d is presented in the detailed description above and the chemical structure referred to as "1c" and "2" are shown below.

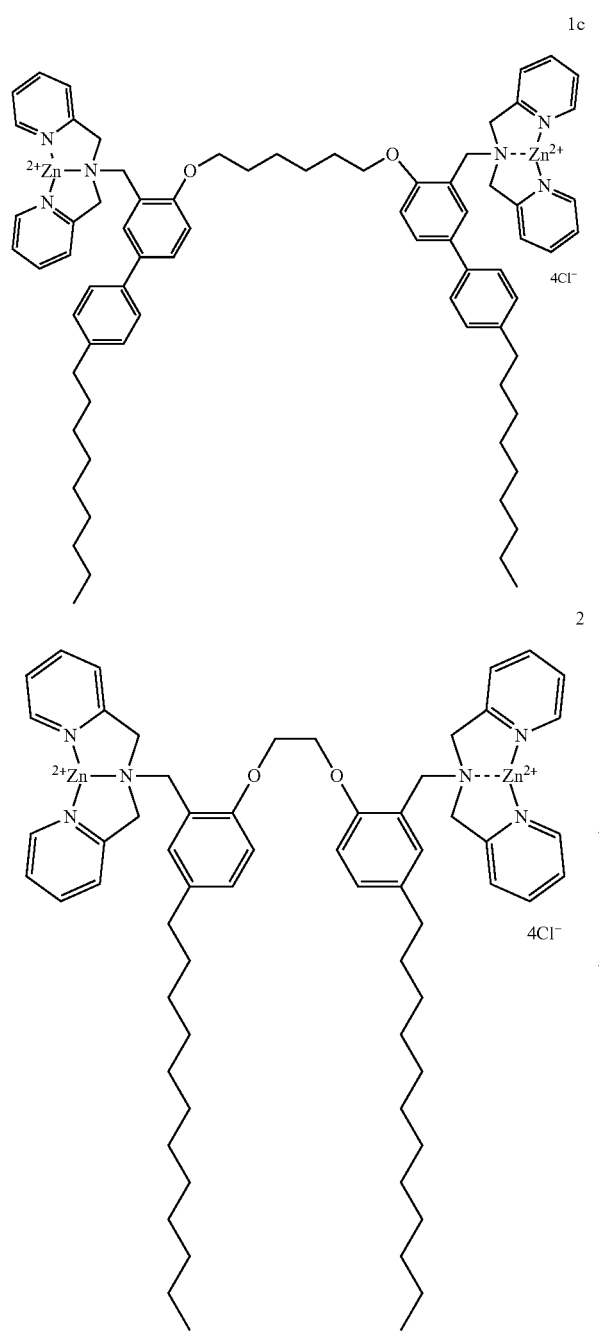

32.46 mM PC and 5 mM Nile red stock solutions were prepared in chloroform. Stock solutions were stored at −20° C. after preparation. Proper volumes of each stock solution were pipetted into a 1 dr vial to reach a total lipid concentration of 2 mM, 0.4 mM or 0.1 mM with desired mole percent of each lipid composition. Nile red was added as an extra 5% of the total lipid content. The organic solvents were evaporated under a nitrogen stream and the resulting lipid films were kept under vacuum for at least one hour. The films were hydrated with proper volumes of 1×TBS buffer (pH 7.4, containing 25 mM Tris/TrisHCl, 0.13 M NaCl, 0.0027 M KCl) in a 60° C. water bath for 1 hour. The vials were taken out and vortexed every 20 min. Ten freeze-thaw cycles were performed with a dry ice-acetone bath and 60° C. water bath. The liposomes were extruded through a 200 nm polycarbonate membrane for 19 passes with an extruder purchased from either Avestin or Avanti. The resulting liposomes were store at 4° C. and studied within a maximum of 48 hours.

The formation of stable liposomes was verified by dynamic light scattering (DLS) based on average particle size (vide infra). NR encapsulation efficiencies were determined using UV-Vis spectroscopy by constructing a NR calibration curve resulting in (29.3±3.43) and (21.23±3.85)% for liposomes comprising 0 and 10% lipid switch molecule 1a. (data not shown).

Example 3. Liposome Responsiveness

Figure 4A:
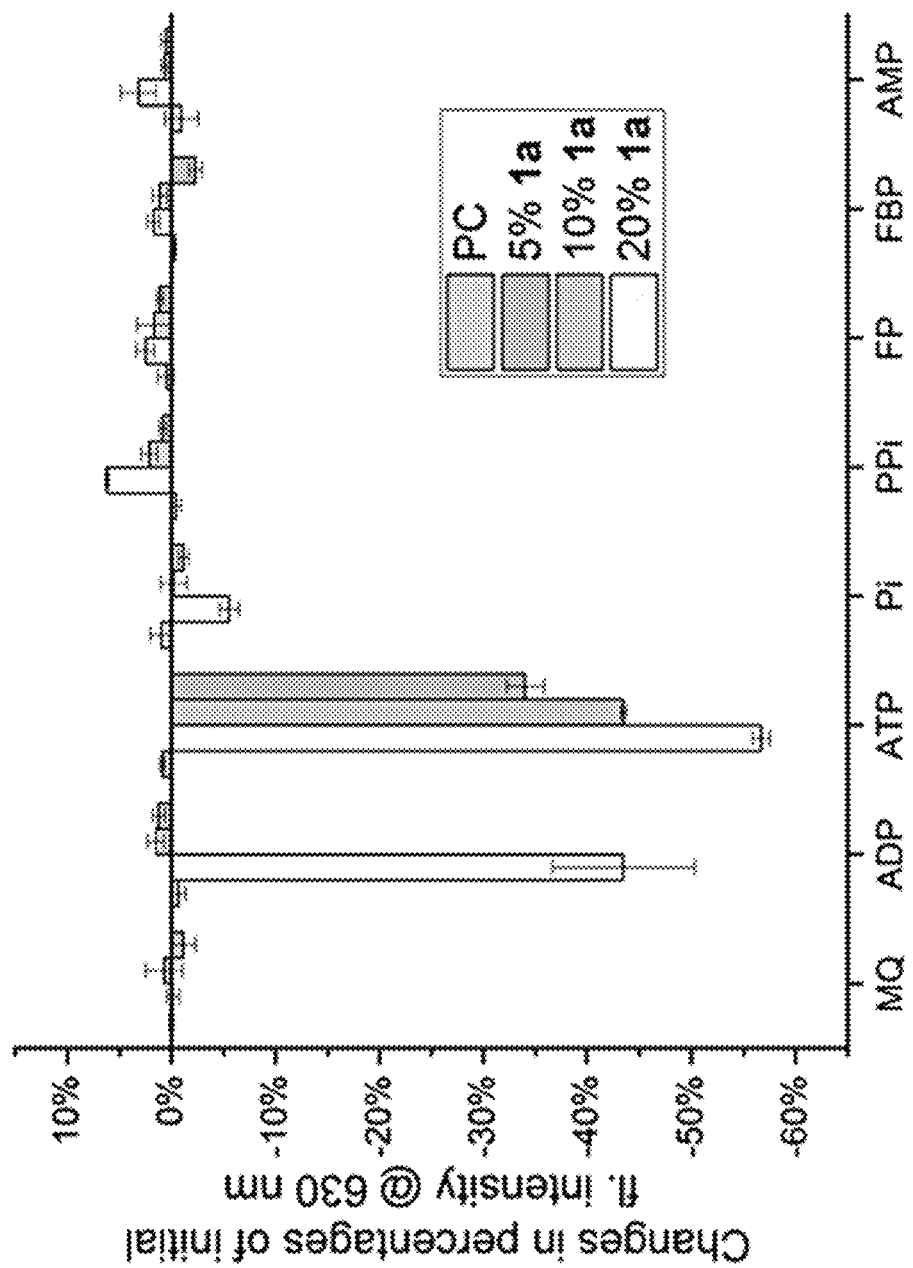
FIG. 4A summarizes the change in percentage of initial fluorescence intensity at 630 nm (y-axis) of PC/1a liposomes with the indicated percent of 1a lipid switch molecules toward different phosphorylated small molecules or Milli-Q water (MQ, negative control) (x-axis). Liposomes containing 20% 1a lipid switch molecules exhibited a significant decrease in fluorescence upon addition of ATP or ADP. The fluorescence decrease indicates disruption of the liposome membrane and release of Nile red (NR) from the liposome. Nile Red is hydrophobic. Liposomes containing 5% or 10% 1a lipid switch molecules exhibited a significant decrease in fluorescence only upon addition of ATP. Liposomes without lipid switch molecules (PC) exhibited no significant decrease in fluorescence in response to any of the indicated phosphorylated small molecules.

Liposomes comprising lipid switch molecules and NR were evaluated for responsiveness to a range of phosphate-containing molecules. Stock solutions (50 mM) of phosphorylated molecules were prepared by dissolving the appropriate salts in MilliQ water. AMP was prepared as a 25 mM stock solution due to solubility issues. Liposomes comprising 0, 5%, 10% and 20% lipid switch molecule were incubated with inorganic phosphate (Pi), inorganic pyrophosphate (PPi), adenosine triphosphate (ATP), adenosine diphosphate (ADP), adenosine monophosphate (AMP), D-fructose-1,6-biphosphate (FBP) or control solution (MQ). 50 μl liposome solution encapsulating Nile Red was first added to a sub-micro quartz cuvette. After an initial scan, 1 μl of the stock solution of the indicated phosphorylated molecule (2 μl for AMP) was added to the cuvette and the fluorescence intensities were recorded immediately or after 5 minutes (for the triphosphates). The fluorescence intensities at 630 nm were selected; 635 nm was used for the 1d lipid switch molecule. The fluorescence intensity was converted to the percentage of initial fluorescence before addition of the phosphorylated molecule. The change in fluorescence after exposure to the phosphate containing metabolites was analyzed. Results from one such series of experiments are summarized in FIG. 4A for lipid switch molecule 1a and in FIG. 5A for lipid switch molecule 1b.

Figure 4B:
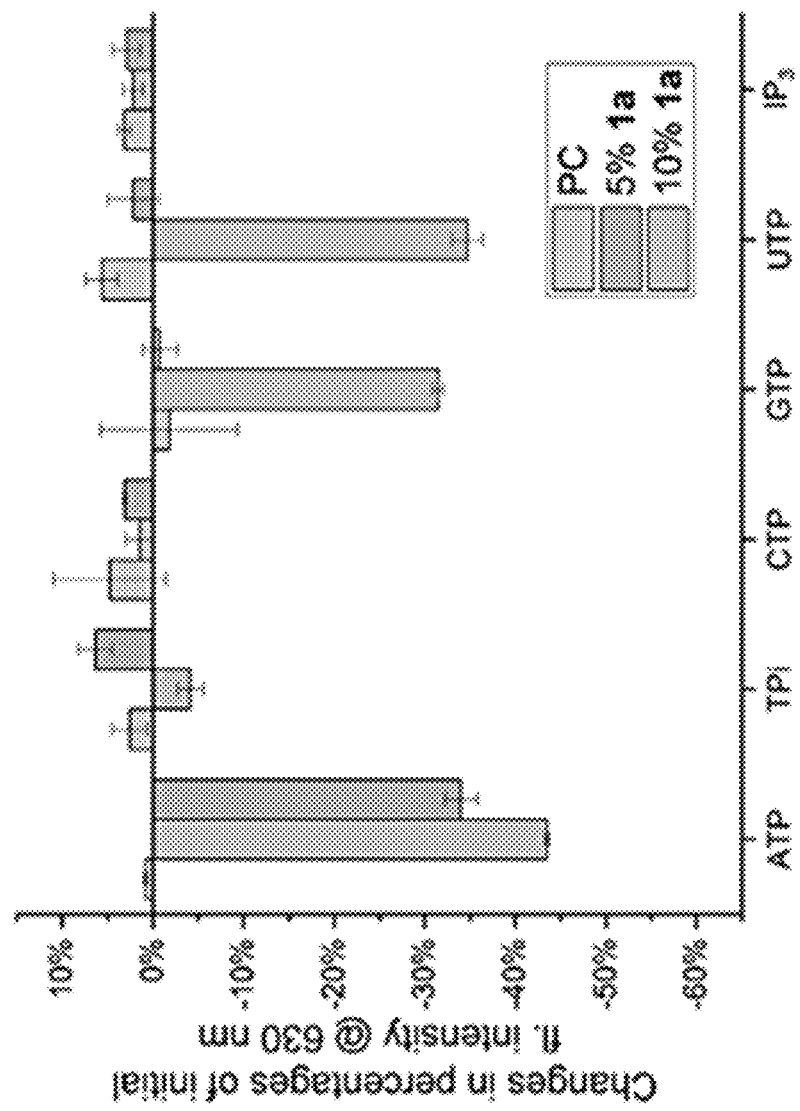
FIG. 4B summarizes the change in percentage of initial fluorescence intensity at 630 nm (y-axis) of PC or PC/1a liposomes with the indicated percent of 1a lipid switch molecules toward different triphosphates (x-axis). The fluorescence intensity of 10% 1a lipid switch molecule liposomes is decreased in response to ATP, GTP and UTP. The fluorescence intensity of 5% 1a lipid switch molecule liposomes is decreased in response to ATP. The decrease in fluorescence intensity indicates a disruption in the liposome membrane and release of NR. Liposomes comprising 10% 1a lipid switch molecules respond to ATP, GTP and UTP, while liposomes with 5% 1a lipid switch molecules selectively respond to ATP. Altering the percentage of lipid switch molecules in the liposome alters the responsiveness of the liposome.

Liposomes comprising lipid switch molecules and NR were evaluated for responsiveness to a range of phosphate-containing molecules. Liposomes comprising 0, 5%, and 10% lipid switch molecules were incubated with TPi, CTP, GTP, UTP and IP$_3$. The change in fluorescence after exposure to the phosphate containing metabolites was analyzed. Results from one such series of experiments are summarized in FIG. 4B for lipid switch molecule 1a and in FIG. 5B for lipid switch molecule 1b.

Figure 4C:
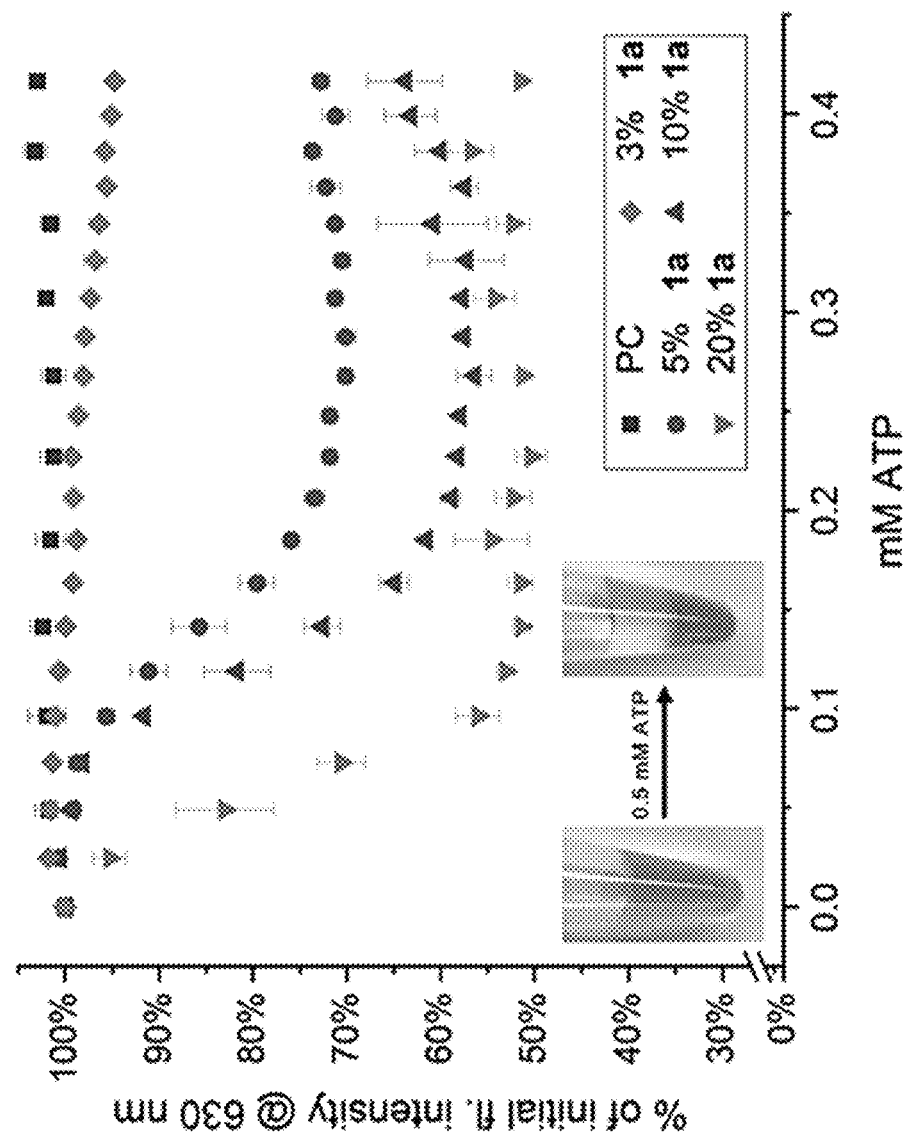
FIG. 4C summarizes the change in percentage of initial fluorescence intensity at 630 nm (y-axis) of PC or PC/1a liposomes with the indicated percent of 1a lipid switch molecules in response to ATP titration. The ATP concentration is indicated on the x-axis. The fluorescence intensity decreases as the ATP concentration increases for all liposomes comprising lipid switch molecules. Liposomes comprising lipid switch molecules show dose dependent decreases in fluorescence intensity as a function of the percent of lipid switch molecules in the liposome. PC controls without lipid switch molecules show no nonspecific decrease in fluorescence intensity upon ATP treatment, indicating limited or no non-specific release of NR. The error bars on FIGS. 4A-4C denote standard errors from at least three independent studies. The photograph in 4C shows images of liposome solutions before and after ATP treatment showing the precipitate formation.

Liposomes (2 mM PC) comprising 0, 3%, 5%, 10% and 20% lipid switch molecules and encapsulating NR were prepared. 100 μl aliquots were placed in sub-micro quartz cuvettes. The liposomes were titrated with addition of 2.5 mM ATP and fluorescence readings were taken after each addition of ATP. Experiments were done at least three times with different batches of liposomes. Results from one such series of experiments are summarized in FIG. 4C for lipid switch molecule 1a and in FIG. 5C for lipid switch molecule 1b.

Similar experiments were performed with liposomes comprising 1c and 1d lipid switch molecules. Results for one such series of experiments are summarized in FIGS. 19A, 19B, 19C and 19D for liposomes comprising 1c lipid switch molecules. Results for one such series of experiments are summarized in FIGS. 20A, 20B, 20C and 20D for liposomes comprising 1d lipid switch molecules.

Table 1 summarizes results of Nile Red (NR) release by various lipid switch molecules in the presence of the indicated phosphorylated or tri-phosphate metabolite. Fluorescence readings were taken immediately after addition of phosphorylated metabolites. Fluorescence readings were taken after addition of the triphosphate and a 5' incubation. In Table 1, "NA" denotes did not test and "—" denotes did not release.

TABLE 1

Summary of Fluorescence Change of Lipid Switch Molecules with Small Molecules

| Entry | Liposome | Pi | ADP | ATP | TPi | CTP | GTP | UTP | IP$_3$ |
|---|---|---|---|---|---|---|---|---|---|
| 1 | PC | — | — | — | — | — | — | — | — |
| 2 | 5% 1a | — | — | ~40% | — | — | — | — | — |
| 3 | 10% 1a | — | — | ~40% | — | — | ~40% | ~40%. | — |
| 4 | 20% 1a | — | ~40% | ~60% | NA | NA | NA | NA | NA |
| 5 | 10% 1b | — | — | ~40% | — | — | ~40% | ~5% | — |
| 6 | 20% 1b | — | ~40% | ~50% | NA | NA | NA | NA | NA |
| 7 | 10% 1c | — | — | ~30% | — | — | ~40% | — | — |
| 8 | 20% 1c | — | ~40% | ~40% | — | — | ~50% | ~40% | ~30% |
| 9 | 10% 1d | — | — | — | — | — | — | — | — |
| 10 | 20% 1d | — | — | ~40% | — | — | ~40% | — | — |
| 11 | 10% 2 | — | — | ~40% | — | — | — | — | — |
| 12 | 20% 2 | ~10% | — | ~60% | — | — | ~15% | — | ~40% |

PPi, FB, FBP, AMP are each "—" for all Entry numbers (i.e., did not release).

Example 4 Hydrophobic Cargo Compound Release Kinetics Evaluation

Liposomes comprising 10 or 20% lipid switch molecules and NR were treated with 0.5 mM ATP. Fluorescence intensity was evaluated continuously on a Cary Eclipse Fluorescence spectrophotometer using kinetic mode. Fluorescence intensity decrease (as a measure of release) reached a plateau within 3 min after ATP addition. Experiments were performed with lipid switch molecule 1a and 1b. Data from a series of experiments with lipid switch molecule 1a are presented in FIG. 6. Results with lipid switch molecule 1b were similar.

Example 5. Evaluation of Conformational Change

Diffusion ordered spectroscopy (DOSY) was performed on 1a lipid switch molecules in de-DMSO containing 8% D$_2$O before and after adding ATP. A decrease in diffusion coefficient was observed. In at least one experiment, the diffusion coefficient decreased from $(1.0793\pm0.043)\times10^{-6}$ cm$^2$/s for 1a lipid switch molecule and $(1.142\pm0.018)\times10^{-6}$ cm$^2$/s for ATP to $(0.987\pm0.098)\times10^{-6}$ cm$^2$/s for 1a+ATP. The diffusion coefficient indicates an increase in the hydrodynamic radius per lipid molecule upon binding.

Example 6. Analysis of Liposome Morphology Changes with ATP or ADP

Dynamic light scattering (DLS) based on average particle size (vide infra) was performed on PC liposomes comprising lipid switch molecules before and after addition of ATP. A Malvern Zetasizer Nano ZS instrument equipped with a 4.0 mW laser operating at I=633 nm was used. Samples were prepared by diluting the liposomes before and after triggered release 10× with proper buffer. Measurements were taken at a scattering angle of 173° at 20° C. Results from experiments with liposomes comprising 1a lipid switch molecules are presented in FIG. 8A. Similar experiments were performed with liposomes comprising 1b lipid switch molecules and similar results were obtained (FIG. 9A). DLS was performed on PC liposomes comprising 10% lipid switch molecules (1a or 1b) after addition of ADP. Results from one such experiment are summarized in FIG. 10.

Liposome particles were also analyzed by electron microscopy (EM) experiments. PC liposomes were evaluated before and after ATP addition did not show any change via transmission EM (TEM). Cryo-EM images for 10% liposomes were obtained before and after ATP addition. 10% liposomes were incubated with ATP for 1 min and cryo-EM images were obtained Images from one such experiment with 1a lipid switch molecules are shown in FIGS. 8B, 8C and 8D.

Example 7. Fluorescence Microscopy of Liposomes 1 mM solutions of PC liposomes containing 0 or 10% 1a lipid switch molecules were labeled with 0.08% rhodamine L-α-phosphatidylethelenolamine (Rd-PE) in 1×TBS buffer (pH 7.4, containing 25 mM Tris/TrisHCl, 0.13 M NaCl, and 0.0027 M KCl) were prepared using thin-film hydration procedures. A 100 µl aliquot of the liposome solution was added into a FluoroDish Cell Culture Dish (WPI Inc) and allowed to settle for 15 min before imaging. A 63×1.4 NA oil objective on a Leica SP8 White Light Laser Confocal Microscope (Wetzler, Germany) was used. Rd-PE was excited by using a 561 nm laser line and the emission was collected between 566-620 nm. Video was obtained (data not shown). In an experiment, confocal images of PC liposomes and PC 10% 1a lipid switch liposomes were obtained prior to addition of ATP. Liposomes were incubated with 1 mM ATP for 15 minutes and the confocal fluorescence microscopy images were obtained. Images from one such experiment are shown in FIGS. 11A and 11B. The presence of highly fluorescent aggregates in the 2-3 µm size range shortly after ATP treatment was observed. The lipid switch containing liposomes exhibit significant morphological changes in the presence of ATP. While not being bound by mechanism, the observed size increases may involve fusion of liposomes and/or reorganization of lipids into alternate assemblies such as the inverted hexagonal phase.

Example 8. Reversibility of Hydrophobic Cargo Release Evaluation

ATP was added to liposomes containing Nile Red and 10% 1a lipid switch molecule or 20% 1a lipid switch molecules. An ATPase was added to the liposome solution and NR fluorescence was tracked over time. The presence or absence of the pink colored NR precipitate was observed before and after addition of the ATPase. Dynamic light scattering (DLS) experiments following addition of ATPase were performed on liposomes containing Nile Red and 10% 1a lipid switch molecules. Results from one such series of experiments with liposomes comprising Nile Red and 10% 1a lipids switch molecules are shown in FIGS. 12A, 12C and 12D. After addition of the ATPase and the decrease in ATP concentration, the fluorescence intensity increased, the Nile Red precipitate decreased and the average liposome size returned to pre-ATP treatment sizes for the liposomes comprising 10% lipid switch molecules. The liposomes comprising 10% 1a lipid switch molecules returned to the original size and reabsorbed the hydrophobic Nile Red cargo molecules. Modulating the ATP concentration modulates delivery and sequestration of cargo compounds from the selectively responsive liposomes. When 20% lipid switch molecules were evaluated only partial restoration of NR fluorescence and particle size was seen (data not shown).

Example 9 Polar Cargo Compound Release

A calcein dye release assay was used to evaluate the release of polar or hydrophilic contents from the liposome. In the calcein dye release assay, calcein fluorescence is initially quenched at high dye concentrations within liposomes but the fluorescence is then restored upon release that results in dilution. Calcein is non-specifically encapsulated in liposome interiors during preparation.

Stock solutions of lipid switch molecules and PC were prepared. 50 mM calcein stock solutions were prepared by dissolving calcein with 25 mM Tris-HCl buffer and the pH was adjusted to 7.4 with 1 N NaOH. The osmolality of the solution was determined to be 255 mOsm/kg. Proper volumes of each lipid stock solution were pipetted into a clean 1 dr vial to reach a total lipid content of 5 mM scale with desired percentages of each lipid composition. The organic solvents were removed with a nitrogen stream and the result lipid films were dried under vacuum for at least 1 hour. The films were hydrated with 50 mM calcein solution at 60° C. in a water bath for four sets of 15 minutes with vortexing after each set. The solutions were subjected to ten freeze-thaw cycles with a dry ice-acetone bath and 60° C. water bath, followed by extrusion through a 200 nm polycarbonate membrane for 21 passes with an extruder purchased from either Avestin or Avanti. Size-exclusion chromatography (SEC) was used to remove the non-encapsulated dye from the liposomes. A microcolumn was packed with Sephadex G-50 pre-saturated with isotonic TBS buffer. 1 ml fractions were collected from the column. The second fraction showing significant turbidity was collected. The formation of calcein-encapsulating liposomes was also evaluated by DLS (data not shown). The results of these assays were calibrated via treatment with Triton X-100 detergent at the end of each titration to induce complete release. Results are reported as a percentage of the fluorescence intensity induced by Triton X-100 to show the percentage of total release and account for variations in dye inclusion among liposome samples.

PC liposomes comprising 0% lipid switch molecules, 10% 1a lipid switch molecules lipid switch molecules encapsulating calcein dye were prepared. Unencapsulated dye was removed via SEC. Calcein dye encapsulation efficiency for 0 and 10% 1a liposomes was determined and calculated to be approximately 2.16±0.81 and 1.65±0.55%, respectively. Polar dye cargo encapsulation is typically low as the polar cargo molecules are randomly trapped during formation of the liposomes. Fluorescence intensity was measured over time. At 30 min (after fluorescence intensity plateaued), Triton X-100 detergent was added to induce 100% release and calibrate the assay. A representative plot of at least three independent experiments is provided in FIG. 13. Additional experiments were performed in which Triton X-100 was added more than an hour after addition of ATP. Results from one such experiment are shown in FIG. 14. Experiments from liposomes comprising 10% 1b lipid switch molecules were also performed, and the results were similar (See FIGS. 15A and 15B). Liposomes comprising lipid switch molecules respond to the small molecule ATP trigger and release hydrophilic cargo.

A series of experiments involving the addition of ATPase to evaluate the reversibility of the process was performed. The release of the hydrophilic cargo does not appear to be reversible. (Data not shown).

Example 10 Surface Charge Analysis (Zeta Potential)

Zeta potential values were measured with a Malvern Zetasizer Nano ZS instrument equipped with a 4.0 mW laser operating at I=633 nm. A 1 mM solution of PC-based liposomes containing 0%, 5% or 10% 1a lipid switch molecules without dye encapsulation were prepared in 1 mM HEPES (pH 7.4, containing 30 mM NaCl). A 200 µl aliquot of liposome solution was diluted with 800 µl buffer before addition of 5 µl of 50 mM ATP (liposome conc=0.2 mM, ATP conc.=0.25 mM). The solutions were transferred into a DTS1070 folded capillary cell ready for measurement. All measurements were taken at 20° C. Data were generated from at least three replicates. Results from one such series of experiments are summarized in FIG. 16.

Example 11 Cell Culture

A375 cells (ATCC) were maintained in Dulbecco's Modified Eagle Medium (DMEM, Gibco) containing 10% fetal bovine serum (FBS) and 100 U/ml penicillin/streptomycin (Gibco) at 37° C. with 5% $CO_2$. Cells were passed at approximately 80% confluency and were not used for more than 30 passes. A375 cells are from a human melanoma cell line.

Example 12 Cellular Delivery 2 mM solutions of 0% and 5% 1a liposomes in PC containing 0.08% Rd-PE in 1×TBS buffer were prepared using thin-film hydration procedures. $1.2\times10^5$ A375 cells were plated per well of a 12-well plate containing sterile #1.5 12 mm round glass coverslips 48 hours before treatment. Media was changed 24 hours before treatment. Cells were treated with 1 mM PC liposomes containing 0.08% Rd-PE with or without 5% 1a lipid switch molecules for 30 min at 37° C. Cells were washed four times with PBS containing 1 mM $MgCl_2$ and 100 mM $CaCl_2$ (PBS++), fixed for 15 min in 4% paraformaldehyde at 37° C. and stained with DAPI. Coverslips were mounted on microscope slides using Prolong Diamond Antifade Mountant (Invitrogen) and allowed to cure for 24 hr before imaging with a Leica SP8

White Laser Confocal Microscope. Images were the product of 3-fold line averaging. Three to five images were taken per coverslip and fluorescence was measured for 6 cells per image via ImageJ. Results from one such series of experiments are shown in FIGS. 21A and 21B.

Example 13. Cell Viability Assay

PC liposomes (4 mM) containing 0% or 5% 1a lipid switch molecules without any content encapsulation were prepared using the standard liposome preparation procedure. $2 \times 10^4$ A375 cells were plated per well of a clear flat bottom 96 well plate and allowed to adhere and incubate for 24 hours. Cells were then treated with 2 mM, 1 mM, 200 µM, 40 µM, 8 µM, 1.6 µM or 0 µM liposomes (0% and 5% 1a lipid switch molecules) in a 1:1 solution of serum free media and TBS for 30 minutes. Cells were washed with PBS++ and incubated in 100 µl phenol free DMEM containing 10% FBS for 24 hrs. After 24 hours, 10 µl MTS reagent (Promega) was added to the wells, incubated for 1.5 hr and 490 nm absorbance was measured using a Biotek Cytation V microplate reader with Gen5 software. Results from one such experiment are presented in FIG. 22.

Example 14 Intracellular ATP Modification

Prior to treatment with study or control liposomes, cells were washed twice and incubated with the following ATP modifying drug treatments: 1 µM antimycin-A (AA) and 250 mM 2-deoxy-D-glucose (DG) or 500 mM AICAR in glucose-free DMEM (Gibco) at 37° C. for 1 hr (AA/DG) or 3 hr (AICAR). Treatment with antimycin-A and DG decreases intracellular ATP levels while treatment with AICAR increases intracellular ATP concentrations. Results from one such series of experiments are shown in FIGS. 23A, 23B, 23C, 23D and 23E Example 16. ATP Quantification For ATP quantification, $4 \times 10^4$ cells were plated per well of a white opaque 96 well plate 48 hours before treatment. Media was changed 24 hours before treatment. Cells were treated for ATP modification as described above herein. Cells were washed 2 times with PBS++, and ATP was quantified using a luminescent ATP detection assay kit from Abcam according to manufacturer's protocols. Briefly 100 µl glucose-free DMEM was added to the cells, followed by 50 µl detergent addition. The plate was shaken on an orbital shaker for 5 min to lyse the cells. 50 µl substrate was added and the plate was shaken for 5 min. The plate was equilibrated in the dark for 10 min before luminescence readings were acquired using a Biotek Cytation V microplate reader with Gen5 software. A fresh standard curve of ATP was prepared each day and the experiment was performed in triplicate. (Data not shown).

Example 17. Synthesis of a Monomer Molecule According to General Formula (II)

Synthesis of a monomer molecule according to general formula II was performed. A schematic of the process is shown in FIG. 18B. The alcohol group of 1.2 was methylated with iodomethane to generate 1.3d followed by reduction to 1.4d bromination to 1.5d, introduction of DPA units (1.6d) and zinc chelation to the 1d lipid switch molecule.

Example 18. Synthesis of a Dimer Molecule According to General Formula (I)

Synthesis of additional dimer molecules according to general formula I was performed. Schematics of the additional processes are shown in FIGS. 18A and 18C.

That which is claimed:
1. A dimer molecule according to general Formula (I), comprising:

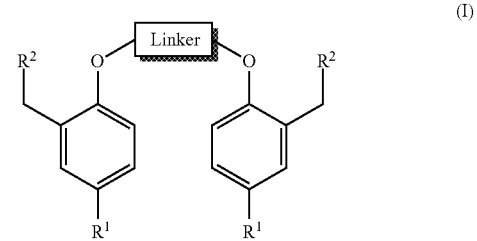

wherein:
$R^1$ is a hydrophobic tail having at least 6 carbons;
$R^2$ is selected from the group consisting of

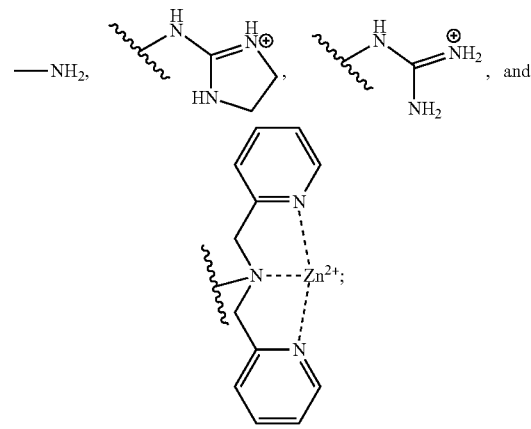

a linker of the dimer of Formula (I) is a saturated carbon chain having 2 to 6 carbons or is a para-xylene linker;
and wherein:
when $R^2$ is

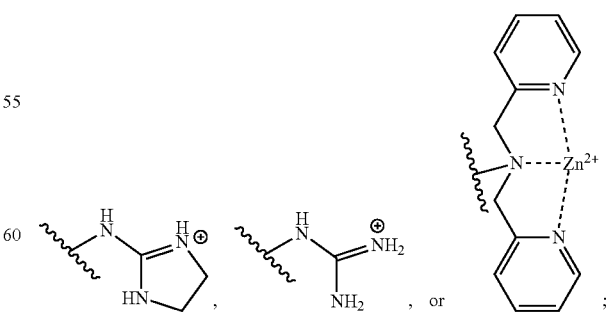

anions are present to render the dimer neutral.
2. The molecule of claim 1, wherein the hydrophobic tail includes an aromatic ring.

3. The molecule of claim 2, wherein the aromatic ring is the attachment point of the hydrophobic tail $R^1$ to the benzene ring of the dimer of Formula (I) and has a saturated carbon chain extending therefrom that comprises 4 to 10 carbons.

4. The molecule of claim 1, wherein the saturated carbon chain linker having 2 to 6 carbons is selected from an ethylene linker, pentylene linker, or a hexylene linker.

5. The molecule of claim 4, wherein $R^1$ is a nonylphenyl tail.

6. The molecule of claim 5, wherein $R^2$ is

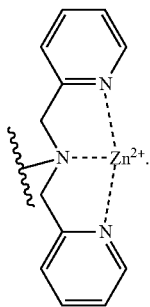

7. The dimer molecule of Formula (I) of claim 1, further comprising a phosphorylated molecule bound between the $R^2$ groups of the dimer of Formula (I) to form a compound of Formula (III), wherein the phosphorylated molecule is selected form the group consisting of ATP, ADP, AMP, UTP, GTP, CTP, TTP, TPi and $IP_3$;

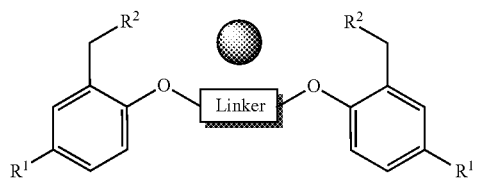

(III)

wherein binding the phosphorylated molecule thereto changes the shape of the dimer molecule of Formula (I).

8. The dimer molecule of Formula (I) of claim 7, wherein the phosphorylated molecule is ATP or ADP.

9. The molecule of claim 1, wherein the dimer of Formula (I) is in solution, $R^2$ is $-NH_2$, and the solution has a pH that causes $R^2$ to form $-NH_3^+$.

10. The molecule of claim 1, wherein the hydrophobic tail is a saturated carbon chain having 6 to 18 carbons.

11. A liposome comprising:
 a liposome membrane comprising a dimer molecule according to 1 claim as between about 0.01% and about 45% thereof;
 a therapeutic agent stored within the liposome;
 wherein the molecule functions as a lipid switch configured to change shape when a phosphorylated molecule becomes bound between the $R^2$ groups, thereby disrupting the liposome membrane and releasing the therapeutic agent.

12. The liposome of claim 11, wherein the liposome membrane is a lipid bilayer membrane.

13. The liposome of claim 12, wherein the liposome membrane comprises a phospholipid.

14. The liposome of claim 13, wherein said phospholipid is selected from the group consisting of phosphatidylcholine (PC) and phosphatidylserine (PS).

15. The liposome of claim 11, wherein the therapeutic agent is encapsulated by the liposome membrane as a core thereof or as part of the liposome membrane.

16. The liposome of claim 11, wherein the therapeutic agent is selected from the group consisting of a hydrophobic therapeutic agent and a hydrophilic therapeutic agent.

17. The liposome of claim 11, wherein the percentage of lipid switch molecules in the liposome membrane is between about 1% and less than about 20%.

18. The liposome of claim 11, wherein the percentage of lipid switch molecules in said liposome membrane is between about 3% and less than about 15%.

19. The liposome of claim 11, wherein the liposome membrane comprises the dimer molecule as between about 1% and about 20% thereof.

20. The liposome of claim 11, wherein the liposome is a selectively responsive liposome, wherein the selectively responsive liposome releases the therapeutic agent in response to a target phosphorylated molecule.

21. The selectively responsive liposome of claim 20, wherein the target phosphorylated molecule is ATP and wherein the percentage of lipid switch molecules in said liposome is about 10%.

22. The selectively responsive liposome of claim 20, wherein the lipid switch molecule and the percentage of lipid switch molecule determine the target phosphorylated molecule.

* * * * *